US007007078B2

(12) United States Patent
Matsuda

(10) Patent No.: US 7,007,078 B2
(45) Date of Patent: Feb. 28, 2006

(54) METHOD AND APPARATUS FOR RE-SECURING RESOURCES AFTER A DETECTED BUS RESET

(75) Inventor: Junichi Matsuda, Tokyo (JP)

(73) Assignee: NEC Corporation, Tokyo (JP)

( * ) Notice: Subject to any disclaimer, the term of this patent is extended or adjusted under 35 U.S.C. 154(b) by 886 days.

(21) Appl. No.: 09/750,537

(22) Filed: Dec. 28, 2000

(65) Prior Publication Data

US 2001/0007118 A1    Jul. 5, 2001

(30) Foreign Application Priority Data

Dec. 28, 1999    (JP)    ................................. 11-377300

(51) Int. Cl.
G06F 15/177    (2006.01)
G06F 15/16    (2006.01)
G06F 13/00    (2006.01)
G06F 13/38    (2006.01)

(52) U.S. Cl. ...................... 709/220; 709/223; 709/224; 709/229; 710/129

(58) Field of Classification Search ................ 709/220, 709/223, 224, 229
See application file for complete search history.

(56) References Cited

U.S. PATENT DOCUMENTS

| 6,032,261 | A | * | 2/2000 | Hulyalkar | .................... | 713/400 |
| 6,122,248 | A | * | 9/2000 | Murakoshi et al. | ......... | 370/216 |
| 6,131,119 | A | * | 10/2000 | Fukui | ......................... | 709/224 |
| 6,219,697 | B1 | * | 4/2001 | Lawande et al. | ........... | 709/221 |
| 6,505,303 | B1 | * | 1/2003 | Arima | ........................ | 713/324 |

(Continued)

FOREIGN PATENT DOCUMENTS

EP    0930747    7/1999

(Continued)

OTHER PUBLICATIONS

Saito T. et al.: "IEEE1394 Home Networks" NEC Research and Development, Nippon Electric Ltd., Tokyo, Japan, vol. 41, No. 2, Apr. 2000, pp. 146-152, XP000989754 ISSN: 0547-051X * p. 147, left-hand column, line 41—p. 148, left-hand column, line 21 * .

(Continued)

*Primary Examiner*—Jeffrey Gaffin
*Assistant Examiner*—Angel L. Casiano
(74) *Attorney, Agent, or Firm*—Dickstein, Shapiro, Morin & Oshinsky, LLP.

(57) ABSTRACT

A communication path control system is provided for use in a data network configured by a number of buses each of which installs at least one node as an isochronous resource manager (IRM) based on the IEEE 1394 standard. Adjacent buses are interconnected together by means of a bridge consisting of at least two portals, each of which has a connection counter for counting a number of receiving nodes for receiving stream packets being transmitted thereto from a transmitting node by itself. For establishment of a communication path, a device controller specifies all portals that lie in the communication path to request each of them to increment a value of the connection counter by '1'. For disconnection of the communication path, the device controller requests each of the specified portals to decrement a value of the connection counter by '1'. More specifically, each portal stores a communication path management table containing the connection counter, while the device controller stores a communication path management table that describes resources (e.g., bandwidths, channels) in connection with a connection counter with respect to each of buses corresponding to the communication path. At occurrence of bus reset on a specific bus, its corresponding portal proceeds to initialization of the specific bus, then, the device controller proceeds to re-securement or release of the resources.

81 Claims, 28 Drawing Sheets

U.S. PATENT DOCUMENTS

| | | | |
|---|---|---|---|
| 6,510,151 B1 * | 1/2003 | Cioli et al. | 370/352 |
| 6,512,767 B1 * | 1/2003 | Takeda et al. | 370/389 |
| 6,594,239 B1 * | 7/2003 | Matsumaru et al. | 370/257 |
| 6,654,353 B1 * | 11/2003 | Tokura et al. | 370/254 |
| 2002/0001288 A1 * | 1/2002 | Fukunaga et al. | 370/252 |

FOREIGN PATENT DOCUMENTS

| | | |
|---|---|---|
| EP | 0933900 | 8/1999 |
| EP | 1 134 937 A1 | 9/2001 |
| JP | 10-173689 | 6/1998 |
| JP | 11-55297 | 2/1999 |
| JP | 11-688849 | 3/1999 |
| JP | 11163912 A * | 6/1999 |
| JP | 11-205363 | 7/1999 |
| JP | 11-205373 | 7/1999 |
| JP | 11-220485 | 8/1999 |
| JP | 11-261606 | 9/1999 |
| JP | 2001-103085 | 4/2001 |
| WO | 98/12840 | 3/1998 |
| WO | 99/59309 | 11/1999 |

OTHER PUBLICATIONS

European Office Action dated May 2, 2002.
European Search Report.
Copy of Japanese Office Action dated Jan. 7, 2003 (and English translation of relevant portion).
Copy of Japanese Office Action dated Apr. 1, 2003 (and English translation of relevant portion).

* cited by examiner

FIG. 21

| | EUI-64 INFORMATION OF IEEE 1394 DEVICE 3b | | | oPCR NUMBER | | |
|---|---|---|---|---|---|---|
| | | | | | | |
| | | | | | | |
| 3 (BUS ID OF BUS 1d) | PHYSICAL ID OF PORTAL 9a | 5 (SECURED CHANNEL NUMBER) | 1 (CONNECTION COUNTER) | NODE ID OF PORTAL 7b | SCR NUMBER (SETTING IMCOMPLETE) | R1 |
| 1 (BUS ID OF BUS 1b) | PHYSICAL ID OF PORTAL 7b | 1 (SECURED CHANNEL NUMBER) | 1 (CONNECTION COUNTER) | NODE ID OF PORTAL 7a | SCR NUMBER (SETTING IMCOMPLETE) | R2 |
| 0 (BUS ID OF BUS 1a) | PHYSICAL ID OF PORTAL 7a | 3 (SECURED CHANNEL NUMBER) | 1 (CONNECTION COUNTER) | | SCR NUMBER (SETTING IMCOMPLETE) | R3 |

FE3, FE1, FE4, FE5, FE6, FE2, FE7, FE8

METHOD AND APPARATUS FOR RE-SECURING RESOURCES AFTER A DETECTED BUS RESET

BACKGROUND OF THE INVENTION

1. Field of the Invention

This invention generally relates to communication path control methods for data networks that use high-speed buses for interconnections among devices by means of bridges. Particularly, this invention relates to communication path controls for data networks that use high-speed IEEE 1394 serial buses (which are exclusively described in IEEE standard 1394–1995, namely, "IEEE Standard for a High Performance Serial Bus", where "IEEE" is an abbreviation for "Institute of Electrical and Electronics Engineers") for interconnections among prescribed devices such as personal computers and peripherals as well as audio/visual devices by means of bridges.

2. Description of the Related Art

Recently, personal computers are widely spread in households in various countries. To cope with an increasing percentage of households or persons owning the personal computers and to further improve use rates of the personal computers among general people, manufacturers and engineers develop a variety of techniques with regard to hardware, software and application of the personal computers, peripherals and other related devices. Meanwhile, digitalization is generally and widely spread among people to frequently purchase so-called "digital devices" such as digital video cameras so that digital data are used to represent images, pictures, voices and sounds. For this reason, even the general households perform processing of digital data produced by the digital video cameras on the personal computers, for example. Under such circumstances, various techniques are developed and proposed to improve connectibility among personal computers and peripherals such as printers and image scanners, so that they are partly actualized for practical use as universal serial buses (USB) and IEEE 1394 serial buses.

Now, a description will be given with respect to communications between devices connected by way of IEEE 1394 serial buses. For convenience' sake, the devices having connectibility with the IEEE 1394 serial buses are called "IEEE 1394 devices", and the IEEE 1394 serial buses are simply referred to as "buses".

Normally, when user connects or disconnects an IEEE 1394 device with an IEEE 1394 serial bus, initialization (namely, "bus reset") is carried out, so that an ID number thereof (namely, "physical ID") is automatically allocated to the IEEE 1394 device. The allocated physical ID is stored in a CSR (Command and Status Register) space of the IEEE 1394 device, which is defined by the IEEE 1394 standard. After occurrence of the bus reset, communication is inhibited between the IEEE 1394 devices until allocation of the physical ID is completed.

ID numbers are also allocated to various buses, wherein they are referred to as bus IDs. If a data network is configured by way of a single bus, its bus ID can be set to '3FFh' where a last letter 'h' represents hexadecimal notation. A combination of the bus ID and physical ID is called a node ID. Using such a node ID, it is possible to discriminate types of the IEEE 1394 devices.

Specific information specifically owned by the IEEE 1394 device is described in an address space defined between an address 'FF FF F0 00 04 00h' and an address 'FF FF F0 00 07 FFh' within the CSR space of the IEEE 1394 device. Such an address space is generally called "configuration ROM", which is configured by various sections, namely, Bus_info_block section, Root-directory section, Unit_directory section, root_leaves section and unit_leaves section. In the Bus_info_block section, 64-bit Extended Unique_ID (normally called "EUI-64") is described as a specific ID of the IEEE 1394 device. The Root_directory section contains module IDs and option information, where module IDs designate modules being assigned to the IEEE 1394 device. Information of the configuration ROM realize discrimination of types of the IEEE 1394 devices, wherein specific IDs realize distinction between IEEE 1394 devices belonging to the same type.

There are provided two methods for communications between IEEE 1394 devices connected by the IEEE 1394 serial bus, namely, a first method using asynchronous packets and a second method using stream packets. Concrete examples of those methods will be described with reference to FIGS. 22 and 23 respectively.

FIG. 22 shows an example of a format of an asynchronous packet, which is configured by multiple fields. Herein, a transmission destination bus ID field F100 stores bus IDs which are respectively allocated to buses connected with IEEE 1394 devices each corresponding to a transmission destination. If communication is made by a single bus in a data network, the bus ID can be set to '3FFh'. In addition, a transmission destination physical ID field F101 stores physical IDs that are allocated to the IEEE 1394 devices each corresponding to a transmission destination. A tcode field F102 stores a value that is defined in advance by the IEEE 1394 standard to represent a type of the asynchronous packet. A transmission source ID field F103 stores 16-bit data wherein high-order ten bits represent bus IDs of buses connected with IEEE 1394 devices each corresponding to a transmission source while a low-order six bits represent physical IDs of the IEEE 1394 devices. Further, a data field F104 stores transmission information.

Generally speaking, procedures of communication using asynchronous packets are classified into three types of transactions, namely, read transaction provided for the purpose of reading stored content of a CSR space of an IEEE 1394 device corresponding to a transmission destination, write transaction for the purpose of writing data to the IEEE 1394 device and lock transaction. Herein, the read transaction uses two types of asynchronous packets, namely, a read request packet and a read response packet. Similarly, the write transaction uses two types of asynchronous packets, namely, a write request packet and a write response packet. In addition, the lock transaction uses two types of asynchronous packets, namely, a lock request packet and a lock response packet.

FIG. 23 shows an example of a format of a stream packet. Before starting communication using stream packets, lock transaction is carried out in advance to secure a bandwidth and a channel for use in communication. A number of the secured channel is stored in a channel field F110 of a stream packet to be transmitted to a certain node. Based on the channel number stored in the channel field F110, the node makes a decision whether to receive the stream packet or not. In communication using stream packets between IEEE 1394 devices interconnected by buses, it is necessary to perform prescribed controls on communication paths for interconnections between IEEE 1394 devices, as follows:

In the communication, bandwidths and channels are secured according to needs, so that numbers of the secured channels are communicated to the IEEE 1394 devices that transmit and receive the stream packets to establish communication paths (or links). At completion of the communication, the secured bandwidths and channels are released to disconnect the communication paths.

Japanese Unexamined Patent Publication No. Hei 11-205363 discloses an example of a conventional communication path control method in which a device controller is provided for the purpose of controlling IEEE 1394 devices for performing transmission and reception of isochronous stream packets. Herein, the device controller is used to establish or disconnect communication paths between the IEEE 1394 devices which are controlled subjects.

FIG. 24 shows an outline configuration of the conventional device controller. Namely, a device controller 100 is configured by a device control block 101, a device information management table storage block 102, a serial bus management block 103, an IEEE 1394 transaction layer 104, an IEEE 1394 link layer 105 and an IEEE 1394 physical layer 106.

The device controller 100 is used to control IEEE 1394 devices, having device information, which are connected with buses. Prior to controlling the IEEE 1394 devices, the device information management table storage block 102 stores the device information, which is collected from the IEEE 1394 devices, and management information for management of communication paths being established between the IEEE 1394 devices. As examples of the IEEE 1394 devices that perform transmission and reception of isochronous streams packets, it is possible to list audio/visual devices (or AV devices) that install master plug registers (referred to as "MPR") and plug control registers (referred to as "PCR") based on the known standard of IEC61883 (where "IEC" represents "International Electrotechnical Commission"). The PCRs are classified into two types, namely, "output PCR (referred to as "oPCR")" used for transmission of packets and "input PRC (referred to as "iPCR")" used for reception of packets.

FIGS. 25A and 25B show formats of the aforementioned PCRs. Namely, FIG. 25A shows a format for oPCR, while FIG. 25B shows a format for iPCR.

As shown in FIG. 25A, the oPCR is configured by eight fields which are denoted by reference symbols F120 to F127 respectively. Herein, the field F124 stores channel numbers over which isochronous stream packets are to be output. The field 122 corresponds to a point-to-point connection counter whose value corresponds to a number of point-to-point connections being established for the oPCR based on the IEC61883 standard. If connections being established using the oPCR correspond to broadcast connections defined by the IEC61883 standard, a broadcast connection counter of the field F121 is set to '1'.

As shown in FIG. 25B, the iPCR is configured by six fields which are denoted by reference symbols F130 to F135 respectively.

The field F134 stores channel numbers over which isochronous stream packets are to be received. The field F132 corresponds to a point-to-point connection counter whose value corresponds to a number of point-to-point connections being established for the iPCR based on the IEC61883 standard. If connections being established using the iPCR correspond to broadcast connections defined by the EC61883 standard, a broadcast connection counter of the field F131 is set to '1'.

Accessing to each of the fields of the oPCR and iPCR is made using lock transaction. Communication paths are established or disconnected in order to perform or stop communication using isochronous stream packets between audio/visual devices. Accompanied with establishment and disconnection of the communication paths, it is necessary to adequately set the aforementioned oPCR and iPCR. Next, a concrete description will be given with respect to establishment and disconnection of communication paths between audio/visual device as well as setting of those PCRs.

FIG. 26 shows conventional procedures for establishment of a point-to-point connection between audio/visual devices. In order to establish a point-to-point connection between the audio/visual devices, a device controller firstly secures a bandwidth and a channel from an isochronous resource manager (referred to as "IRM") which is connected with a bus based on the IEEE 1394 standard in step S100. In step S101, a decision is made as to whether the device controller succeeds to secure the bandwidth and channel or not. If the device controller fails to secure the bandwidth and channel, in other words, if a decision result of step S101 is "NO", a flow ends without proceeding to other steps.

If the device controller succeeds to secure the bandwidth and channel, in other words, if a decision result of step S101 is "YES", the flow proceeds to step S102 in which fields are set with respect to an oPCR of a transmitting node for transmitting isochronous stream packets and an iPCR of a receiving node for receiving the isochronous stream packets. For example, the secured channel number is set to the field F124 of the oPCR shown in FIG. 25A and field F134 of the iPCR shown in FIG. 25B. In addition, the point-to-point counters of the fields F122 and F132 are both set to '1'.

When the aforementioned setting process of step S102 is performed on the oPCR of the transmission node and iPCR of the receiving node, the flow proceeds to step S103 in which a decision is made as to whether the setting is completed successfully on the both PCRs or not. If the step S103 determines that the setting is completed successfully on the both PCRs, in other words, if a decision result of step S103 is "YES", the procedures for establishment of the point-to-point connection are ended. If the setting is not completed successfully on the both PCRs, in other words, if a decision result of step S103 is "NO", the flow proceeds to step S104 that discriminates whether the setting fails on the both PCRs or not.

If the step S104 determines that the setting fails on the both PCRs, in other words, if a decision result of step S104 is "YES", the flow proceeds to step S105 to perform a release process to release the secured bandwidth and channel, which are secured in the foregoing step S100, to the IRM. Then, the procedures for establishment of the point-to-point connection is ended. If the step S104 determines that the setting fails on either the oPCR of the transmitting node or iPCR of the receiving node, in other words, if a decision result of step S104 is "NO", the flow proceeds to step S106 to perform a disconnection process to disconnect the point-to-point connection. Then, the procedures are ended.

FIG. 27 shows procedures for addition of a new receiving node in connection with a point-to-point connection which is established in advance. In order to add a new receiving node in connection with a point-to-point connection which is established in advance, a flow firstly proceeds to step S110 to obtain a channel number which is described in a field F124 (see FIG. 25A) of an oPCR of a transmitting node. Then, the flow proceeds to step S111 in which setting is made with respect to an iPCR of the new receiving note to be added and the oPCR of the transmitting node. Before adding the new receiving node, a point-to-point connection counter of a field F122 of the oPCR of the transmitting node is set to a certain value. To respond to addition of the new receiving node, such a value of the point-to-point connection counter is incremeted by '1'. In addition, the channel number which is obtained in the foregoing step S110 is set to a field F134 of the iPCR of the new receiving node. Further, a point-to-point connection counter of a field F132 of the iPCR of the receiving node is set to '1'.

After completion of the aforementioned step S111, the flow proceeds to step S112 in which a decision is made as to whether the setting is completed successfully with respect to the oPCR of the transmitting node and iPCR of the new receiving node or not. If the step S112 determines that the setting is completed successfully with respect to both of the oPCR of the transmitting node and iPCR of the new receiving node, in other words, if a decision result of step S112 is "YES", the procedures are ended. If a decision result of step S112 is "NO", the flow proceeds to step S113 in which a decision is made as to whether the setting fails on both of the oPCR of the transmitting node and iPCR of the new receiving node. If the step S113 determines that the setting fails on both of them, in other words, if a decision result of step S113 is "YES", the procedures are ended. If a decision result of step S113 is "NO", namely, if the step S113 determines that the setting fails on either the oPCR of the transmitting node or iPCR of the new receiving node, the flow proceeds to step S114 to perform a prescribed process.

Next, details of the step S114 will be described with reference to FIG. 28, which shows procedures for disconnection of the point-to-point connection which is established. In order to disconnect the point-to-point connection being previously established between the transmitting node and receiving node, a flow proceeds to step S120 to perform re-setting of the oPCR of the transmitting node and iPCR of the receiving node. Namely, the point-to-point connection counter of the field F122 (see FIG. 25A) is decremented by '1' while the point-to-point connection counter of the field F132 (see FIG. 25B) is decremented by '1'. Then, the flow proceeds to step S121 in which a decision is made as to whether the point-to-point connection counter of the field F122 of the oPCR of the transmitting node is set at '0' or not. If a decision result of step S121 is "YES", namely, if the step S121 determines that the point-to-point connection counter of the field F122 of the oPCR of the transmitting node is now set to '0', the flow proceeds to step S122 to perform a prescribed process. If a decision result of step S121 is "NO", namely, if the point-to-point connection counter of the field F122 of the oPCR of the transmitting node is not set at '0', the procedures for disconnection of the point-to-point connection are ended.

Meanwhile, engineers develop and study IEEE 1394 bridges by which multiple buses are mutually interconnected together to allow transmission of packets between different buses. By using the IEEE 1394 bridges, it is possible to increase data networks in scale and data transfer efficiency on the basis of the IEEE 1394 standard. Practically, the IEEE P1394.1 committee works on standardization of the IEEE 1394 bridges. The IEEE 1394 bridges have multiple portals and internal switching structures for exchange of packets between portals, wherein the portals are connected with different buses respectively.

FIG. 29 shows an outline configuration of an IEEE 1394 bridge. Namely, an IEEE 1394 bridge 110 is configured by multiple portals 111a, 111b, 111c and an internal switching device 112. The portals 111a, 111b and 111c are respectively connected with buses 113a, 113b and 113c. Normally, each of the portals 111a, 111b, 111c acts as an IEEE 1394 device on each of the buses 113a, 113b, 113c. When receiving packets to be delivered from one bus to another, each portal sends the received packets to the internal switching device 112. The internal switching device 112 passes the packets sent from one portal to another portal which is appropriate. Then, the portal receives the packets being passed from the internal switching device 112 and sends them onto its own bus.

Thus, a data network can be configured using multiple buses which are interconnected together by means of the IEEE 1394 bridge 110. Such a data network copes with bus reset that occurs on a certain bus within the multiple buses. That is, initialization and reallocation of a physical ID is performed only on the bus on which the bus reset occurs, whereas other buses which are connected together by way of the IEEE 1394 bridge do not recognize occurrence of the bus reset. For this reason, the other buses are capable of continuing communications without interruption, regardless of occurrence of the bus reset on the bus.

The IEEE 1394 bridge 110 has a function to select specific packets from among packets received by a certain portal to transfer them onto a different bus. Next, a concrete description will be given with respect to a transfer method of asynchronous packet stream based on the IEEE P1394.1 draft standard issued by the IEEE P1394.1 committee.

Upon receipt of an asynchronous packet, the IEEE 1394 bridge 110 extracts a transmission destination bus ID of a field F100 shown in FIG. 22. With reference to transfer information stored in advance, the IEEE 1394 bridge 110 makes a decision whether to output the received asynchronous packet to the internal switching structure. As a storing form of the transfer information, it is possible to list a routing map that is realized by bit strings of 1023 bits, for example. Setting of the routine map is made such that in order to transfer an asynchronous packet whose field F100 represents the transmission destination bus ID is set to 'n', bit n+1 in a high order is set to '1'.

FIG. 30 shows a routing map for portals of a data network that is configured using four networks being interconnected together by means of three IEEE 1394 bridges, for example. Herein, total 1023 bits are arranged in line, wherein bits 1, 2 and 4 in a high order are all set to '1'. FIG. 31 shows a format for STREAM_CONTROL entry (referred to as "SCR") used for transfer of stream packets. Each portal installs maximally sixty four sets of the SCR, each of which is serially numbered.

Suppose that a portal receives stream packets from its own bus over a prescribed channel with reference to the SCR shown in FIG. 31. Herein, an "st" field F140 is related to determination whether to output the stream packets, which are received over the channel whose number is stored in a "channel" field F141, to the internal switching device 112 or determination whether to output the stream packets onto the own bus connected with the present portal. Herein, former one is called a listener operation, while latter one is called a talker operation. Namely, if the st field F140 is set to '1h' in hexadecimal notation, the listener operation is performed with respect to stream packets using the channel whose number is stored in the channel field F141. If it is set to '2h', the talker operation is performed with respect to stream packets being passed from the internal switching device 112. Incidentally, setting of the SCR is invalidated when the st field F140 is set to '0h'.

Suppose that a portal receives stream packets from its own bus connected thereto. The channel field F141 stores a channel number used by stream packets which should be transferred to a different bus within the stream packets received from the own bus of the portal. Suppose that a portal sends stream packets, being passed thereto from the internal switching device 112, onto its own bus connected thereto. In that case, the channel field F141 stores a channel number which is to be described in the channel field F110 (see FIG. 23) of the stream packet. An i field F141 represents whether stream packets to be transferred correspond to isochronous stream packets or asynchronous stream packets.

When a portal receives a stream packet from its own bus connected thereto, it extracts a value described in a channel field F110 of the received stream packet. The extracted value is checked with reference to all of SCRs installed in the portal. For example, if an st field F141 is set to '1h' so that there exists an SCR in which a channel field F141 is set to the extracted value, the portal performs a listener operation to output the received stream packet to the internal switching device 112. Suppose that the channel number is set to 'n' (where "n" is a natural number arbitrarily selected), which designates an SCR[n] within all SCRs installed in each portal. Accompanied with the aforementioned listener operation, the internal switching device 112 selects an appropriate portal to which the stream packet input thereto is being transferred. So, the selected portal receives from the internal switching device 112 the stream packet to correspondingly refer to an SCR[n] that has a same number of the SCR of the foregoing portal originally receiving the stream packet from its own bus. For example, if an st field F140 of the SCR[n] is set to '2h' indicating a talker operation, a value described in a channel field F141 of the SCR[n] is set in the field F110 of the stream packet being transferred from the internal switching device 112. Then, the selected portal transmits the stream packet onto its own bus connected thereto.

By the way, there is a problem in that the conventional communication path control method cannot be applied to data networks which are configured using multiple buses being mutually interconnected by means of IEEE 1394 bridges. Reasons will be described below.

That is, the conventional communication path control method lacks procedures for examination (or checking) of buses which are used as communication paths being established between IEEE 1394 devices. In addition, the conventional communication path control method also lacks procedures for securing and releasing resources of other buses which differ from own buses specifically connected to the IEEE 1394 devices. Further, the conventional communication path control method is incapable of detecting bus resets on different buses which differ from the own bus specifically connected to the IEEE 1394 devices. Furthermore, it is incapable of detecting variations of topology.

SUMMARY OF THE INVENTION

It is an object of the invention to provide a communication path control method that enables serial bidirectional communication using packets by way of high-speed IEEE 1394 serial buses.

It is another object of the invention to provide a communication path control method applicable to data networks that are configured using buses, which are capable of connecting together multiple IEEE 1394 devices such as audio/visual devices and which are mutually interconnected together by means of bridges. Concretely speaking, this invention provides a communication path control method, a device controller and a bridge which are applied to a data network to allow establishment and disconnection of communication paths between the IEEE 1394 devices as well as re-establishment of communication paths in response to bus resets.

Namely, this invention provides a communication path control system for use in a data network which is configured by a number of buses each of which installs at least one node as an isochronous resource manager (IRM) based on the IEEE 1394 standard. Adjacent buses are interconnected together by means of a bridge that consists of at least two portals for interconnection. Each portal has a connection counter for counting a number of receiving nodes each of which receives stream packets being transmitted thereto from a transmitting node by way of each portal by itself. At least one device controller (namely, an IEEE 1394 device) is provided for use in establishment and disconnection of communication paths and is connected with one of the buses in the data network. For establishment of a communication path extending from the transmitting node to a specific receiving node in the data network, the device controller specifies all portals that lie in the communication path to request each of them to increment a value of the connection counter by '1'. For disconnection of the communication path, the device controller requests each of the specified portals to decrement a value of the connection counter by '1'. More specifically, each of the portals stores a communication path management table containing the connection counter whose value is incremented or decremented to establish or disconnect the communication path. In addition, the device controller stores a communication path management table that describes resources in connection with a connection counter with respect to each of buses that construct parts of the communication path being established, so that the device controller proceeds to establishment of a new communication path by increasing the connection counter or the device controller proceeds to disconnection of the communication path by decreasing the connection counter. Incidentally, the resources describe at least a bandwidth and a channel number being used for communication over the communication path.

At occurrence of bus reset on a specific bus within the buses corresponding to the communication path, a specific portal connected with the specific bus proceeds to initialization of the specific bus. Then, the device controller proceeds to re-securement of the resources which are previously secured before occurrence of the bus reset if the transmitting node and receiving node remain being connected in the data network after occurrence of the bus reset. If the transmitting node or receiving node is disconnected from the data network after occurrence of the bus reset, the device controller proceeds to disconnection of the communication path.

BRIEF DESCRIPTION OF THE DRAWINGS

These and other objects, aspects and embodiments of the present invention will be described in more detail with reference to the following drawing figures, of which:

FIG. 14B is a flowchart showing a second pard of the portal process being executed by the portal 7a;

FIG. 21 shows an example of a communication path management table whose content is being updated;

DESCRIPTION OF THE PREFERRED EMBODIMENTS

This invention will be described in further detail by way of examples with reference to the accompanying drawings.

Figure 1:
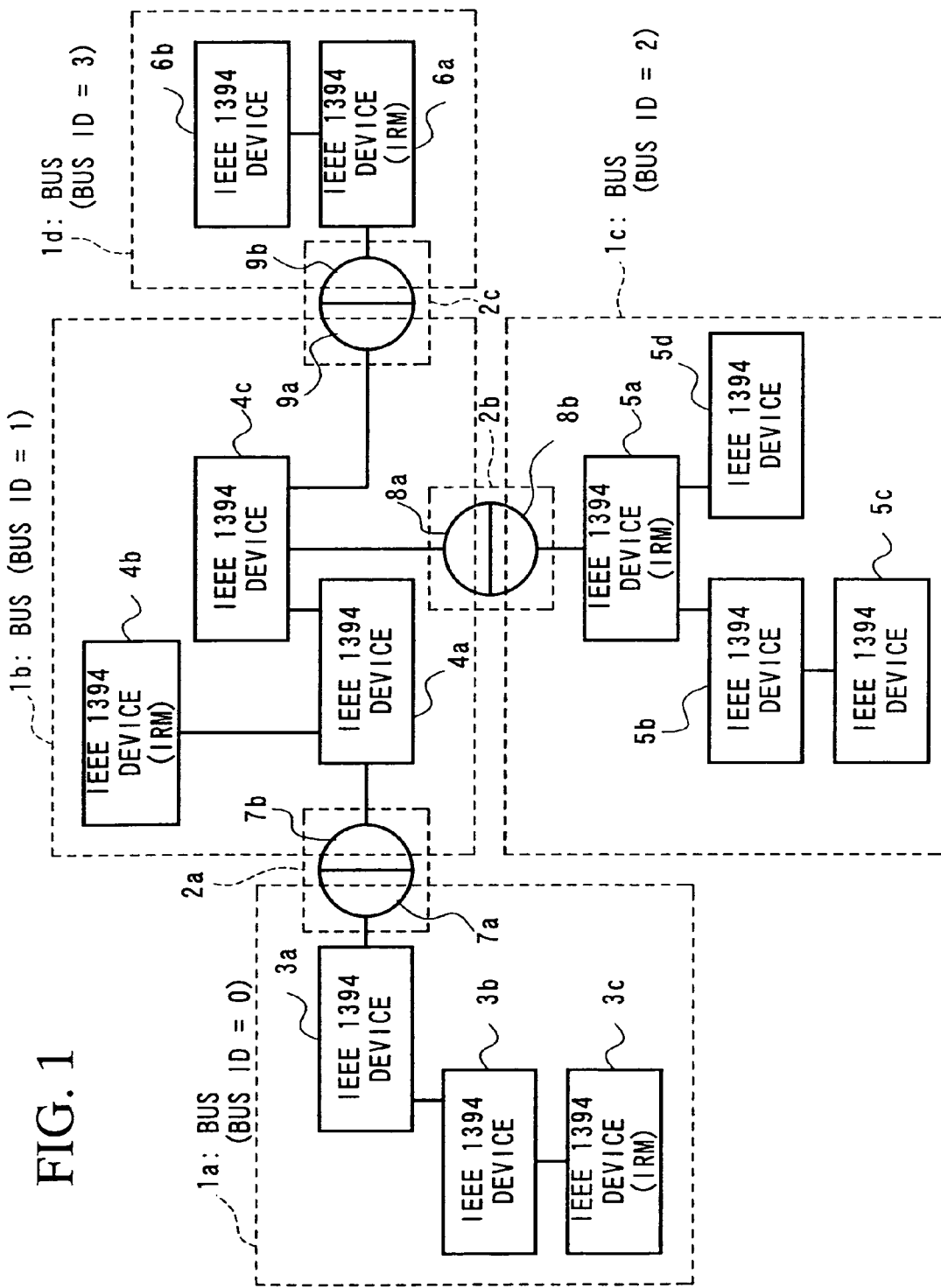
FIG. 1 is a block diagram showing a configuration of a data network that is configured using four buses being interconnected together by means of three bridges in accordance with a preferred embodiment of the invention.

FIG. 1 shows a configuration of a data network that is configured using four buses 1a to 1d which are interconnected together by means of three IEEE 1394 bridges 2a to 2c each having two portals in accordance with a preferred embodiment of the invention. That is, the buses 1a and 1b are interconnected together by the IEEE 1394 bridge 2a; the buses 1b and 1c are interconnected together by the IEEE 1394 bridge 2b; the buses 1b and 1d are interconnected together by the IEEE 1394 bridge 2c.

Figure 24:
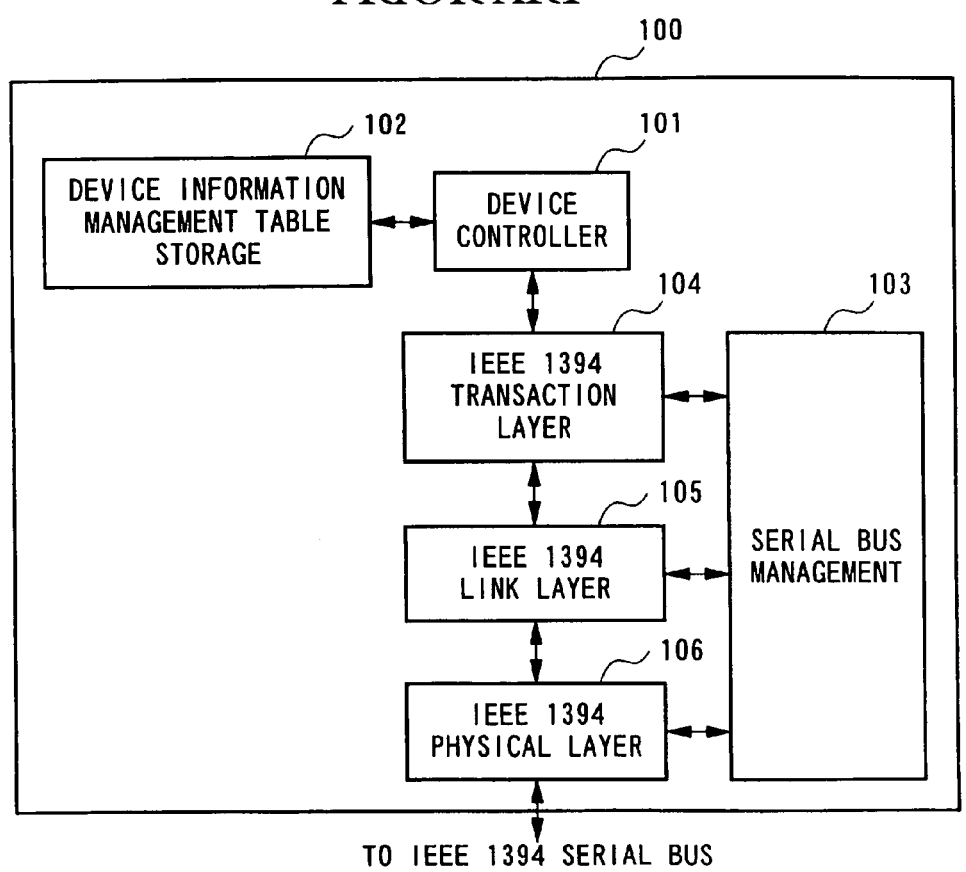
FIG. 24 is a block diagram showing an outline configuration of a device controller conventionally employed in a data network using an IEEE 1394 serial bus.
Figure 25A:
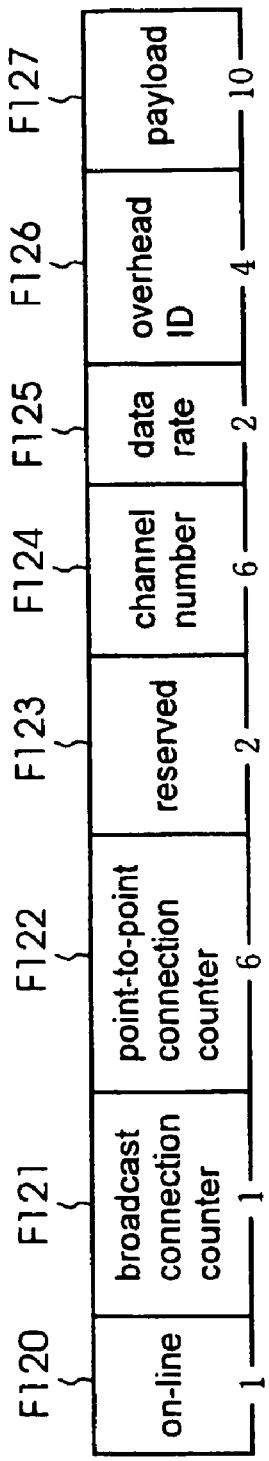
FIG. 25A shows a format of an output plug control register (oPCR)
Figure 25B:
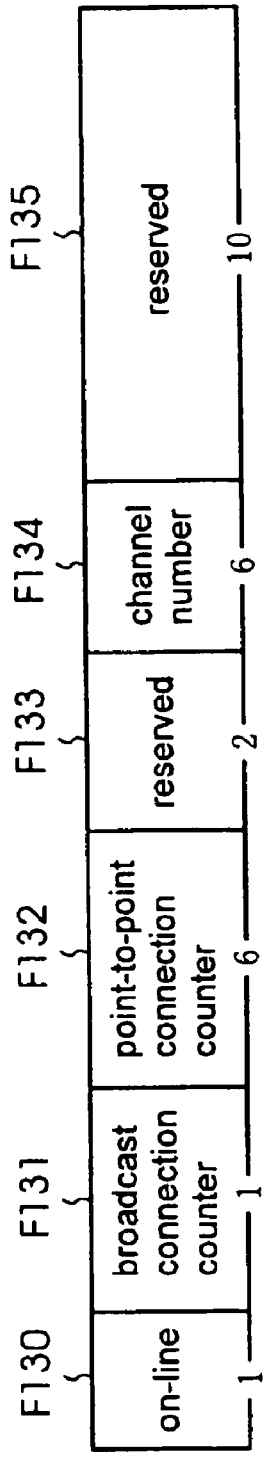
FIG. 25B shows a format of an input plug control register (iPCR)
Figure 26:
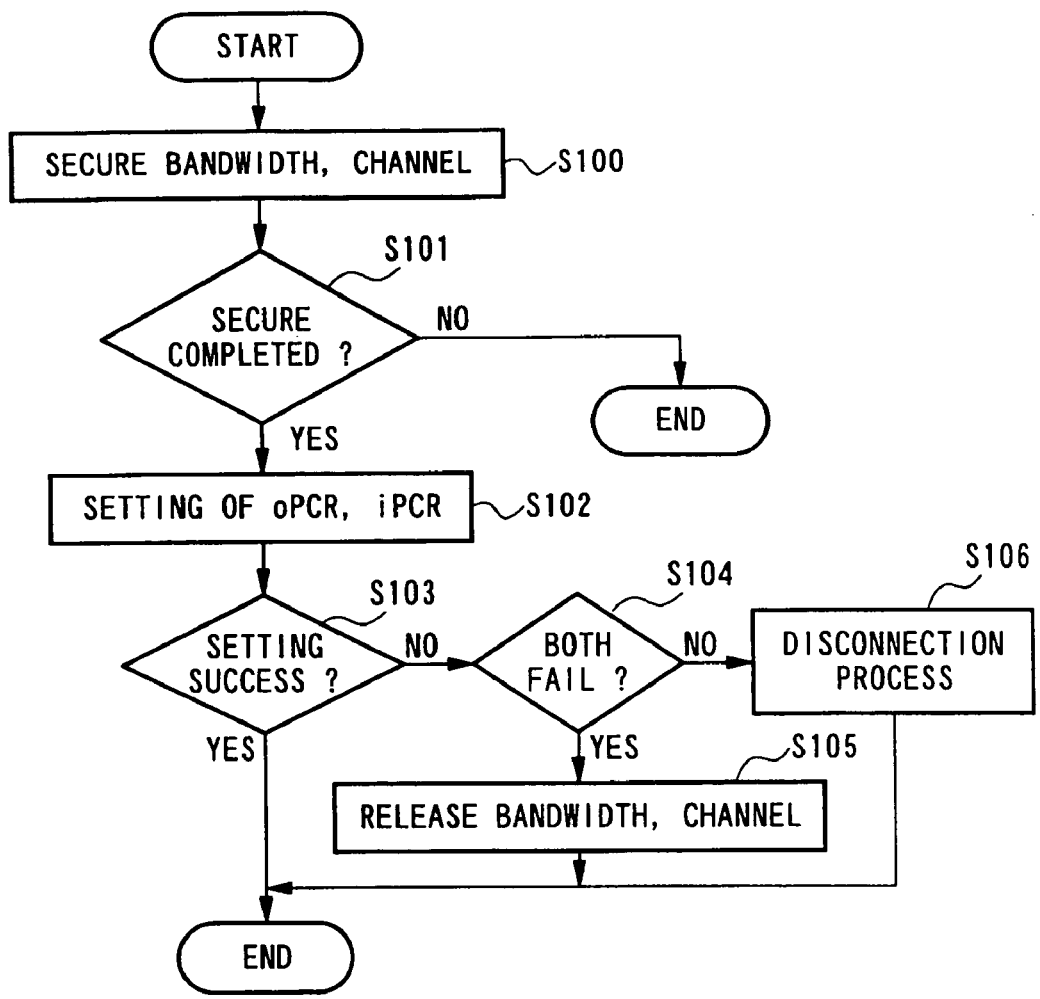
FIG. 26 is a flowchart showing procedures for establishment of a point-to-point connection between IEEE-1394 devices based on the IEEE 1394 standard.
Figure 27:
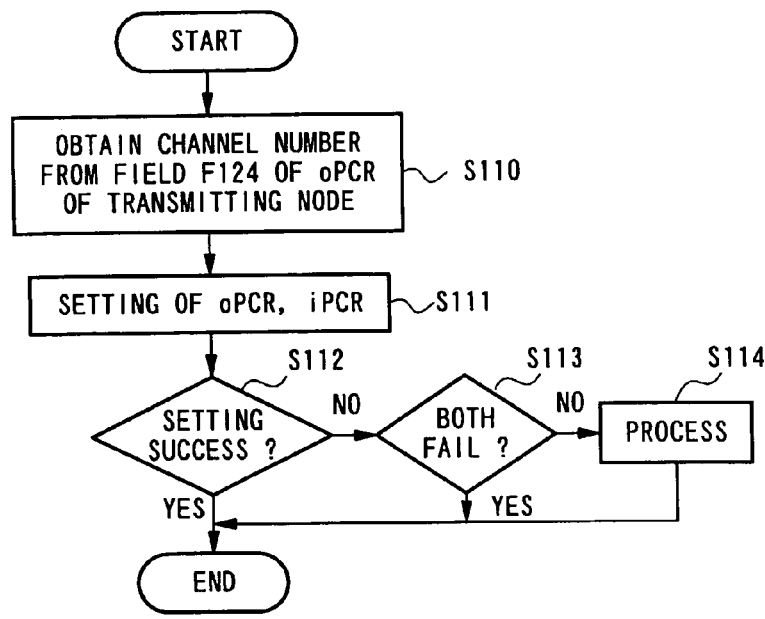
FIG. 27 is a flowchart showing procedures for addition of a new receiving node in connection with a point-to-point connection which is established in advance.
Figure 28:
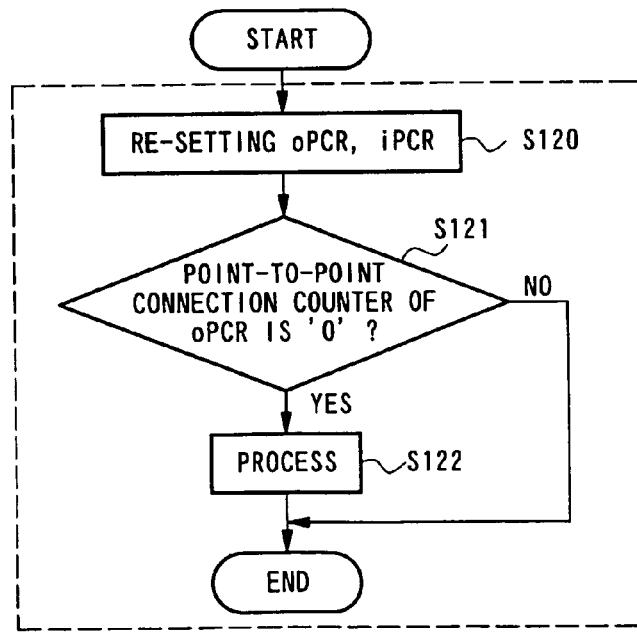
FIG. 28 is a flowchart showing procedures for disconnection of the point-to-point connection which is previously established.
Figure 29:
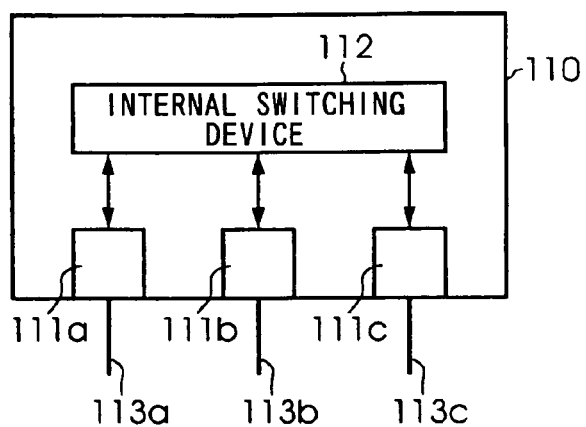
FIG. 29 is a block diagram showing an outline configuration of an IEEE 1394 bridge.
Figure 30:
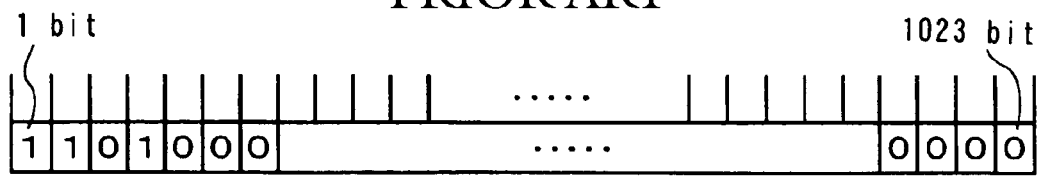
FIG. 30 shows an example of a routing map for portals in a data network that is configured using four networks being interconnected by means of three IEEE 1394 bridges.
Figure 31:
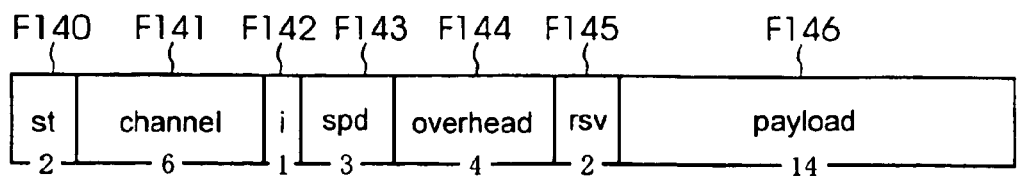
FIG. 31 shows a format for STREAM_CONTROL entry (SCR) used for transfer of stream packets.

In FIG. 1, each of the buses 1a–1d is configured using multiple IEEE 1394 devices in topology. Namely, three IEEE 1394 devices 3a, 3b, 3c are configured on the bus 1a; three IEEE 1394 devices 4a, 4b, 4c are configured on the bus 1b; four IEEE 1394 devices 5a, 5b, 5c, 5d are configured on the bus 1c; two IEEE 1394 devices 6a, 6b are configured on the bus 1d. In addition, the IEEE 1394 bridge 2a installs portals 7a, 7b; the IEEE 1394 bridge 2b installs portals 8a, 8b; the IEEE 1394 bridge 2c installs portals 9a, 9b. Each of the portals 7a, 7b, 8a, 8b, 9a, 9b has a routing map as shown in FIG. 30. For a concrete description of a connection management method of the present embodiment, the IEEE 1394 device 5d connected on the bus 1c acts as a device controller as shown in FIG. 24. That is, the IEEE 1394 device 5d acts as a node for performing management of communication paths between the IEEE 1394 devices with reference to device information data collected from the IEEE 1394 devices connected together in the data network. In addition, all of the IEEE 1394 devices 3a–3c, 4a–4c, 5a–5d and 6a install PCRs (namely, plug control registers).

[A] First Embodiment

Now, a first embodiment of this invention will be described in conjunction with some drawings. In the first embodiment, a communication path management table is provided for every stream to be transferred via each of the portals 7a, 7b, 8a, 8b, 9a, 9b.

Figure 2:
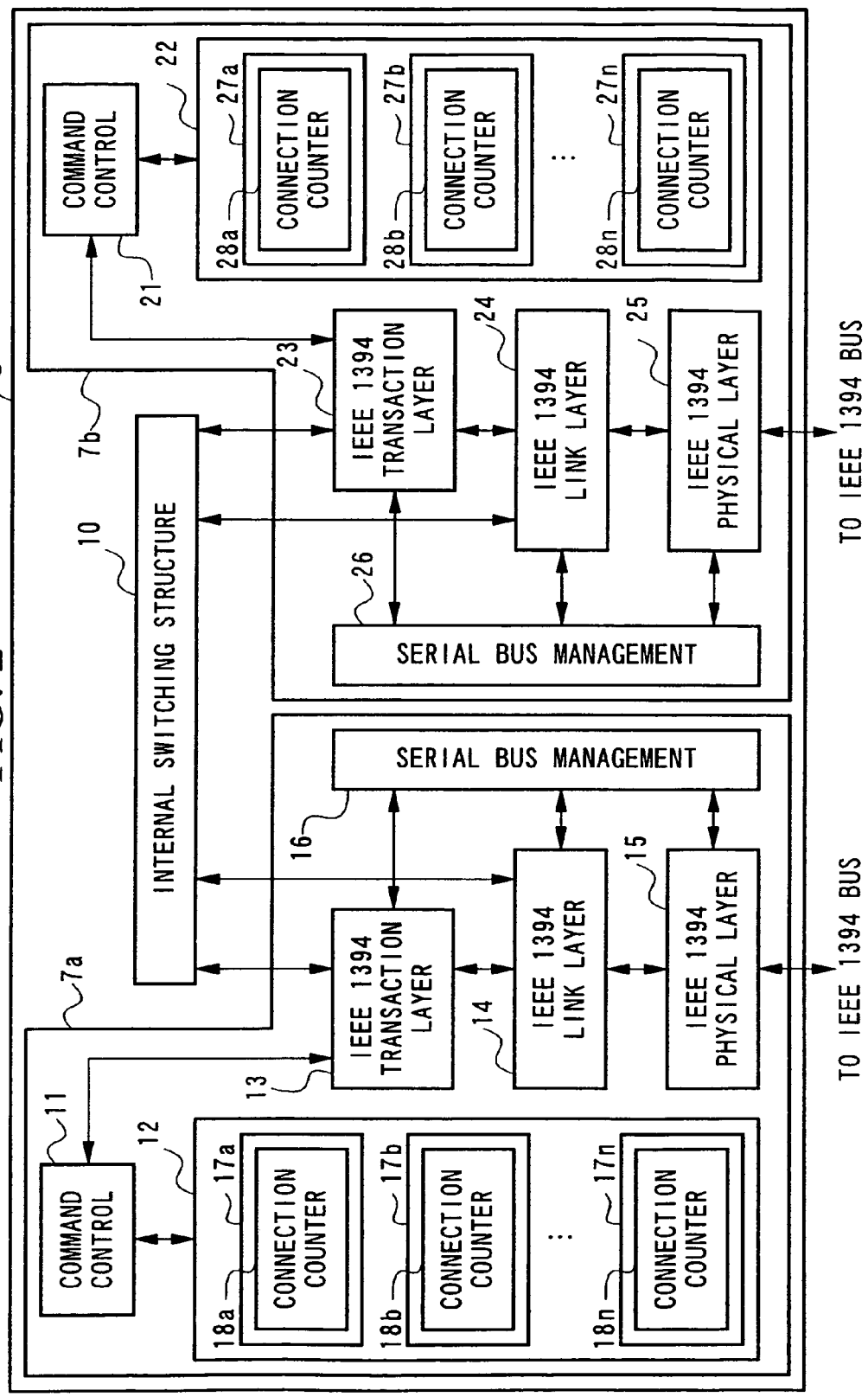
FIG. 2 is a block diagram showing an internal configuration of an IEEE 1394 bridge used for interconnection between the buses shown in FIG. 1 in accordance with a first embodiment of the invention.

FIG. 2 shows an internal configuration of the IEEE 1394 bridge 2a. The other IEEE 1394 bridges 2b, 2c have the same internal configuration of the IEEE 1394 bridge 2a, hence, the detailed description thereof will be omitted. In FIG. 2, the IEEE 1394 bridge 2a is configured using an internal switching structure 10 that interconnects together the portals 7a, 7b. The portal 7a is configured by a command control block 11, a communication path management table storage block 12, an IEEE 1394 transaction layer 13, an IEEE 1394 link layer 14, an IEEE 1394 physical layer 15 and a serial bus management block 16. The communication path management table storage block 12 provides plural communication path management tables 17a to 17n, which contain connection counters 18a to 18n respectively.

As similar to the portal 7a, the portal 7b is configured by a command control block 21, a communication path management table storage block 22, an IEEE 1394 transaction layer 23, an IEEE 1394 link layer 24, an IEEE 1394 physical layer 25 and a serial bus management block 26. The communication path management table storage block 22 provides plural communication path management tables 27a to 27n, which contain connection counters 28a to 28n respectively.

Figure 3:
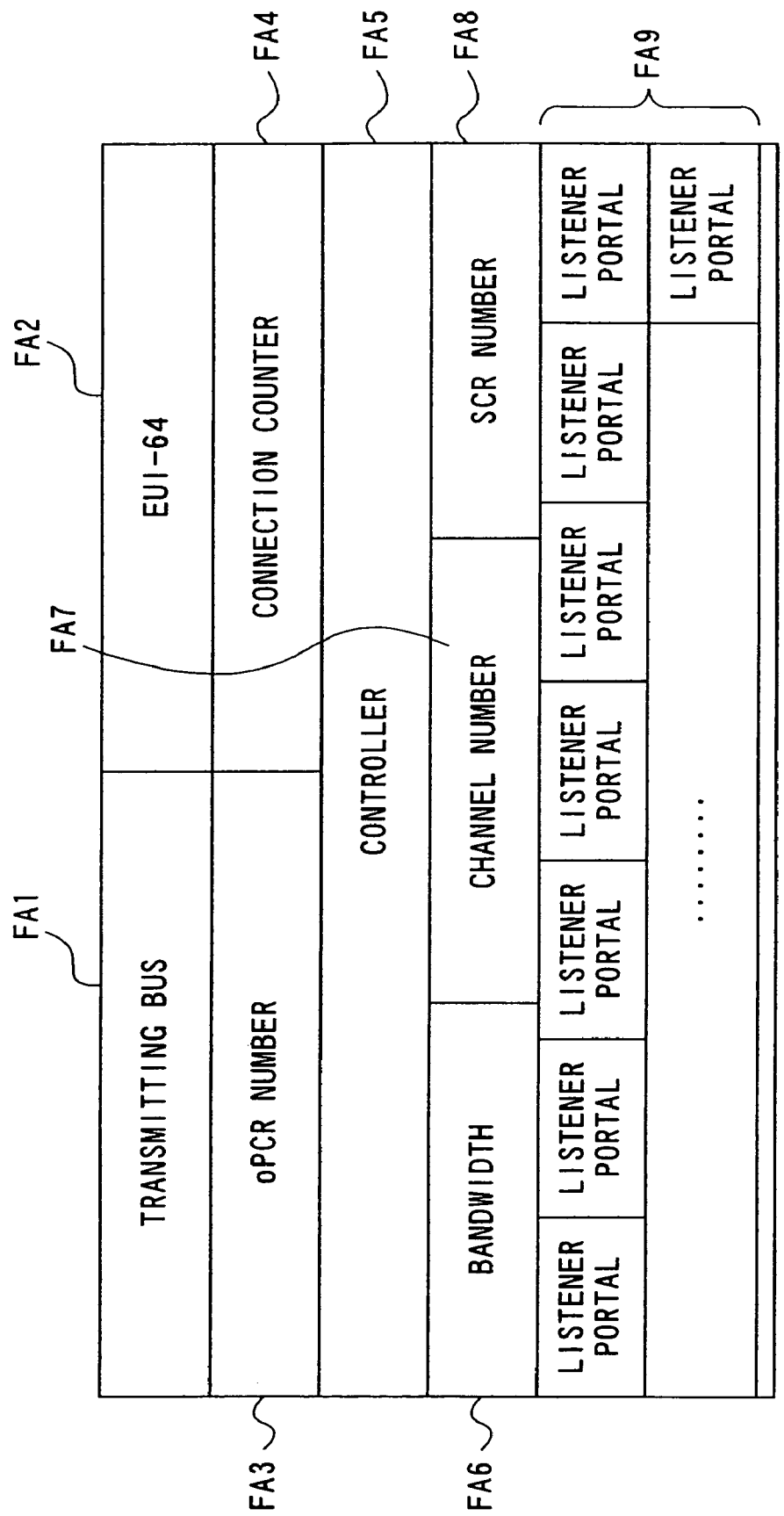
FIG. 3 shows an example of a content of a communication path management table for one stream of packets, which is stored in a talker portal for sending stream packets and a representative portal for receiving instructions regarding establishment and disconnection of a communication path.

FIG. 3 shows a concrete example of a communication path management table for one stream of packets. Namely, such a communication path management table is stored in a "talker portal" that sends stream packets onto its own bus and a "representative portal" that receives instructions regarding establishment and disconnection of a communication path from a prescribed IEEE 1394 device. In FIG. 3, a transmitting bus field F1 describes a bus ID of a bus connected with a transmitting node that transmits stream packets. An EUI-64 field FA2 describes EUI-64 information of the transmitting node. An oPCR number field FA3 describes a number of an oPCR by which the transmitting node transmits stream packets.

A connection counter field FA4 describes a number of receiving nodes each of which receives from the transmitting node, specified by the EUI-64 information described in the EUI-64 field FA2, the stream packets using the oPCR whose number is described in the oPCR number field FA3 by way of the portal. A controller field FA5 describes an node ID of an IEEE 1394 device that firstly requests establishment of a communication path.

A bandwidth field FA6 describes bandwidths being secured for communication. A channel number field FA7 describes channel numbers being secured for communication. An SCR number field FA8 describes numbers of SCRs corresponding to the channel numbers described in the channel number field FA7. The table also contains a number of listener portal fields FA9, each of which describes a physical ID of a portal that receives stream packets on a certain bus to transfer them onto an adjacent bus.

Figure 4:
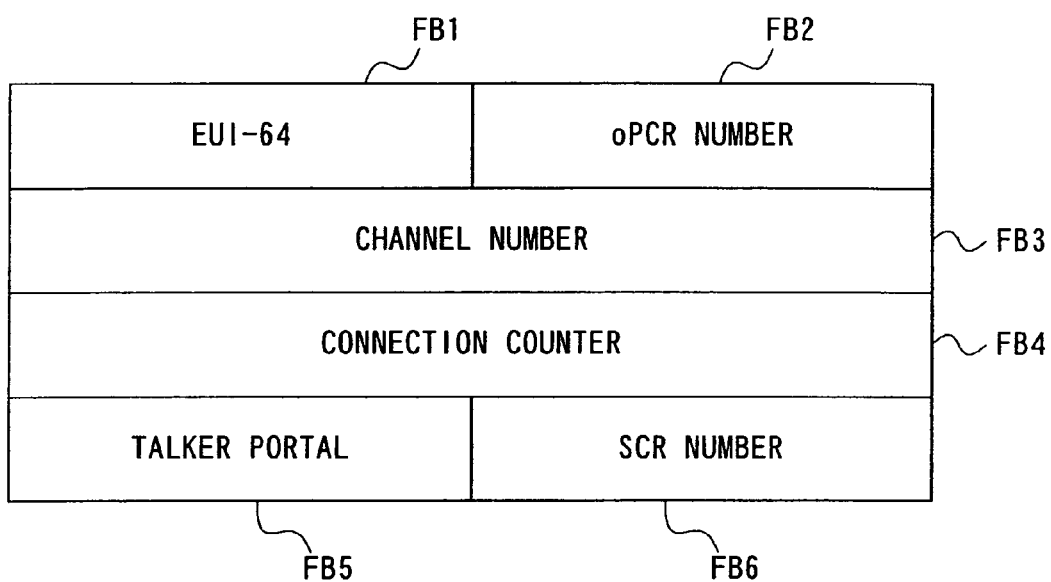
FIG. 4 shows an example of a content of a communication path management table for one stream of packets, which is stored in a listener portal for receiving stream packets.

FIG. 4 shows a concrete example of a communication path management table for one stream of packets, which is stored in a listener portal receiving stream packets from its own bus connected thereto. In FIG. 4, a talker portal field FB5 describes a physical ID of a portal that receives stream packets to transmit them onto a bus. An SCR number field FB6 describes a number of an SCR that is used when a portal receives stream packets to pass them to an adjacent portal. An EUI-64 field FB1 describes EUI-64 information of a transmitting node. An oPCR number field FB2 describes a number of an oPCR by which the transmitting node transmits stream packets. A channel number field FB3 describes a number of a channel over which stream packets are to be received.

[Establishment of Communication Path]
[Examination of Path Information, Securement of Bandwidth and Channel]

Next, a concrete description will be given with respect to processes in which the IEEE 1394 device 5d proceeds to establishment of a communication path between the IEEE 1394 devices 3b and 6b. Herein, the IEEE 1394 device 3b acts as a transmitting node, while the IEEE 1394 device 6b acts as a receiving node that receives isochronous stream packets.

With reference to device information which is collected prior to establishment of a communication path, the IEEE 1394 device 5d selects the portal 7a connected with a transmitting bus 1a of the transmitting node as a representative portal. Through examination on paths that lead the portal 7a to a receiving bus 1d of the receiving node, the IEEE 1394 device 5d issues a request to secure a bandwidth and a channel for communication. Concretely, the IEEE 1394 device 5d requests to increment an value of the connection counter field FB4 of the aforementioned communication path management table (see FIG. 4) by '1'. Specifically, prescribed commands are used for the above request, which will be described below.

In general, request commands are used for the purpose of making requests on IEEE 1394 devices or portals, while response commands are used for the purpose of making responses against received requests. Transmission of the request commands and response commands is realized by write transaction on a command area which is secured in advance in a CSR (namely, command and status register) space. To cope with the request commands and response commands, it is necessary to secure the command area in advance. The IEEE 1394 devices or portals that receive request commands and response commands obtain contents of the requests and response information by reading out written contents of the command area.

Figure 5:
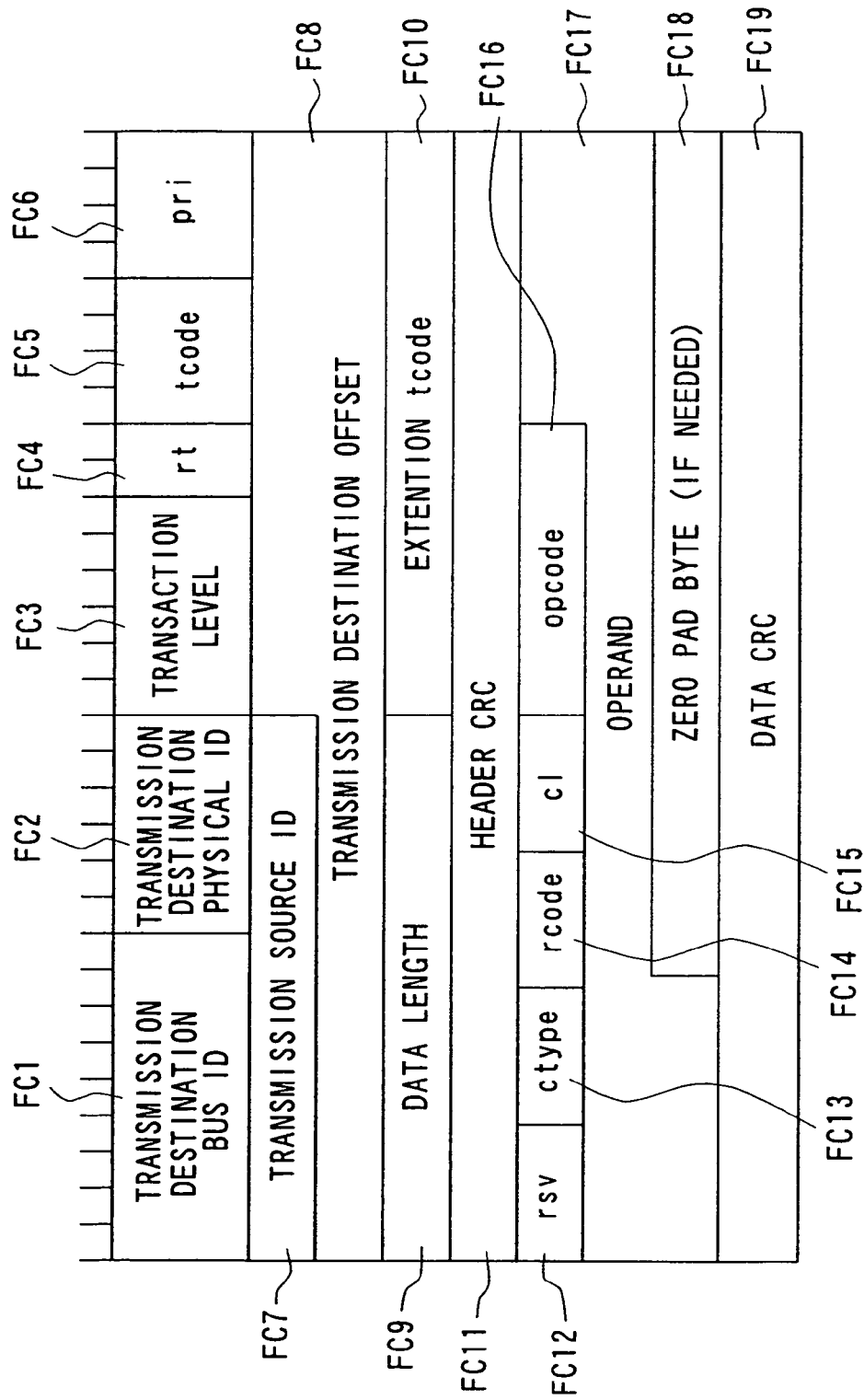
FIG. 5 shows an example of a format of a command used for request and response between an IEEE 1394 device and a portal.

FIG. 5 shows an example of a format of the aforementioned command, which is configured by plural fields FC1 to FC19. Within those fields, a tcode field FC5 describes a value representing a write request, and a transmission destination offset field FC8 describes a top address of a command area which is secured in a CSR space.

In addition, a ctype field FC13 describes a command type. Namely, the ctype field FC13 describes '1h' for representation of a request command, while it describes '0h' for representation of a response command. A rcode field FC14 is used by the response command only. There are provided several types of response commands, which are classified in response to various values described in the rcode field FC14 in hexadecimal notation, as follows:

'8h': NOT IMPLEMENTED (namely, a node receiving a request command does not support a requested process).

'9h': ACCEPTED (namely, a requested process is completed).

'Ah': REJECTED (namely, a requested process is not completed).

'Bh': INTERIM (namely, a request is accepted so that a requested process is now under progress).

Thus, each of the response commands is named and designated in response to each of the aforementioned values described in the rcode field FC14. That is, a "response command NOT IMPLEMENTED" is designated in response to '8h' being set in the rcode field FC14. Similarly, a "response command ACCEPTED" is designated in response to '9h', a "response command REJECTED" is designated in response to 'Ah', and a "response command INTERIM" is designated in response to 'Bh'. Incidentally, the IEEE 1394 device that transmits a response command INTERIM transmits another response command again after completion of a requested process.

In FIG. 5, a cl field FC15 describes a command label for discrimination of a command. Therefore, a request command and its corresponding response command should match with each other with regard to a value of the cl field FC15. An opcode field FC16 describes an operation that an IEEE 1394 device receiving a request command should perform and a status of the IEEE 1394 device that should be responded. An operand field FC17 describes information that is needed for execution of the operation designated by the opcode field FC16 as well as information that is to be contained in the response. So, the operand field FC17 stores different values in response to different commands. An IEEE 1394 device that receives a request command should transmit a response command ACCEPTED or a response command REJECTED later. Until the IEEE 1394 device transmits such a response command, the IEEE 1394 device stores a value of a cl field FC15 and a value of an opcode field FC16 being set in the received request command as well as a value of a transmission source ID field FC7 for a write request packet.

Figure 6:
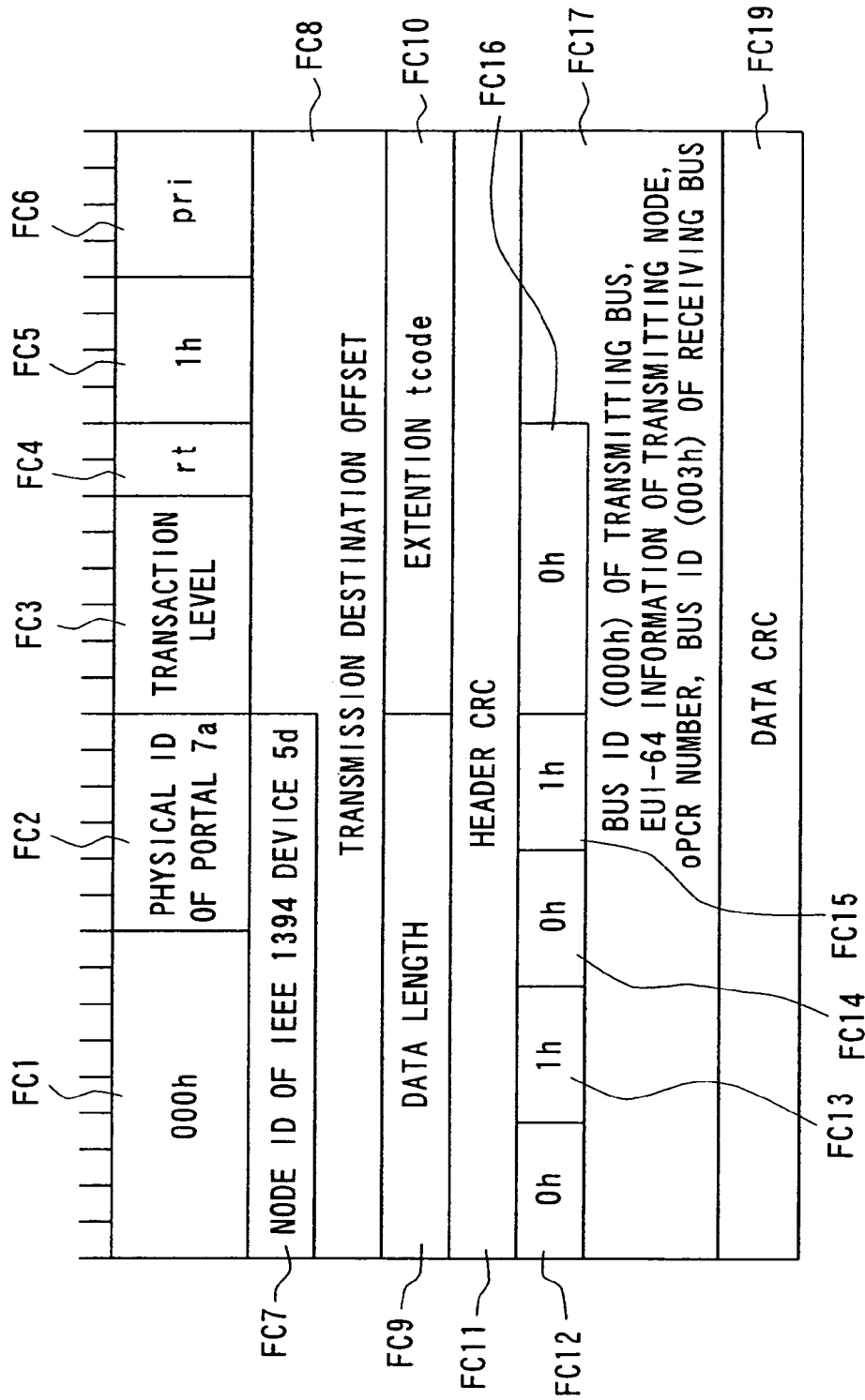
FIG. 6 shows a concrete example of a request command that is transmitted from the IEEE 1394 device to the portal.

FIG. 6 shows a concrete example of a request command that is transmitted from the aforementioned IEEE 1394 device 5d to the portal 7a in FIG. 1. Herein, a transmission destination bus ID field FC1 is set to '000h' which is a bus ID of the bus 1a connected with the portal 7a. A transmission destination physical ID field FC2 describes a physical ID of the portal 7a. A tcode field FC5 describes '1h' which represents a write request for a data block based on the IEEE 1394 standard. A transmission source ID field FC7 describes a node ID of the IEEE 1394 device 5d. A ctype field FC13 is set to '1h' indicating the request command. A cl field FC15 is set to '1h', for example. An opcode field FC16 is set to a prescribed value indicating that the request command requests establishment of a communication path extending from a transmitting bus to a receiving bus. For example, the opcode field FC16 is set to '0h'. An operand field FC17 describes various pieces of information, namely, a bus ID of the transmitting bus, EUI-64 information of a transmitting node, a number of an oPCR to be used, a bus ID '003h' of the receiving bus and a bandwidth to be secured.

Figure 7:
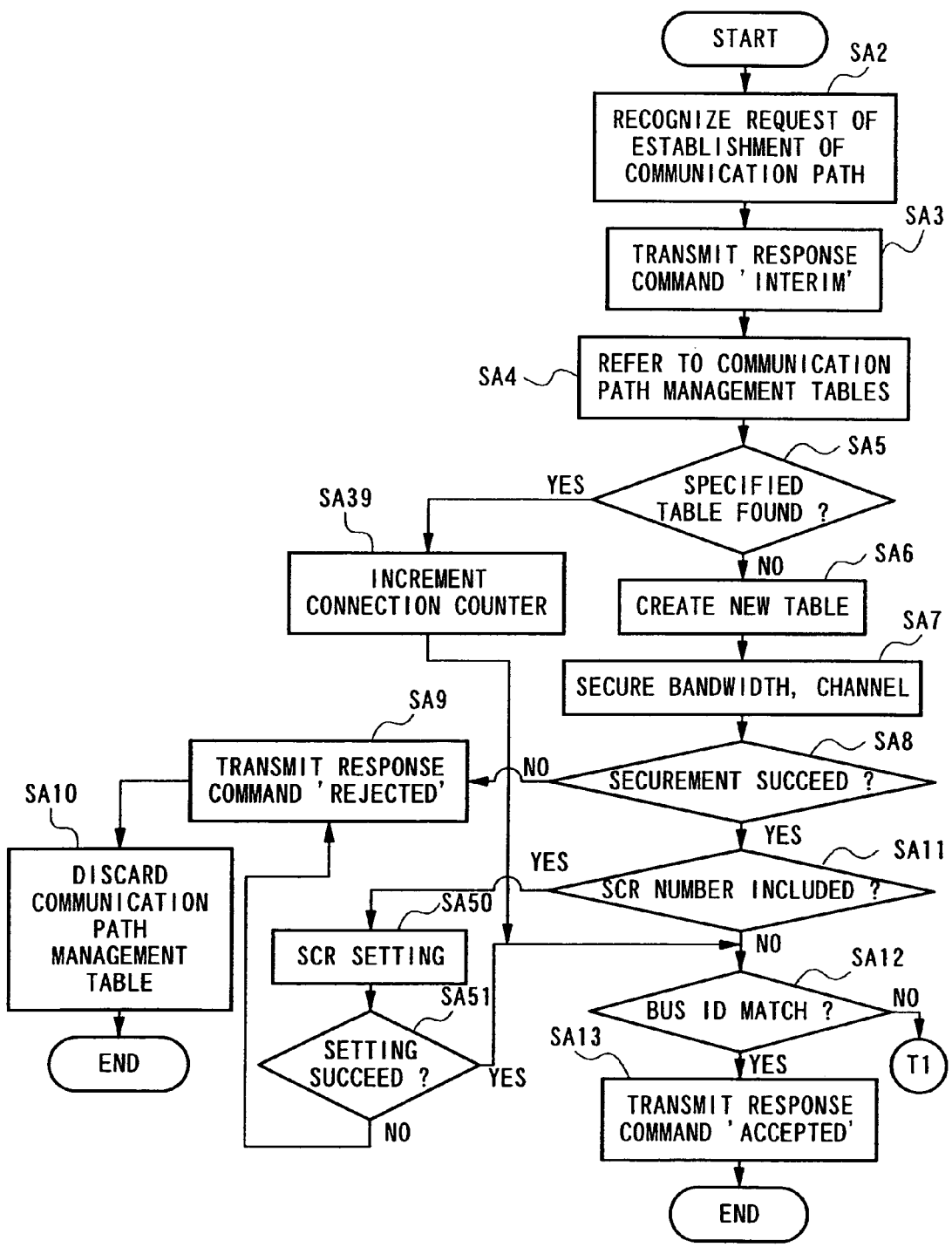
FIG. 7 is a flowchart showing a first part of a portal process for establishment of communication paths using portals between IEEE 1394 devices via different buses.
Figure 8:
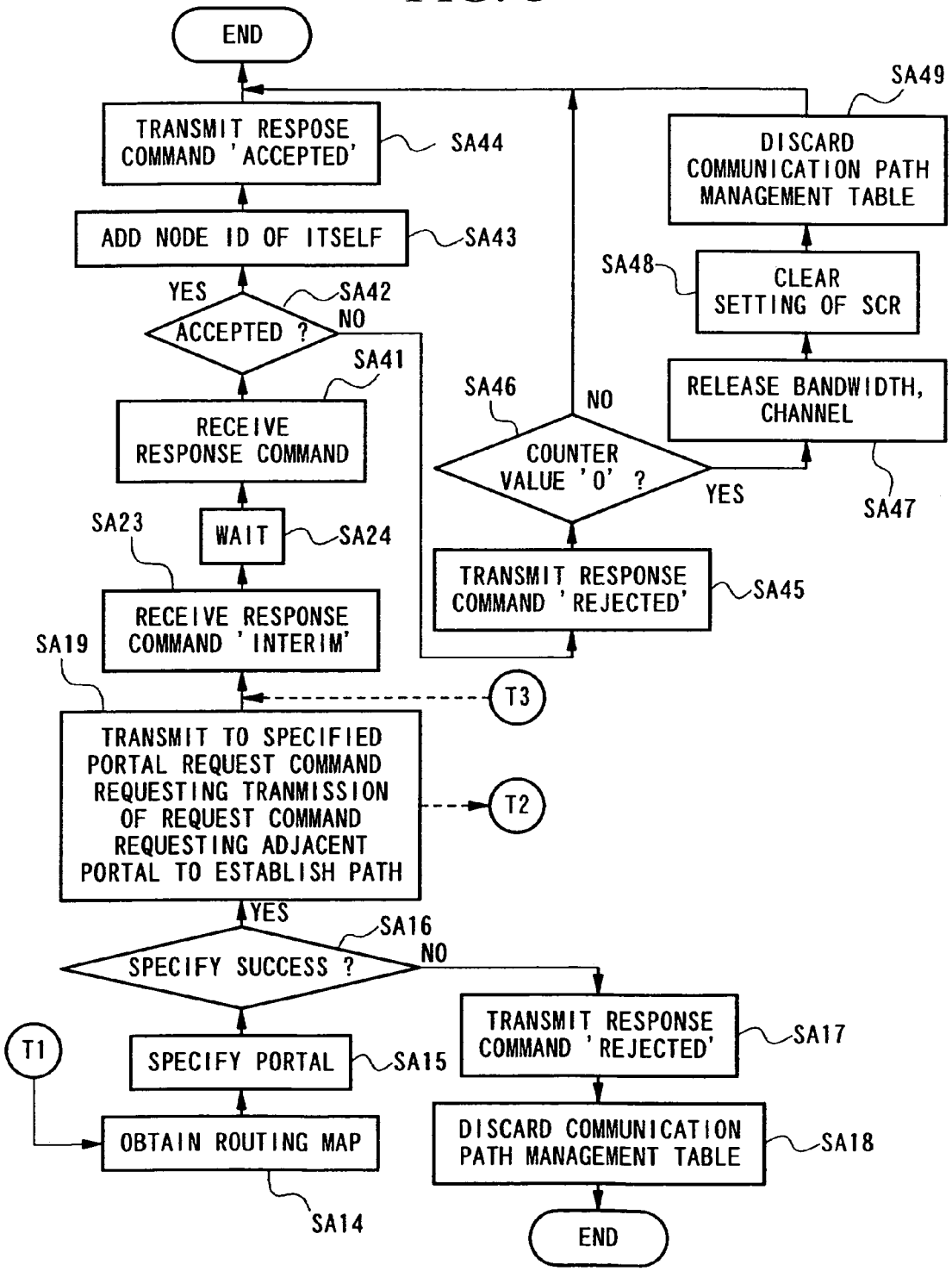
FIG. 8 is a flowchart showing a second part of the portal process for establishment of communication paths.
Figure 9:
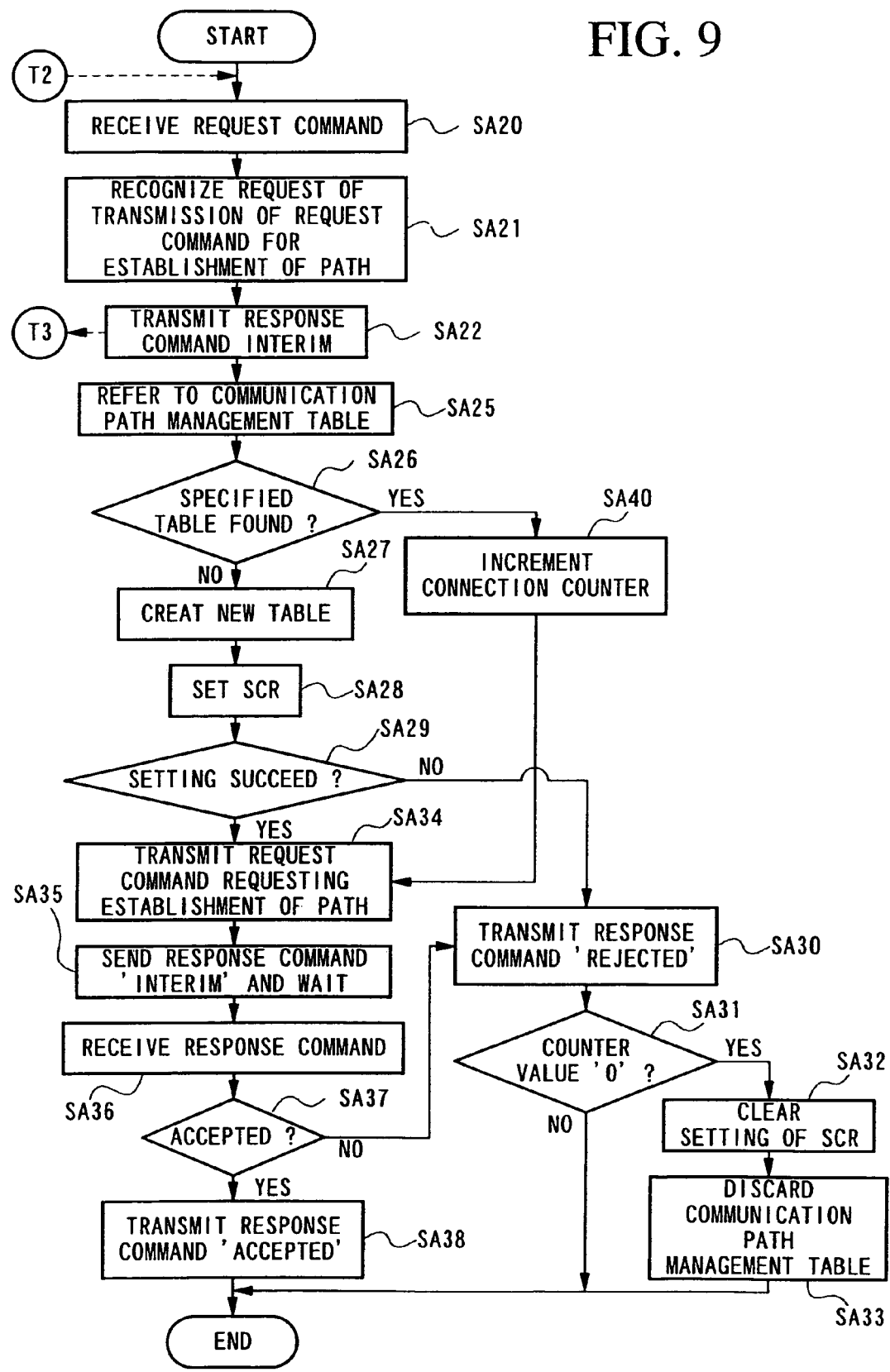
FIG. 9 is a flowchart showing a third part of the portal process for establishment of communication paths.

FIGS. 7 to 9 show a portal process for establishment of communication paths using portals between IEEE 1394 devices via different buses. Namely, a flow of FIGS. 7 to 9 is started upon receipt of a request command from the IEEE 1394 device 5d. At first, when the portal 7a receives the request command by reading its written content from the command area, the portal 7a recognizes from the content of the received request command that a value of a connection counter field (FA4) of a communication path management table (see FIG. 3) is requested to be incremented by '1' in step SA2 shown in FIG. 7. After recognition, the portal 7a transmits a response command INTERIM to the IEEE 1394 device 5d in step SA3.

Figure 10:
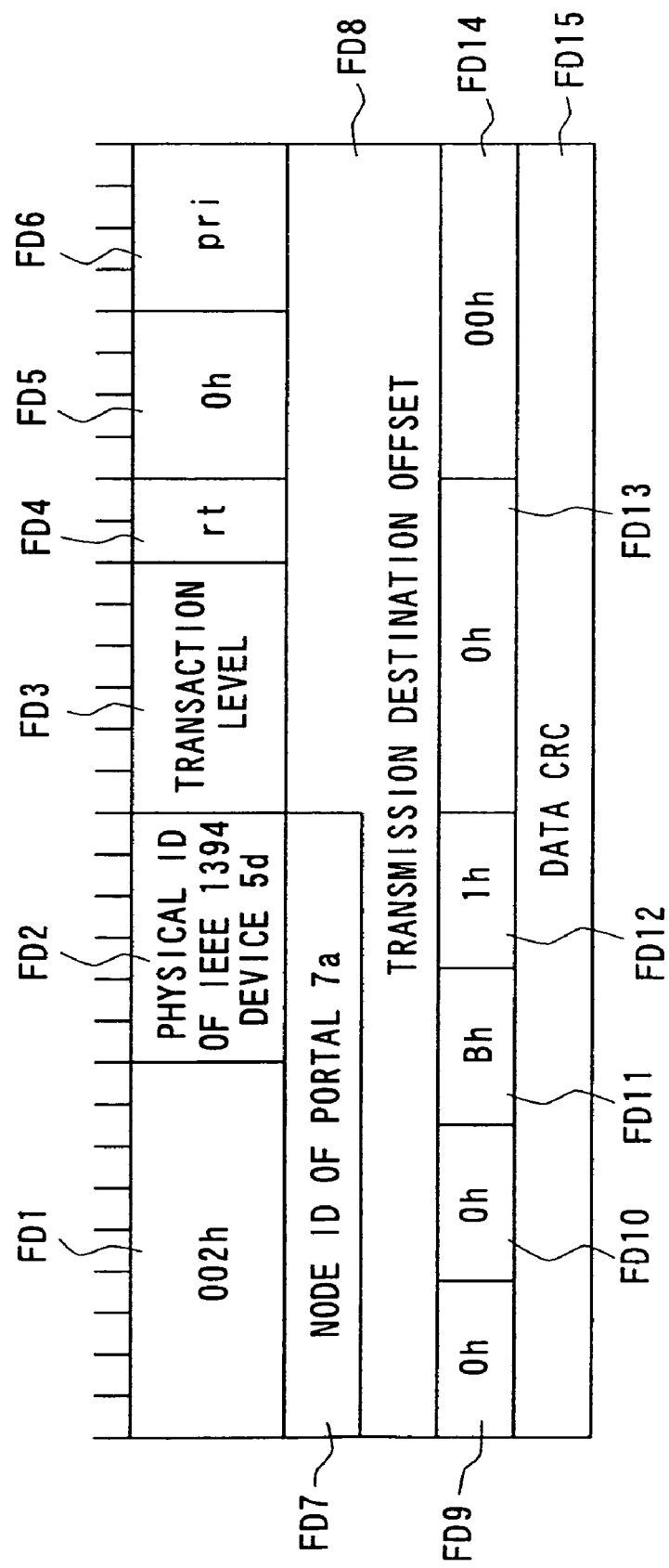
FIG. 10 shows a concrete example of a response command that the portal transmits to the IEEE 1394 device.

FIG. 10 shows a concrete example of the response command that the portal 7a transmits in the aforementioned step SA3. Herein, a transmission destination bus ID field FD1 is set to a value of high-order ten bits of the transmission source ID field FC7 (see FIG. 6) of the received request command, namely, '002h' representing a bus ID of the bus 1c connected with the IEEE 1394 device 5d. In addition, a transmission destination physical ID field FD2 is set to a value of low-order six bits of the transmission source ID field FC7 of the received request command, namely, a physical ID of the IEEE 1394 device 5d.

A tcode field FD5 describes '0h' indicating a write request for data quadlet based on the IEEE 1394 standard. High-order ten bits of a transmission source ID field FD7 describe '000h', while low-order six bits describe the physical ID of the portal 7a. A ctype field FD10 is set to '0h' indicating a response command. A rcode field FD11 is set to 'Bh' (namely, the request command is accepted so that a requested process is now under progress). A cl field FD12 is set to '1h' which is set in the received request command.

Upon reception of the response command INTERIM transmitted from the portal 7a, the IEEE 1394 device 5d recognizes that the request is accepted by the portal 7a to wait for a next response command to be sent from the portal 7a. The portal 7a checks whether to install a communication path management table being specified by the bus ID of the transmitting bus, EUI-64 information of the transmitting node and oPCR number which are described in the operand field FC17 (see FIG. 6) in steps SA4 and SA5 shown in FIG. 7. If a decision result of step SA5 is "NO", namely, if the portal 7a does not install the communication path management table therein, the flow proceeds to step SA6 in which the portal 7a newly creates a communication path management table (see FIG. 3) on which received information is to be described. Concretely, the portal 7a describes on the table the bus ID of the transmitting bus, EUI-64 information of the transmitting node, oPCR number and bandwidth which are described in the operand field FC17 of the received request command. In addition, a value of a transmission source ID field of a write request packet is described in a controller field (FA5). Further, a connection counter field (FA4) is set to '1'. If the portal 7a already installs the communication path management table therein, in other words, if a decision result of step SA5 is "YES", the flow proceeds to a series of steps starting from step SA39, which will be described later.

After creation of the new communication path management table in step SA6, the flow proceeds to step SA7 in which the portal 7a secures a bandwidth and a channel requested by the IEEE 1394 device 3c which is an IRM (namely, Isochronous Resource Manager) of the bus 1a. If the portal 7a succeeds to secure the bandwidth and channel, the portal 7a describes a channel number of the secured channel in a channel number field (FA7) of the communication path management table created by the step SA6. If the portal 7a fails to secure the bandwidth or channel, in other words, if a decision result of step SA8 is "NO", the flow proceeds to step SA9 in which the portal 7a transmits a response command REJECTED to the IEEE 1394 device (or portal) issuing the request command. In step SA10, the portal 7a discards the newly created communication path management table. Then, the portal 7a ends the portal process of FIG. 7.

If the portal 7a succeeds to secure the bandwidth and channel for communication, in other words, if a decision result of step SA8 is "YES", the flow proceeds to step SA11 in which a decision is made as to whether a number of an SCR to be set is included in the received request command or not. If the SCR number is not included in the request command, namely, if a decision result of step SA11 is "NO", the portal 7a compares a bus ID of a receiving bus included in the request command with a bus ID of a specific bus connected thereto in step SA12. If those bus IDs match with each other, namely, if a decision result of step SA12 is "YES", the flow proceeds to step SA13 to perform a prescribed process, details of which will be described later. If the SCR number is included in the request command, namely, if a decision result of step SA11 is "YES", the flow proceeds to a series of steps, starting from step SA50, details of which will be described later.

If the portal 7a performs comparison in step SA12 to determine that the bus ID of the receiving bus included in the request command does not match with the bus ID of an own bus connected to the portal 7a, namely, if a decision result of step SA12 is "NO", the flow proceeds to step SA14 shown in FIG. 8 in which routing maps are to be obtained from the portal 7a itself as well as all portals connected with the own bus of the portal 7a. In the present situation, the bus 1a is connected with the portal 7a only, hence, the portal 7a reads a routing map stored therein. With reference to the routine map, the portal 7a specifies a portal that stores a routing map whose prescribed bit corresponding to the bus ID of the receiving bus is set to '1' as a portal that lies in a path extending from the transmitting bus to the receiving bus in step SA15.

A physical ID of the specified portal is described in a listener portal field of the communication path management table. In the routine map of the portal 7a, bit 4 corresponding to a fourth bit counted from a top bit in a high order is set to '1'. Therefore, the portal 7a recognizes itself as a portal that lies in the path. If the portal 7a fails to specify such a portal that lies in the path, namely, if a decision result of step SA16 is "NO", the flow proceeds to step SA17 which is identical to the foregoing step SA9, that is, the portal 7a issues a response command REJECTED to the IEEE 1394 device or portal that issues the request command. Then, the portal 7a releases the secured bandwidth and channel while clearing the setting of the SCR. Thereafter, the flow proceeds to step SA18 which is identical to the foregoing step SA10, that is, the portal 7a discards the communication path management table. Thus, the portal process is ended.

If the portal 7a succeeds to specify the portal that lies in the path, namely, if a decision result of step SA16 is "YES", the portal 7a transmits to the specified portal that lies in the path a request command requesting the adjacent portal 7b to transmit a request command requesting an increment of a value of a connection counter field by '1' in step SA19. An operand field of such a request command describes the bus ID of the transmitting bus, EUI-64 information of the transmitting node, number of the SCR being used, node ID of the IEEE 1394 device 5d that proceeds to establishment of the communication path, bus ID of the receiving bus, bandwidth to be needed for communication and channel number secured by the portal 7a. In this case, however, no packet is transmitted onto the bus 1a that constructs a part of the communication path.

After completion of step SA19, the flow proceeds to step SA20 shown in FIG. 9 in which the portal 7a receives the request command to read out its content from the command area. In step SA21, the portal 7a recognizes that it has been requested to transmit a request command that requests the adjacent portal 7b to increment the value of the connection counter field by '1'. After recognition, the portal 7a sends a response command INTERIM to the portal (or IEEE 1394 device) that transmits the request command in step SA22. When the portal receives the response command INTERIM in step SA23, the portal is placed in a standby state to wait for a next response command to be transmitted therein in step SA24. In the aforementioned case, the portal 7a transmits the request command to itself, hence, the response command INTERIM is not transmitted on the bus.

After transmission of the response command INTERIM in step SA22 (see FIG. 9), the flow proceeds to steps SA25 and SA26. Herein, if the portal 7a does not provide a communication path management field being specified by the EUI-64 information and oPCR number of the transmitting node which are described in the operand field of the received request command, namely, if a decision result of step SA26 is "NO", the flow proceeds to step SA27 in which the portal 7a creates a new communication path management table which describes the EUI-64 information and oPCR number of the transmitting node contained in the aforementioned operand field as well as low-order six bits of a transmission source ID field of a write request packet being received in a talker portal field, wherein a connection counter field is set to '1'. Upon creation of the communication path management table, a channel number included in the request command is set in an SCR that the portal 7a is capable of using by itself in step SA28, that is, the channel number is set for an SCR number.

If the portal 7a fails to set the SCR number, namely, if a decision result of step SA29 is "NO", the flow proceeds to step SA30 which is identical to the foregoing step SA9 shown in FIG. 7 in which the portal 7a transmits a response command REJECTED. Then, the portal 7a refers to the connection counter field of the communication path management table. If the connection counter field is not set at '0', namely, if a decision result of step SA31 is "NO", the portal process is ended. In contrast, if the connection counter field is set at '0', namely, if a decision result of step SA31 is "YES", the flow proceeds to step SA32 in which the portal 7a clears the setting of the SCR specified by the SCR number field of the table. Then, the flow proceeds to step SA33 which is identical to the foregoing step SA10 in which the portal discards the communication path management table, then, the portal process is ended.

If the portal 7a succeeds to set the SCR number, namely, if a decision result of step SA29 is "YES", the flow proceeds to step SA34 in which the portal 7a transmits to the adjacent portal 7b a request command requesting an increment to a value of a connection counter field by '1'. In this case, the operand field describes the bus ID of the transmitting bus, EUI-64 information of the transmitting node, number of the oPCR being used, node ID of the IEEE 1394 device 5d that proceeds to establishment of the communication path, bus ID of the receiving bus, bandwidth needed for communication, and the SCR number which is set as described above.

Thus, the portal 7b receives from the portal 7a the aforementioned request command to proceed to steps SA1 to SA19 shown in FIGS. 7 and 8. Herein, the portal 7b proceeds to steps SA11 and SA19 in a different way as compared with the aforementioned portal 7a. That is, in step SA11, a channel number secured in the bus 1b is set to the SCR whose number is included in the request command received by the portal 7b and is simultaneously stored in an SCR number field of a communication path management table. In step SA19, the portal 7b transmits a request command requesting the portal 9a to transmits a request command that requests its adjacent portal 9b to increment a value of a connection counter field by '1'.

Thus, the portal 9a receives from the portal 7b the aforementioned request command to proceed to steps SA20 to SA34 shown in FIG. 9, in which it transmits a request command that requests the adjacent portal 9b to increment the value of the connection counter field by '1'. Then, the portal 9a proceeds to step SA35 which is identical to the foregoing steps SA23 and SA24. In addition, the portal 9b receives from the portal 9a the aforementioned request command to proceed to steps SA2 to SA12 shown in FIG. 7. In this case, the bus ID of the receiving bus matches with the bus ID of the portal 9b in step SA12. In step SA13, the portal 9b transmits to the portal 9a issuing the request command a response command ACCEPTED whose operand field describes its own node ID and a channel number that the portal 9b secures in the bus 1d. Then, the portal process is ended.

Thus, the portal 9a receives from the portal 9b the aforementioned response command in step SA36. In step SA37, the portal 9a makes a decision as to whether the received response command corresponds to 'ACCEPTED' or not. If the portal 9a receives the response command ACCEPTED from the portal 9b, namely, if a decision result of step SA37 is "YES", the portal 9a retransmits the response command ACCEPTED to the portal 7b originally issuing the request command in step SA38. Specifically, the portal 9a sends the response command ACCEPTED whose operand field additionally describes its own node ID and a value of a channel number field of a communication path management table. After completion of step SA38, the portal process is ended. On the other hand, if the received response command does not correspond to 'ACCEPTED', namely, if a decision result of step SA3 7 is "NO", the portal 9a proceeds to steps SA30 to SA33, then, the portal process is ended.

The portal 7b receives from the portal 9a the aforementioned response command to proceed to steps SA36 and SA37 shown in FIG. 9. If the received response command corresponds to 'ACCEPTED' in step SA37, the portal 7b proceeds to step SA38 to retransmit the response command ACCEPTED to the portal 7a, then, the portal process is ended. If not, the portal 7b proceeds to steps SA32 and SA33, then, the portal process is ended.

The portal 7a receives from the portal 7b the aforementioned response command to proceed to steps SA35 to SA38 or steps SA35–SA37 and steps SA30–SA33. Herein, the portal 7a sends the response command to itself, then, the portal process is ended. Then, the portal 7a receiving the response command from itself proceeds to steps SA35 to SA38 or steps SA35–SA37 and steps SA30–SA33, so that the response command is to be transmitted to the IEEE 1394 device 5d, then, the portal process is ended.

The IEEE 1394 device 5d receives from the portal 7a the aforementioned response command to recognize that a communication path is certainly established from the transmitting node to the receiving node. Then, prescribed setting is made on the oPCR of the IEEE 1394 device 3b corresponding to the transmitting node and the iPCR of the IEEE 1394 device 6b corresponding to the receiving node. Thus, communication using stream packets is started between the IEEE 1394 device 3b and the IEEE 1394 device 6b. Herein, the IEEE 1394 device 5d captures from the received response command ACCEPTED the node IDs of the talker portals and listener portals of the buses and the channel numbers secured in the buses, which are stored therein.

[Addition of Receiving Node]

Next, processes for addition of a new receiving node for receiving stream packets being transmitted from a transmitting node will be described with reference to FIGS. 7 to 9. Herein, a description will be made with respect to an example in which an IEEE 1394 device 5c is newly added as a receiving node during execution of communication which is performed between an IEEE 1394 device 3b and an IEEE 1394 device 6b by using isochronous stream packets.

In the above, an IEEE 1394 device 5d acts as a device controller that proceeds to setting of communication paths, so that it selects a representative portal in advance for establishment of communication paths. Now, the IEEE 1394 device 5d transmits to such a representative portal a request command requesting establishment of the communication path. Concretely speaking, the IEEE 1394 device 5d transmits to a portal 7a a request command to increment a value of a connection counter field of a communication path management table, which is provided for each of portals used in the communication path to be established, by '1'. An operand field of the transmitted request command describes a bus ID of a transmitting bus, EUI-64 information and a number of a used oPCR of a transmitting node, a bus ID (namely, '002h') of a receiving bus and a bandwidth to be secured.

Upon receipt of the aforementioned request command, the portal 7a proceeds to steps SA2 and SA3 shown in FIG. 7. Then, the portal 7a proceeds to steps SA4 and SA5 in which a decision is made as to whether there is provided a communication path management table being specified by the EUI-64 information and oPCR number of the transmitting node, extracted from the operand field of the request command, or not. In this case, a communication path has been already established between the IEEE 1394 device 3b and IEEE 1394 device 6b. Therefore, the portal 7a stores the corresponding communication path management table therein.

If it is confirmed in step SA5 that the portal 7a stores the communication path management table, the flow proceeds to step SA39 in which a value of a connection counter field is incremented by '1'. After incrementing of the connection counter field, the portal 7a proceeds to a series of steps SA12 to SA19 (see FIG. 8), wherein the portal 7a is being specified in step SA15. Hence, the present portal transmits to the specified portal 7a a request command requesting transmission of a request command to its adjacent portal (7b) to increment a value of a connection counter field by '1'. Namely, the portal 7a receives such a request command being transmitted thereto in step SA19, so that it proceeds to steps SA20 to SA26 shown in FIG. 9. Herein, the portal 7a stores the communication path management table being specified by the EUI-64 information and oPCR number of the transmitting node which are extracted from the operand field of the request command. Thus, a decision result of step SA26 is "YES", so that the flow proceeds to step SA40 which is identical to step SA39 shown in FIG. 7. That is, the portal 7a transmits to the adjacent portal 7b a request command that requests an increment to a value of the connection counter field by '1'.

Upon receipt of the aforementioned request command, the portal 7b proceeds to steps SA2 to SA5 shown in FIG. 7. At this time, the portal 7b stores a communication path management table being specified by the EUI-64 information and oPCR number of the transmitting node which are extracted from an operand field of the request command. Hence, a decision result of step SA5 is "YES", so that the flow proceeds to step SA39. After completion of the step SA39, the portal 7b proceeds to a series of steps SA12 to SA19 (see FIG. 8), in which it transmits to a portal 8a a request command requesting transmission of a request command to its adjacent portal 8b to increment a value of a connection counter field by '1'.

Upon receipt of the aforementioned request command transmitted from the portal 7b, the portal 8a proceeds to steps SA20 to SA26 (see FIG. 9). At this time, the portal 8a stores a communication path management table being specified by the EUI-64 information and oPCR number of the transmitting node which are extracted from an operand field of the request command, hence, a decision result of step SA26 is "YES". Thus, the portal 8a proceeds to steps SA40 and SA34. That is, the portal 8a transmits to its adjacent portal 8b a request command requesting an increment to a value of a connection counter field by '1'.

Upon receipt of the aforementioned request command transmitted from the portal 8a, the portal 8b proceeds to steps SA2 to SA5 shown in FIG. 7. In this case, however, the portal 8b does not store a communication path management table being specified by the EUI-64 information and oPCR number of the transmitting node which are extracted from an operand field of the request command, hence, a decision result of step SA5 is "NO". Thus, the portal 8b proceeds to steps SA6 to SA12. In step SA12, the bus ID of the receiving bus matches with an bus ID of the own bus of the portal 8b, hence, a decision result is "YES" so that the flow proceeds to step SA13. Then, the portal process is ended.

In step SA13, the portal 8b transmits a response command ACCEPTED to the portal 8a. Upon receipt of such a response command from the portal 8b, the portal 8a proceeds to steps SA23, SA24 and a series of steps SA41 to SA49 shown in FIG. 8. Herein, step SA45 is identical to the foregoing step SA9 while step SA49 is identical to the foregoing step SA10. Then, the procedures which are described before in the paragraph named "[Establishment of Communication Path]" are sequentially carried out so that a response command ACCEPTED is to be transmitted to the IEEE 1394 device 5d. Upon receipt of the response command ACCEPTED, the IEEE 1394 device 5d judges that a communication path is completely established for the IEEE 1394 device 5c corresponding to a new receiving node to be added, so that setting is made on an iPCR of the receiving node. After completion of the setting, the IEEE 1394 device 5c is capable of receiving isochronous stream packets being transmitted thereto from the IEEE 1394 device 3b corresponding to the transmitting node.

Incidentally, if it is determined in step SA11 that an SCR number is included in the received request command, namely, if a decision result of step SA11 is "YES" (see FIG. 7), the flow proceeds to step SA50 in which setting is made on an SCR. In step SA51, a decision is made as to whether the setting of the SCR is completed successfully or not. If the setting is completed successfully, namely, if a decision result of step SA51 is "YES", the flow proceeds to step SA12. In contrast, if a decision result of step SA51 is "NO", the flow proceeds to steps SA9 and SA10. Then, the portal process is ended.

[Disconnection of Communication Path]

Next, processes for disconnection of a communication path which has been already established between prescribed nodes will be described with reference to FIGS. 7 to 9. Herein, description is made with respect to the data network shown in FIG. 1 in which communication paths are established in advance from an IEEE 1394 device 3b to IEEE 1394 devices 5c and 6b respectively, wherein a communication path being established between the IEEE 1394 devices 3b and 5c is to be disconnected.

At first, an IEEE 1394 device 5d acts as a device controller to transmits a request command that requests a representative portal 7a of a transmitting bus to examine and disconnect a communication path extending to a receiving bus. Concretely speaking, it transmits a request command that requests each of portals used for the communication path to decrement a value of a connection counter field of a communication path management table by '1'.

Figure 11:
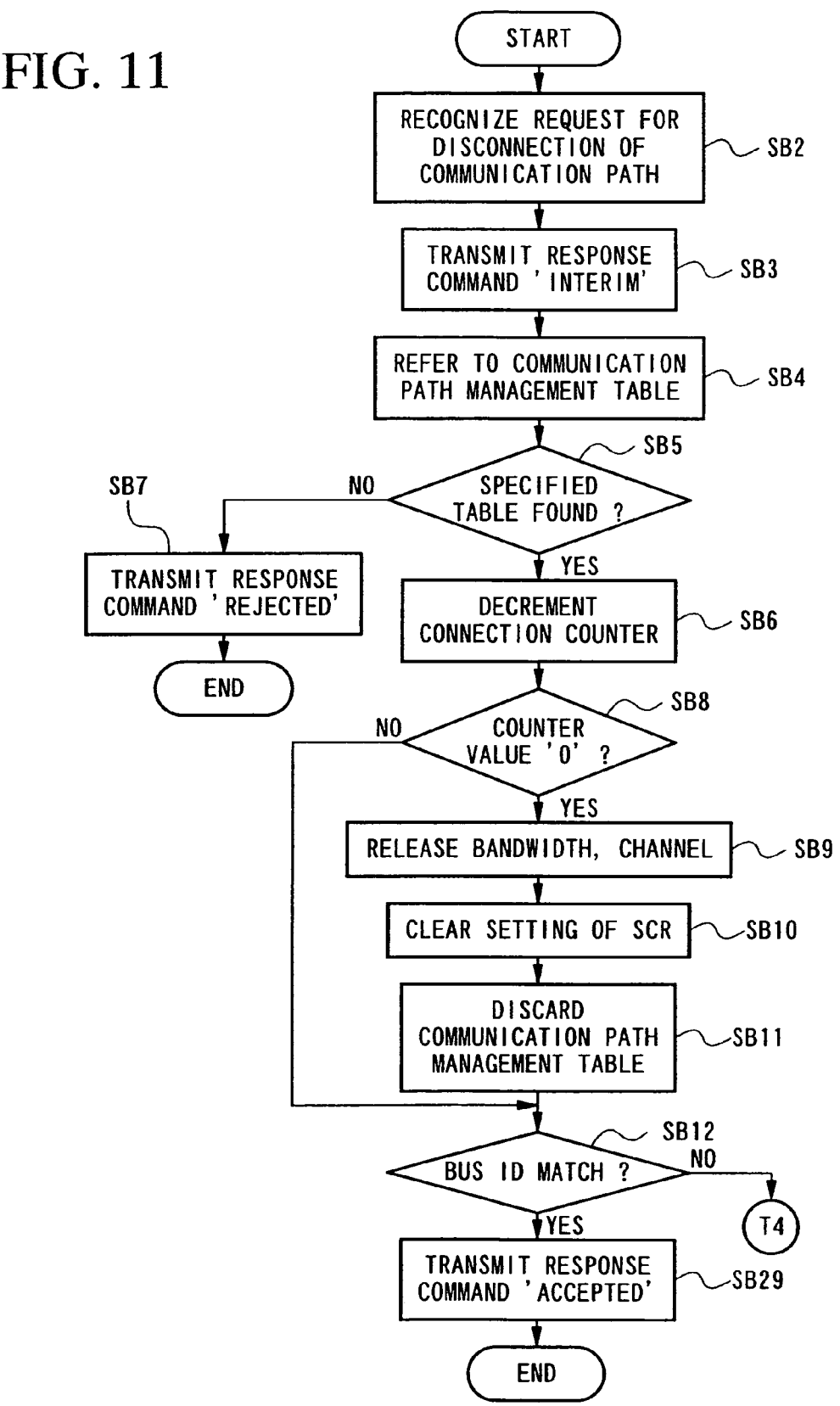
FIG. 11 is a flowchart showing a first part of a portal process for disconnection of communication paths using portals between IEEE 1394 devices via different buses.
Figure 12:
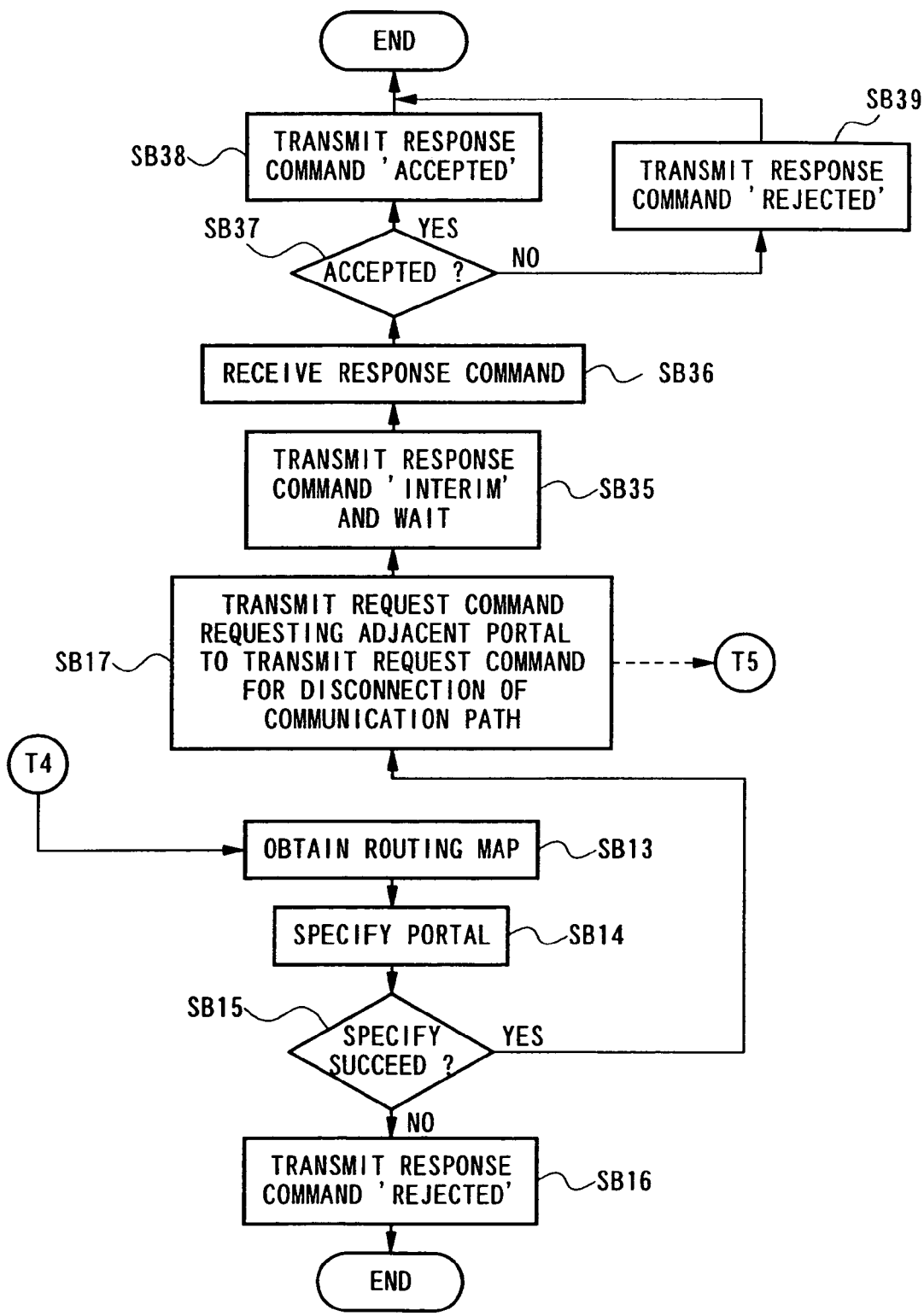
FIG. 12 is a flowchart showing a second part of the portal process for disconnection of communication paths.
Figure 13:
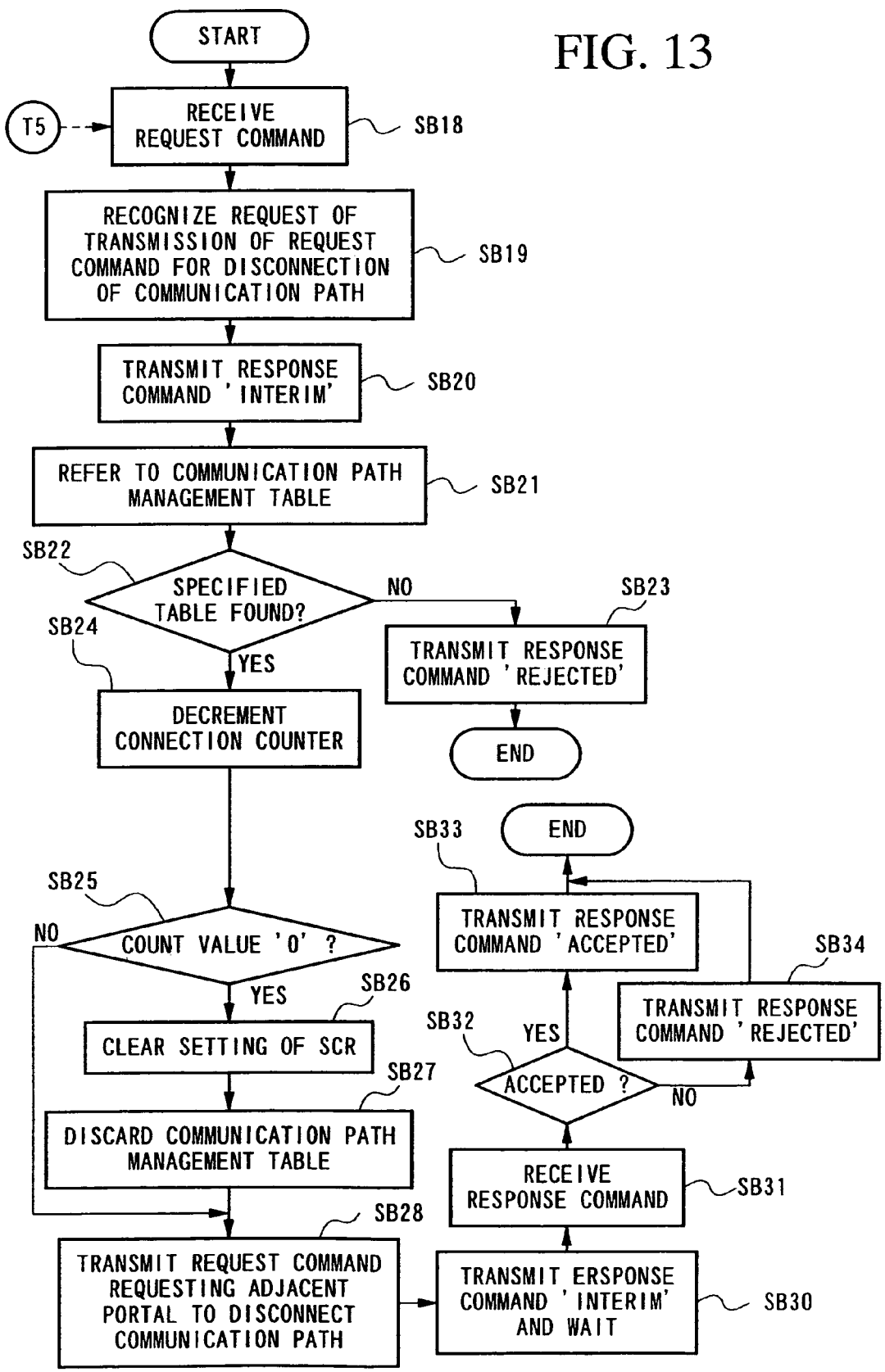
FIG. 13 is a flowchart showing a third part of the portal process for disconnection of communication paths.

FIGS. 11 to 13 show a portal process for disconnection of communication paths using portals between IEEE 1394 devices via different buses. The portal process of FIG. 11 is started upon reception of a request command that a portal 7a reads from a command area. That is, the portal 7a reads content of the received request command from the command area, so that the portal 7a recognizes a request to decrement a value of a connection counter field by '1' in step SB2. After recognition, the portal 7a transmits a response command INTERIM to a transmission source (namely, the portal 7a itself) of the request command in step SB3.

After transmission of the response command INTERIM in step SB3, a flow proceeds to step SB4 in which the portal 7a refers to communication path management tables stored therein. In step SB5, a decision is made as to whether there is provided a communication path management table being specified by EUI-64 information and an oPCR number of a transmitting node, which are extracted from an operand field of the received request command, or not. If the portal 7a stores such a table therein, namely, if a decision result of step SB5 is "YES", the flow proceeds to step SB6 in which the portal 7a decrements a value of the connection counter field by '1'. If the portal 7a does not store the table, namely, if a decision result of step SB5 is "NO", the flow proceeds to step SB7 in which the portal 7a transmits a response command REJECTED, then, the portal process is ended.

After completion of the aforementioned step SB6, the flow proceeds to step SB8 in which a decision is made as to whether an updated value (namely, a decremented value) of the connection counter field is '0' or not. If the updated value of the connection counter field is '0', namely, if a decision result of step SB8 is "YES", the flow proceeds to step SB9 in which with reference to a bandwidth field and a channel number field of the communication path management table, the portal 7a releases a bandwidth and a channel that are secured for a communication path to be disconnected. In step SB10, the portal 7a clears setting of an SCR to which the released channel number is set. In step SB11, the portal 7a discards the communication path management table.

In step SB12, a decision is made as to whether a bus ID of a receiving bus matches with a bus ID of an own bus connected with the portal 7a or not. Herein, those bus IDs do not match with each other, hence, a decision result of step SB12 is "NO" so that the flow proceeds to step SB13 shown in FIG. 12. In step SB13, the portal 7a obtains routing maps of all other portals connected with its own bus as well as a routine map of itself With reference to the routing maps, the portal 7a specifies a portal storing a routing map in which a specific bit representing a bus ID of a receiving bus is set to '1' as a portal that lies in the communication path extending to the receiving bus in step SB14. If the portal 7a fails to specify such a portal, namely, if a decision result of step SB15 is "NO", the flow proceeds to step SB16 which is identical to the foregoing step SB7 shown in FIG. 11, then, the portal process is ended.

If the portal 7a succeeds to specify the aforementioned portal, namely, if a decision result of step SB15 is "YES", the flow proceeds to step SB17 in which the portal 7a transmits to the specified portal a request command requesting transmission of a request command to its adjacent portal to decrement a value of a connection counter field by '1'. In this case, the portal 7a transmits the aforementioned request command to itself Due to the step SB17, the portal 7a receives the aforementioned request command. Then, the flow proceeds to step SB18 shown in FIG. 13 in which the portal 7a reads content of the received request command from the command area. In step SB19, the portal 7a recognizes a request of transmission of a request command that requests the adjacent portal 7b to decrement a value of a connection counter field by '1'.

After recognition, the portal 7a transmits a response command INTERIM to a transmission source (namely, the portal 7a itself) of the aforementioned request command in step SB20. After transmission of the response command INTERIM, the flow proceeds to step SB21 in which the portal 7a refers to communication path management tables stored therein. In step SB22, a decision is made as to whether there is provided a communication path management table being specified by the EUI-64 information and oPCR number of the transmitting node, which are extracted from the received request command, or not. If the portal 7a does not store such a table therein, namely, if a decision result of step SB22 is "NO", the flow proceeds to step SB23 in which the portal 7a transmits a response command REJECTED, then, the portal process is ended. If the portal 7a stores the table, namely, if a decision result of step SB22 is "YES", the flow proceeds to step SB24 which is identical to the foregoing step SB6, in which the portal 7a decrements a value of the connection counter field by In step SB25, a decision is made as to whether an updated value (namely, a decremented value) of the connection counter field is '0' or not. If '0', namely, if a decision result of step SB25 is "YES", the flow proceeds to step SB26 in which the portal 7a clears setting of an SCR. In step SB27, the portal 7a discards the communication path management table. Then, the flow proceeds to step SB28 in which the portal 7a transmits a request command to the adjacent portal 7b to decrement a value of the connection counter field by '1'.

Thus, the portal 7b receives from the portal 7a the aforementioned request command requesting a decrement of the value of the connection counter field by '1'. Upon receipt of the request command, the portal 7b proceeds to a series of steps SB2 to SB15 and step SB17 which are shown in FIGS. 11 and 12. Due to step SB17, the portal 8a receives from the portal 7b a request command requesting an adjacent portal to decrement a value of a connection counter field by '1'. Upon receipt of such a request command, the portal 8a proceeds to steps SB18 to SB28 shown in FIG. 13. Due to step SB28, the portal 8b receives from the portal 8a a request command requesting a decrement of a value of a connection counter field by '1', so that the portal 8b proceeds to steps SB2 to SB12 shown in FIG. 11. In step SB12, the bus ID of the receiving bus matches with an bus ID of a bus connected with the portal 8b, hence, the flow proceeds to step SB29 in which the portal 8b transmits a request command ACCEPTED.

Upon receipt of the response command, each of the portals 8a, 7b and 7a proceeds to steps SB30 to SB34, then, the portal process is ended. Herein, step SB30 is identical to the foregoing steps SA23 and SA24 shown in FIG. 8, while step SB34 is identical to the foregoing step SB7 shown in FIG. 11. If the IEEE 1394 device 5d receives from the portal 7a a response command ACCEPTED, the IEEE 1394 device 5d recognizes that disconnection of the communication path is being completed, so that it clears setting of an iPCR of the IEEE 1394 device 5c. In FIG. 12, step SB38 is identical to the foregoing step SB29, while step SB39 is identical to the foregoing step SB7 shown in FIG. 11.

[Bus Reset in Bus of Communication Path]

Next, a description will be given with respect to a portal process that is executed in response to occurrence of bus reset in a prescribed bus within a communication path which is established in advance. Concretely, the description will be made with respect to the data network shown in FIG. 1 in which communication paths are established in advance between the IEEE 1394 device 3b and the IEEE 1394 devices 5c and 6b respectively, wherein bus reset occurs on the bus 1b. In addition, a transmitting node (namely, IEEE 1394 device 3b) and a receiving node (namely, IEEE 1394 device 5c or 6b) remain being connected in the data network after the bus reset.

When the bus reset occurs so that a self-ID process defined by the IEEE 1394 standard is to be completed, the portal 7b that acts as a talker portal on the bus 1b refers to the communication path management table to re-secure a bandwidth and a channel which are secured for the bus 1b before occurrence of the bus reset. So, the description is made with respect to each of cases regarding different manners of re-securement of the bandwidth and channel.

(1) First case where the portal 7b succeeds to re-secure the bandwidth and channel In this case, the portal 7b makes a communication to the IEEE 1394 device 5d, then, the portal process is ended. Upon receipt of the communication, the IEEE 1394 device 5d discriminates whether the bus regarding occurrence of the bus reset is either a transmitting bus or a receiving bus or not. If the bus regarding occurrence of the bus reset is either the transmitting bus or receiving bus, it makes setting for an oPCR of the transmitting node or an iPCR of the receiving node.

(2) Second case where the portal 7b succeeds to re-secure the bandwidth and channel, however, a re-secured channel number differs from a channel number being previously secured before occurrence of the bus reset The portal 7b stores the communication path management table whose listener field describes physical IDs of "listener" portals, namely, 8a and 9a. In the second case, the portal 7b transmits to each of the portals 8a, 9a a request command requesting a change of setting of an SCR. An operand field of the request command describes EUI-64 information and an oPCR number of the transmitting node described in the communication path management table of the portal 7b as well as a new channel number.

Thus, each of the portals 8a and 9a receives the aforementioned request command whose operand field describes the EUI-64 information and oPCR number of the transmitting node, by which a certain transmission path management table is being specified. With reference to an SCR number of the specified transmission path management table, each portal sets the new channel number in a channel number field of an SCR corresponding to the SCR number. After completion of setting of the new channel number, it transmits a response command ACCEPTED.

Thus, the portal 7b receives from each of the portals 8a, 9a the aforementioned request command ACCEPTED so as to change a previous channel number being previously set in an SCR thereof with the newly secured channel number. Then, the portal 7b communicates the newly secured channel number to the IEEE 1394 device 5d whose physical ID is described in a controller field of the communication path management table thereof.

On the basis of a content of a transmission source ID field of a received packet, the IEEE 1394 device 5d detects a bus ID of a bus that is connected with the aforementioned portal 7b communicating the newly secured channel number thereto. If the detected bus ID is either the transmitting bus or receiving bus, it makes again setting for the oPCR of the transmitting node or iPCR of the receiving node.

(3) Third case where the portal 7b fails to re-secure the bandwidth or channel.

Figures 15A, 15B:
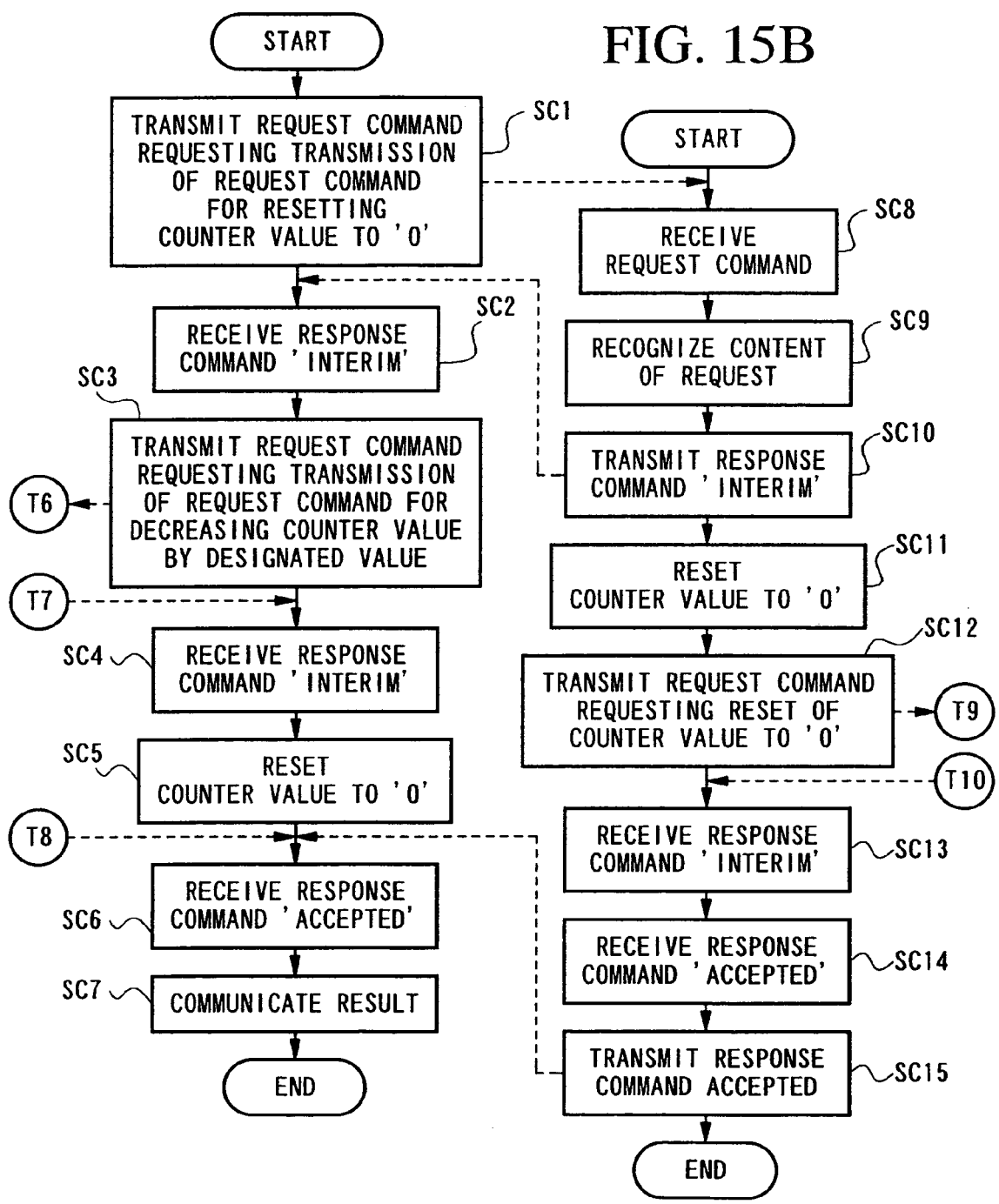
FIG. 15A is a flowchart showing a portal process being executed by a portal 7b to cope with a failure of re-securement of a bandwidth or channel after occurrence of bus reset.
FIG. 15B is a flowchart showing a portal process being executed by each of portals 8a, 9a to cope with a failure of re-securement of a bandwidth or channel after occurrence of bus reset.
Figure 16:
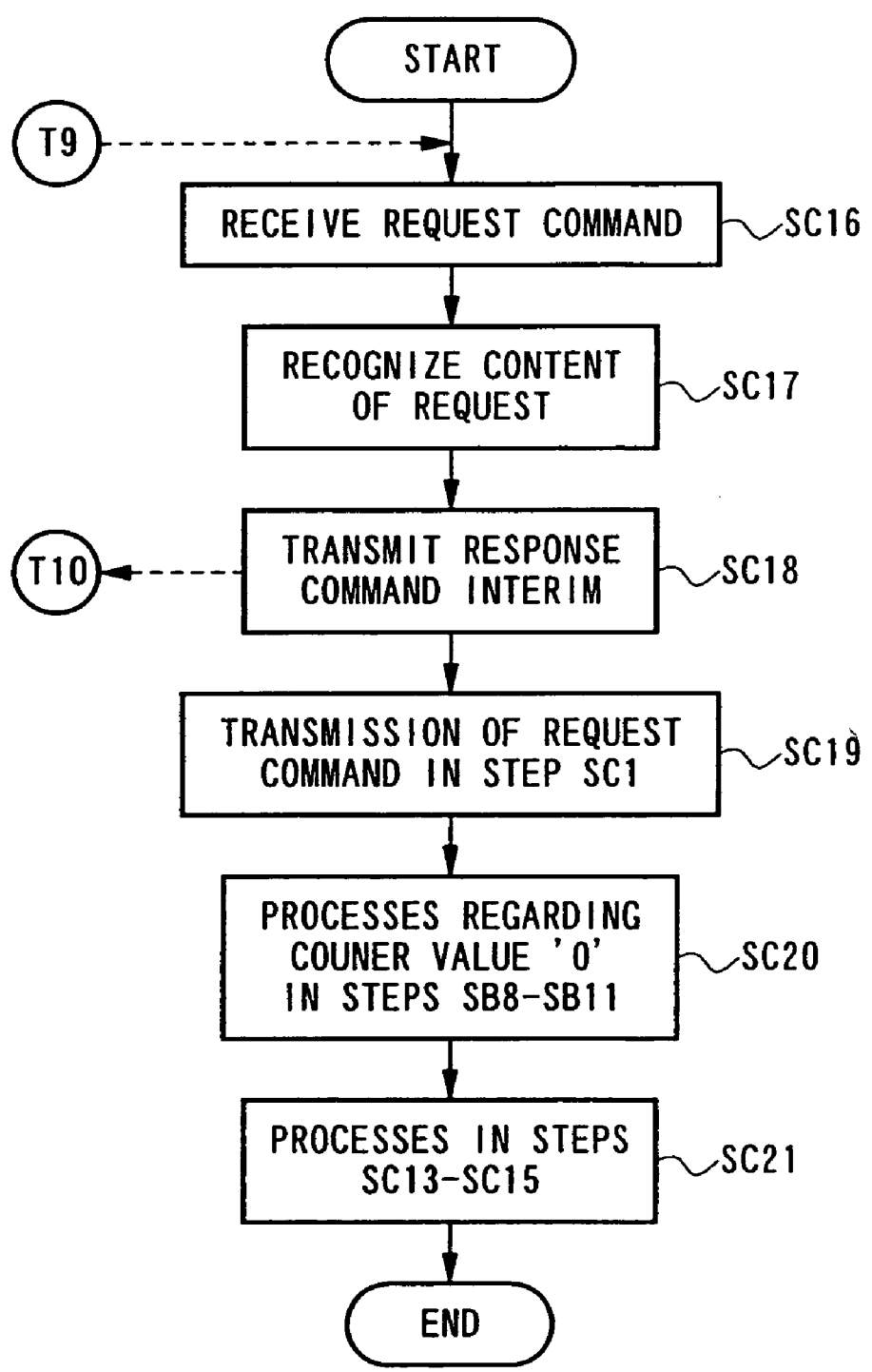
FIG. 16 is a flowchart showing a portal process being executed by each of portals 8b, 9b to cope with a failure of re-securement of a bandwidth or channel after bus reset.

FIGS. 14 to 16 show processes that prescribed portals execute to cope with a failure of re-securement of the bandwidth or channel after bus reset. Herein, the portal 7b has a communication path management table whose listener portal field describes physical IDs of prescribed listener portals, namely, 8a and 9a. In step SC1 of FIG. 15, the portal 7b transmits to each prescribed listener portal a request command requesting transmission of a request command that requests its adjacent portal to reset a value of a connection counter field to '0'.

Then, the portal 7b receives a response command INTERIM from the prescribed listener portal in step SC2. In step SC3, the portal 7b transmits to the prescribed listener portal a request command requesting transmission of a request command that requests its adjacent portal to decrease a value of a connection counter field of a talker portal by a designated value. Herein, an operand field of the request command describes a bus ID of a transmitting bus as well as EUI-64 information and an oPCR number of a transmitting node. In addition, it also describes the value which is designated for decrease and is set to a value of a connection counter field of the transmission path management table being stored in the portal 7*b* before occurrence of the bus reset.

Then, the portal 7*b* receives a response command INTERIM from the prescribed listener portal in step SC4. Thereafter, the flow proceeds to step SC5 in which the portal 7*b* refers to the communication path management table regarding a "disconnecting" communication path, which should be disconnected, to reset a value of a connection counter field to '0'. In step SC6, the portal 7*b* receives from each of the portals 7*a*, 8*a* and 9*a* a response command ACCEPTED. In step SC7, the portal 7*b* communicates result of the process thereof to the IEEE 1394 device 5*d*, then, the portal process of the portal 7*b* is ended.

Next, a description will be given with respect to a portal process being executed by each of the prescribed portals 8*a*, 9*a* upon receipt of the aforementioned request command from the portal 7*b* (see step SC1 in FIG. 15A) with reference to FIG. 15B. In step SC8, each of the portals 8*a*, 9*a* reads out content of the request command from a command area thereof. Thus, each of the portals 8*a*, 9*a* recognizes a request of transmission of a request command that requests its adjacent portal to reset a value of a connection counter field to '0' in step SC9. After recognition, the portal transmits a response command INTERIM to the portal 7*b* in step SC10. Herein, an operand field of the received request command describes the EUI-64 information and oPCR number of the transmitting node, which are used to specify a certain transmission path management table. In step SC11, the portal resets a value of a connection counter field of the specified transmission path management table to '0'. Then, the portal performs a series of steps (not shown) which are identical to the foregoing steps SA31 to SA33 shown in FIG. 9.

Thereafter, the flow proceeds to step SC12 in which each of the portals 8*a*, 9*a* transmits a request command that requests each of adjacent portals 8*b*, 9*b* to reset a value of a connection counter table to '0'. In step SC13, each of the portals 8*a*, 9*a* receives from each of the adjacent portals 8*b*, 9*b* a response command INTERIM. In step SC14, the portal further receives a response command ACCEPTED from the corresponding adjacent portal. In step SC15, the portal transmits a response command ACCEPTED to the corresponding adjacent portal, then, the portal process of the portals 8*a*, 9*a* is ended.

Next, a description will be given with respect to a portal process being executed by each of the adjacent portals 8*b*, 9*b* upon receipt of the request command from the portals 8*a*, 9*a* (see step SC12 in FIG. 15B) with reference to FIG. 16. In step SC16, each of the adjacent portals 8*b*, 9*b* reads content of the request command from a command area thereof. In step SC17, it recognizes a request of resetting a value of a connection counter field to '0'. After recognition, each of the adjacent portals 8*b*, 9*b* transmits to each of the portals 8*a*, 9*a* a response command INTERIM in step SC18.

Then, each of the adjacent portals 8*b*, 9*b* proceeds to step SC19 which is identical to the foregoing step SC1 shown in FIG. 15A. As for the adjacent portals 8*b*, 9*b*, listener portal fields describe no portals. Hence, the adjacent portals 8*b*, 9*b* do not transmit request commands therefrom, so they reset values of connection counter fields of transmission path management tables thereof to '0'. Then, the flow proceeds to step SC20 in which each of the adjacent portals 8*b*, 9*b* executes a series of steps (not shown) which are identical to the foregoing steps SB8 to SB11 shown in FIG. 11. In step SC21 in which each of the adjacent portals 8*b*, 9*b* executes a series of steps (not shown) which are identical to the foregoing steps SC13 to SC15 shown in FIG. 15B. That is, when each of the adjacent portals 8*b*, 9*b* receives a response command ACCEPTED followed by a response command INTERIM, it transmits a response command ACCEPTED, then, the portal process of the adjacent portals 8*b*, 9*b* is ended.

Figure 14A:
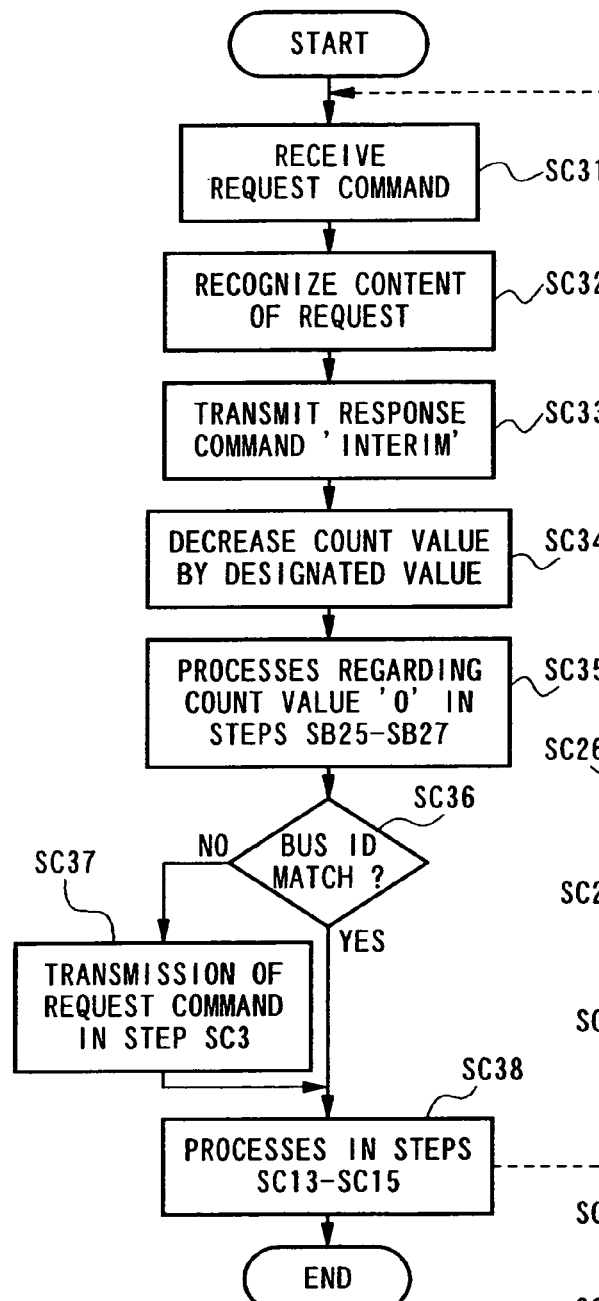
FIG. 14A is flowchart showing a first part of a portal process being executed by a portal 7a to cope with a failure of re-securement of a bandwidth or channel after occurrence of bus reset.
Figure 14B:
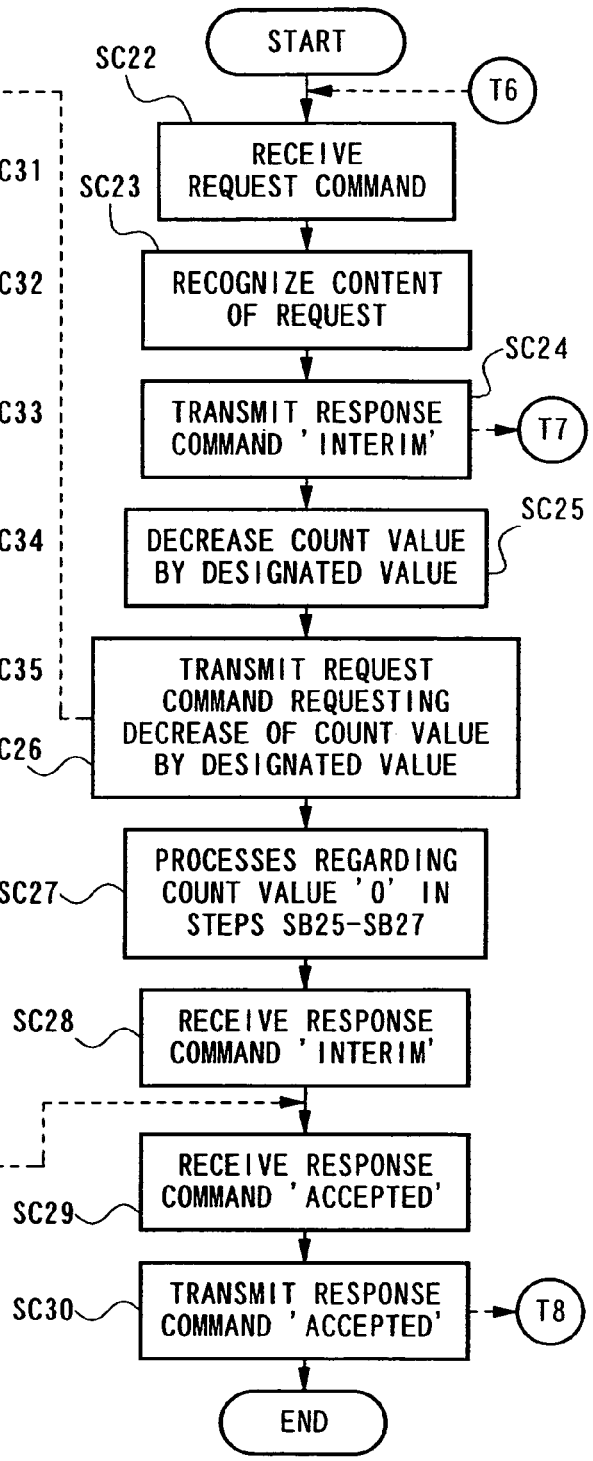

Next, a description will be given with respect to a portal process being executed by the portal 7*a* upon receipt of the request command from the portal 7*b* (see step SC3 shown in FIG. 15A) with reference to FIGS. 14A and 14B. In step SC22 shown in FIG. 14B, the portal 7*a* reads out content of the received request command from a command area thereof In step SC23, the portal 7*a* recognizes a request of transmission of a request command that requests a talker portal to decrease a value of a connection counter field by a designated value. After recognition, the portal 7*a* transmits a response command INTERIM to the portal 7*b* in step SC24. Herein, an operand field of the received response command describes the EUI-64 information and oPCR number of the transmitting node, which are used to specify a certain transmission path management table. In step SC25, the portal 7*a* decreases a value of a connection counter field of the specified transmission path management table by the designated value.

The aforementioned transmission path management table has a talker portal field that describes the portal 7*a* by itself. In step SC26, the portal 7*a* transmits to the talker portal (namely, the portal 7*a* itself) a request command that requests decrease of the value of the connection counter field by the designated value. Then, the flow proceeds to step SC27 in which the portal 7*a* executes a series of steps (not shown) which are identical to the foregoing steps SB25 to SB27 shown in FIG. 13. So, the portal 7*a* receives a response command INTERIM in step SC28 and then receives a response command ACCEPTED in step SC29. Thereafter, the flow proceeds to step SC30 which is identical to the foregoing step SC15 shown in FIG. 15B, then, the portal process of FIG. 14B is ended.

Next, a description will be given with respect to a portal process being executed by the portal 7*a* to cope with a request command being issued in step SC26 shown in FIG. 14B with reference to FIG. 14A. In step SC31, the portal 7*a* reads out content of the received request command from the command area thereof In step SC32, the portal 7*a* recognizes a request of decreasing a value of a connection counter field by a designated value. After recognition, the portal 7*a* transmits thereto by itself a response command INTERIM in step SC33. After transmission of the response command INTERIM, the flow proceeds to step SC34 in which the portal 7*a* decreases the value of the connection counter field of the communication path management table being specified by the EUI-64 information and oPCR number, which are extracted from an operand field of the request command, by the designated value. Then, the flow proceeds to step SC35 in which the portal 7*a* executes a series of steps (not shown) which are identical to the foregoing steps SB25 to SB27. In step SC36, comparison is made between the bus ID of the transmitting bus contained in the request command and the bus ID of the bus connected with the portal 7*a* itself. If those buses do not match with each other so that a decision result of step SC36 is "NO", the flow proceeds to step SC37 which is identical to the foregoing step SC3 shown in FIG. 15A, wherein the portal 7a transmits a prescribed request command. Then, the flow proceeds to step SC38 which is identical to the foregoing steps SC13 to SC15, wherein the portal 7a receives prescribed response commands to finally transmit a response command ACCEPTED, then, the portal process of FIG. 14A is ended. If the step SC36 determines that the aforementioned buses match with each other, in other words, if a decision result of step SC36 is "YES", the flow directly proceeds to step SC38, then, the portal process of FIG. 14A is ended.

[Measures Against Variations of Topology]

Normally, prior to controlling of communication paths, the IEEE 1394 device (namely, 5d) exclusively used for controlling the communication paths transmits to prescribed portals connected with buses interconnected therewith request commands that request communications when their routing maps are being updated. If a certain bus is disconnected from the data network, any one of routing maps of the portals, which receive the aforementioned request commands in advance, is to be changed. In that case, the portal transmits to the IEEE 1394 device that transmits the aforementioned request command a response command whose operand field describes a bus ID of the "disconnected" bus.

Using the aforementioned response command, it is possible to cope with variations of topology. That is, the IEEE 1394 device exclusively used for controlling the communication paths refers to a node ID of the portal being used for the communication path so as to specify EUI-64 information and an oPCR number of a transmitting node that uses the disconnected bus as a part of the communication path. Then, the IEEE 1394 devices transmits to each of prescribed portals, which are related to the specified EUI-64 information and oPCR number of the transmitting node, a request command that requests reset of a value of a connection counter field to '0'. Herein, each of the prescribed portals may corresponds to a talker portal or a listener portal. In the case of the talker portal, it proceeds to steps SB8 to SB11 shown in FIG. 11. In the case of the listener portal, it proceeds to step SB25 to SB27 shown in FIG. 13. Thus, disconnection of the communication path is completed.

[Disconnection of IEEE 1394 Device For Controlling Communication Paths]

A representative portal is selected for establishment of communication paths and periodically transmits prescribed packets to the IEEE 1394 device (namely, 5d) exclusively used for controlling the communication paths. Concretely speaking, it performs read transaction on a NODE_IDS register defined by the IEEE 1394 standard. Hence, the IEEE 1394 device 5d that exists in the data network performs "packet response" for transmitting prescribed packets in response to received packets.

Suppose that a bus 1c is disconnected from the data network, wherein there exists no IEEE 1394 device that responds against packets being transmitted thereto from each of portals. Hence, no packet response is made on the portals. If no packet response is made, the talker portal normally re-transmits the packets several times. However, when a number of times of re-transmission of the packets exceeds a prescribed number, the talker portal determines that the IEEE 1394 device 5d is disconnected from the data network, so it selectively refers to a communication path management table whose controller field describes a node ID of the IEEE 1394 device 5d within communication path management tables stored therein. Thus, the talker portal proceeds to steps SB8 to SB11 shown in FIG. 11. Or, the listener portal proceeds to steps SB25 to SB27 shown in FIG. 13. Thus, each portal discards the communication path management table regarding the IEEE 1394 device 5d, then, the portal process is ended.

[Modifications]

[Measures Against Variations of Topology]

At completion of establishment of communication paths, the IEEE 1394 device exclusively used for controlling the communication paths transmits prescribed packets to talker portals that construct parts of the communication paths. Concretely speaking, the IEEE 1394 device performs read transaction on a NODE_IDS register defined by the IEEE 1394 standard, wherein the IEEE 1394 device transmits read request packets to the portals and waits for responses. If no responses are made against the read request packets, the IEEE 1394 device performs re-transmission of the read request packets several times. If a number of times of the re-transmission of the read request packets reaches a prescribed number with respect to a certain portal (or certain portals), the IEEE 1394 device determines that a bus connected with such a portal is disconnected from the data network. Thus, it is possible to detect variations of topology of the data network.

As described above, the first embodiment is designed such that the portal secures the bandwidth and channel and makes setting of an SCR, hence, the IEEE 1394 device exclusively used for controlling the communication paths does not have to recognize the topology of the data network. In addition, the portal does not have to restore the communication path in which bus reset occurs on a certain bus. This means that a prescribed node for controlling the communication paths does not have to monitor occurrence of bus reset on a bus that constructs a part of the communication path.

[B] Second Embodiment

Next, a second embodiment of this invention will be described in detail, wherein the second embodiment is designed to secure bandwidths and channels for buses of communication paths in accordance with different protocols or procedures, which will be described below. Different from the first embodiment, the second embodiment is designed such that portals do not store communication path management tables while only an IEEE 1394 device that proceeds to establishment of communication paths stores communication path management tables therein.

Figure 17:
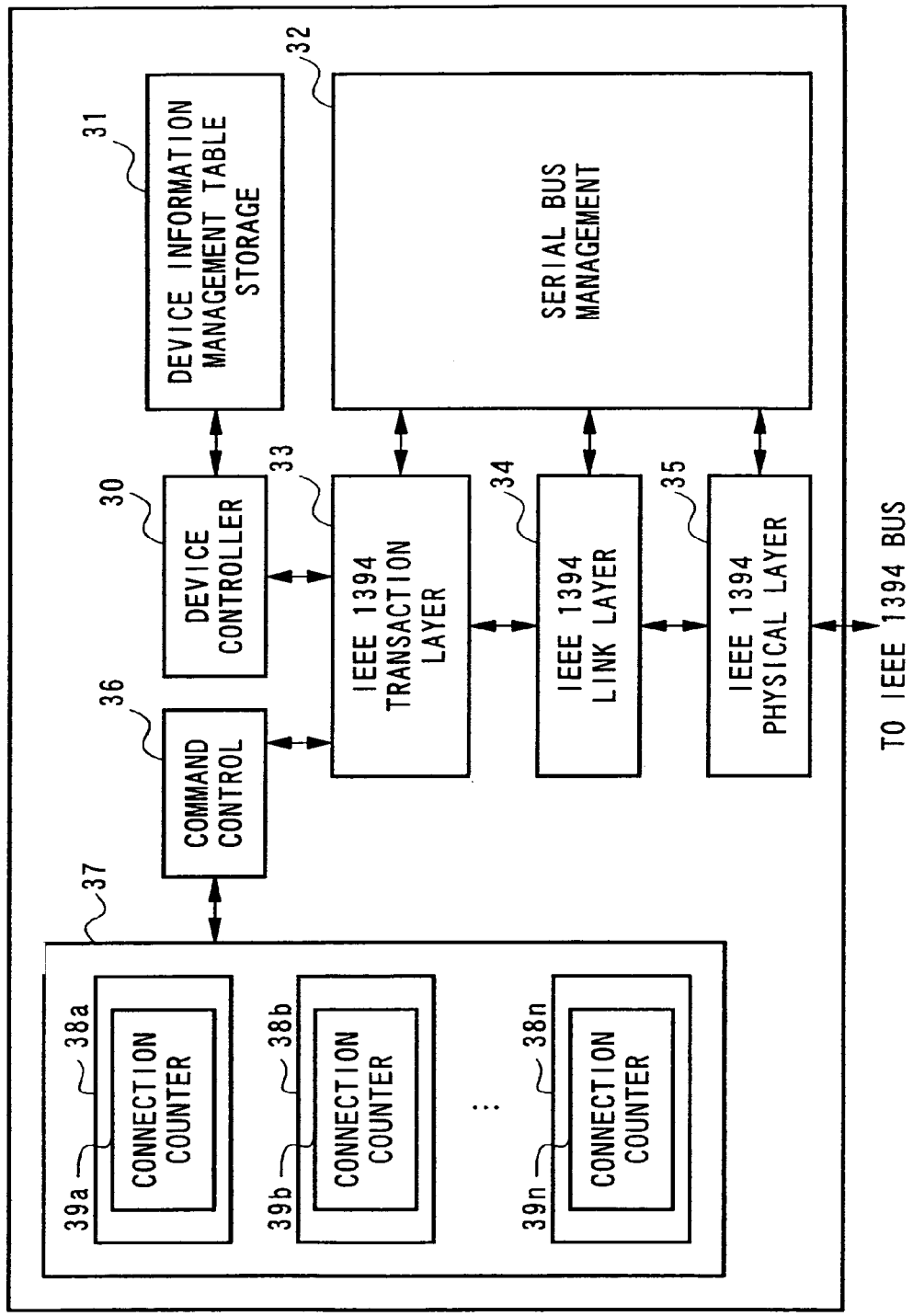
FIG. 17 is a block diagram showing an internal configuration of an IEEE 1394 device that proceeds to establishment of communication paths in accordance with a second embodiment of the invention.

FIG. 17 shows an internal configuration of an IEEE 1394 device that proceeds to establishment of communication paths in a data network. Namely, the IEEE 1394 device is configured by a device controller 30, a device information management table storage block 31, a serial bus management block 32, an IEEE 1394 transaction layer 33, an IEEE 1394 link layer 34, an IEEE 1394 physical layer 35, a command control block 36 and a communication path management table storage block 37. In the communication path management table storage block 37, there are provided plural communication path management tables 38a to 38n which respectively install connection counters 39a to 39n.

Figure 18:
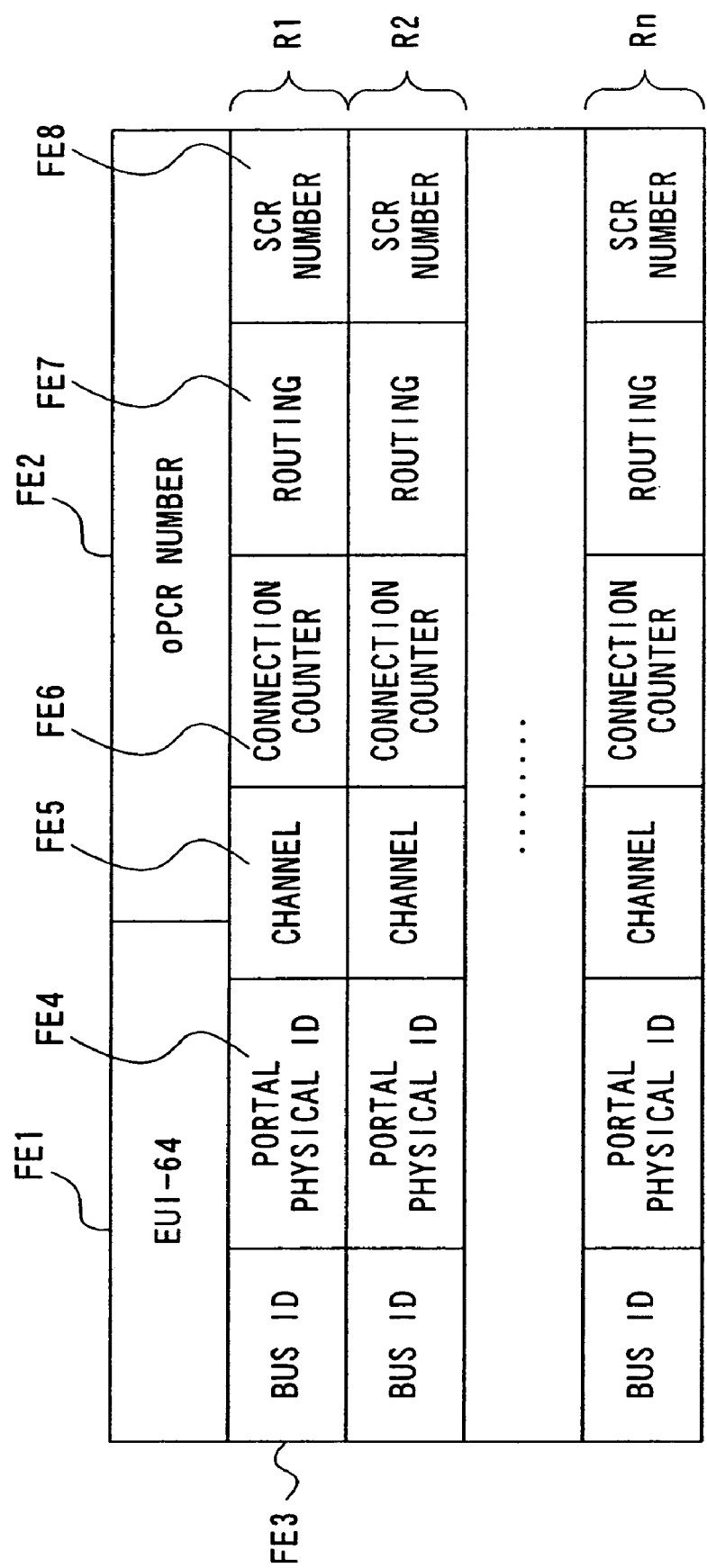
FIG. 18 shows a concrete example of a communication path management table being stored in the IEEE 1394 device shown in FIG. 17.

FIG. 18 shows a concrete example of the communication path management table stored in the IEEE 1394 device. Herein, EUI-64 field FE1 describes EUI-64 information of a transmitting node. In addition, an oPCR number field FE2 describes a number of an oPCR being used by the transmitting node. The communication path management table provides plural records R1 to Rn (where "n" is a natural number arbitrarily selected), each of which consists of plural fields FE3 to FE8. Namely, each of the records R1 to Rn installs a bus ID field FE3, a portal physical ID field FE4, a channel field FE5, a connection counter field FE6, a routing field FE7 and an SCR number field FE8.

The bus ID field FE3 describes a bus ID of a "path-constructing" bus that constructs a part of a communication path. The portal physical ID field FE4 describes a physical ID of a talker portal that communicates with the path-constructing bus. The channel field FE5 describes a channel number being secured on the path-constructing bus by the IEEE 1394 device for establishment of the communication path. The connection counter field FE6 describes a number of receiving nodes each of which uses the talker portal, being specified by values of the bus ID field FE3 and portal physical ID field FE4, as a part of the communication path being established. The routine field FE7 describes a node ID of a talker portal of a bus placed adjacent to the talker portal being specified by the values of the bus ID field FE3 and portal physical ID field FE4. The SCR number field FE8 describes a number of an SCR that is set by the talker portal specified by the physical ID described in the physical ID field FE4.

[Examination of Path Information]

Figure 19:
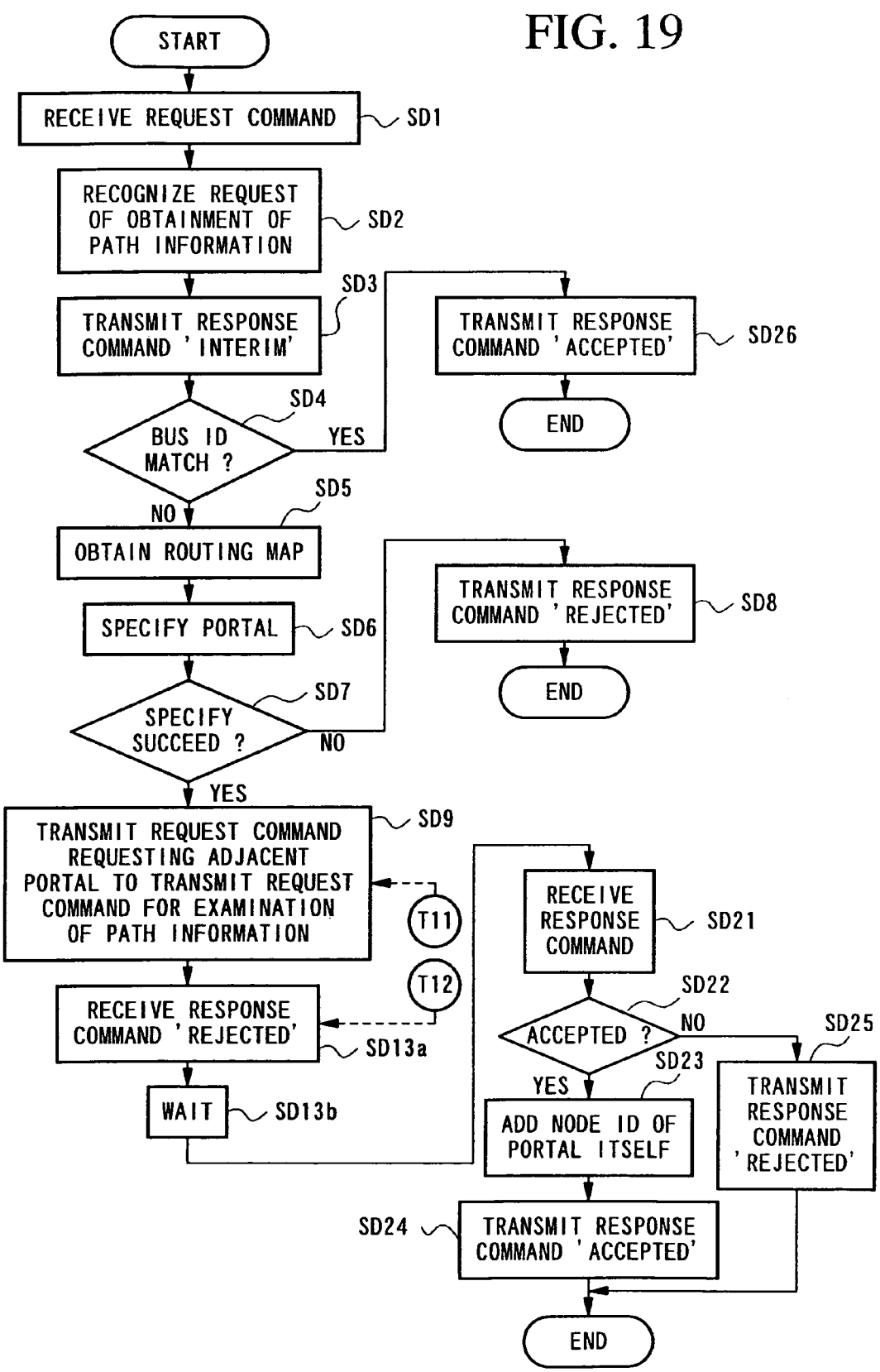
FIG. 19 is a flowchart showing a first part of a portal process for obtainment of path information.
Figure 20:
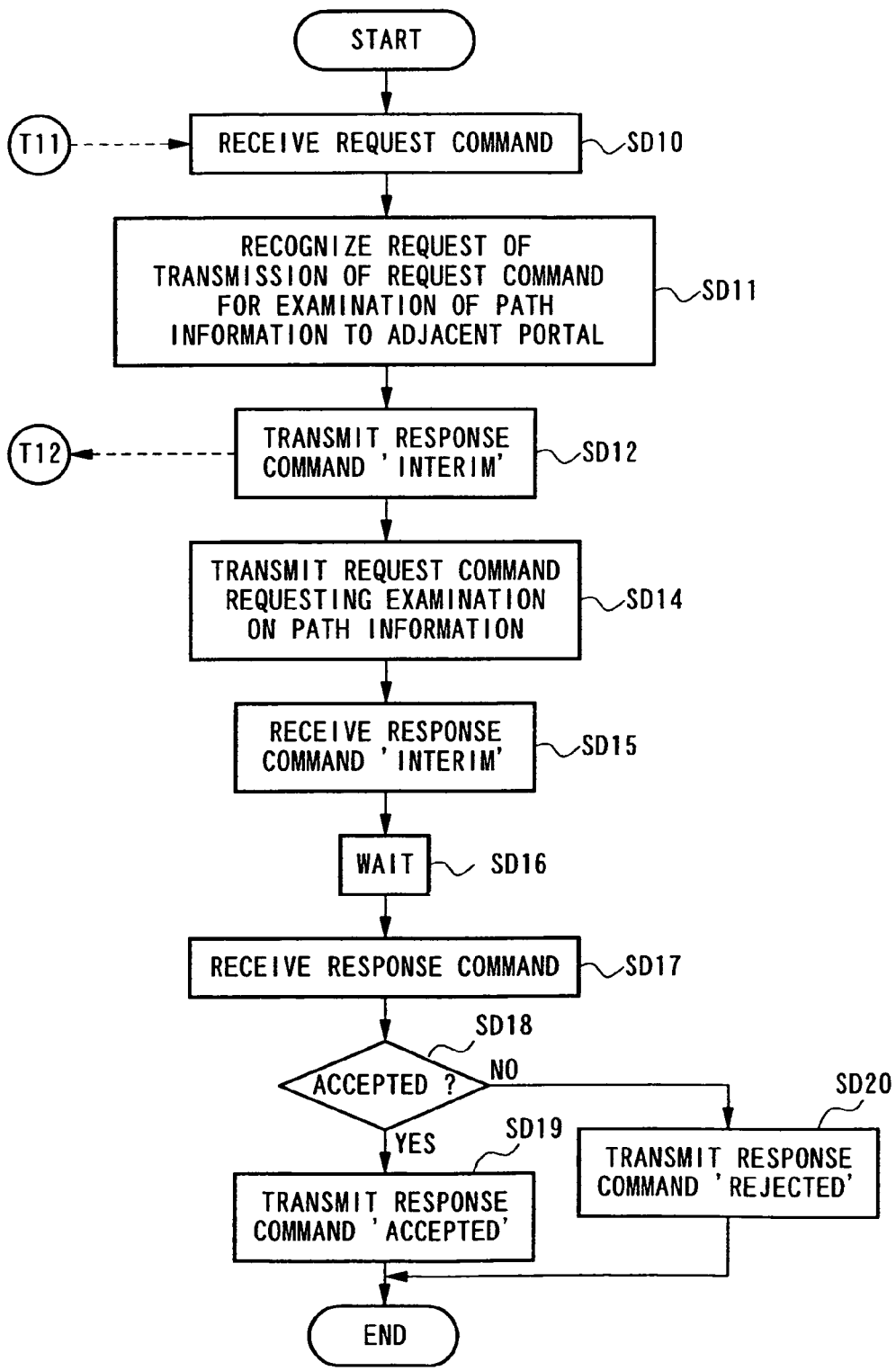
FIG. 20 is a flowchart showing a second part of the portal process for obtainment of path information.
Figure 22:
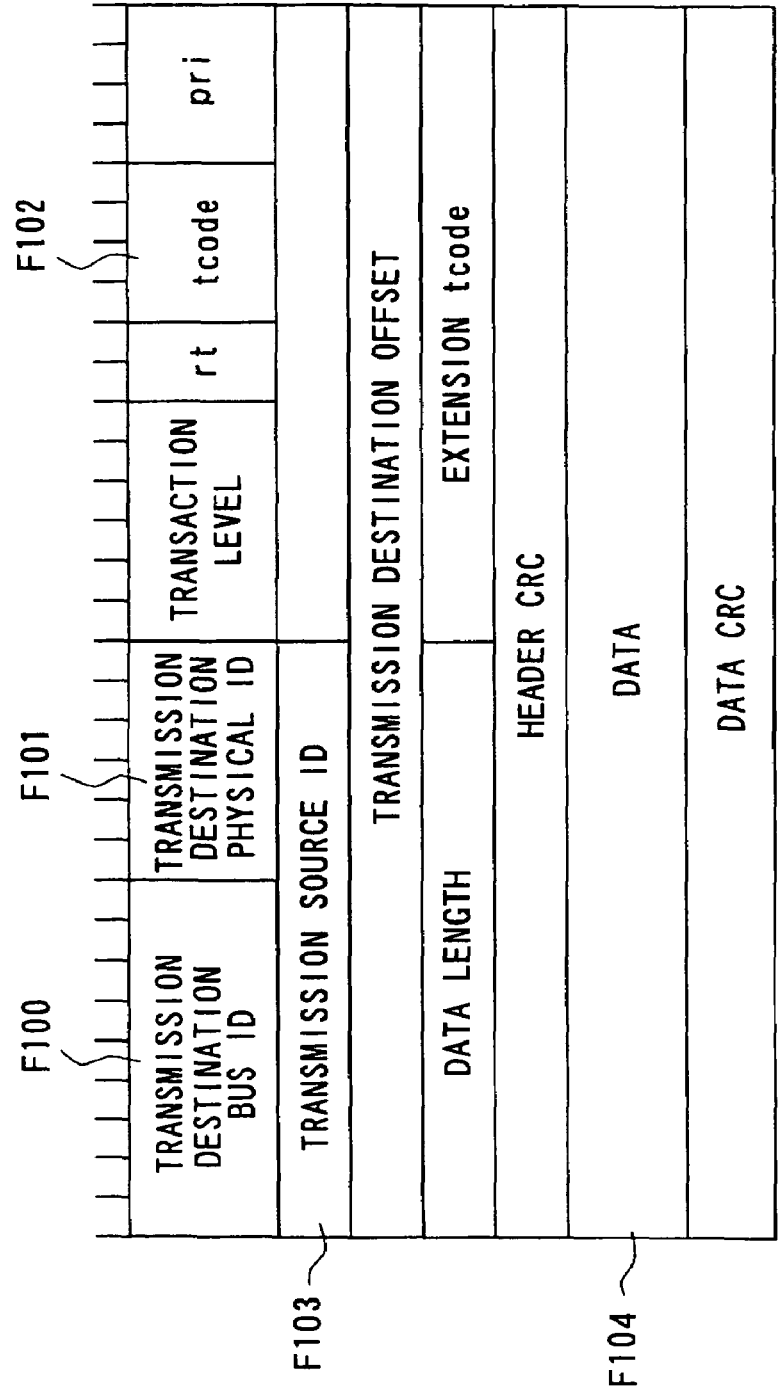
FIG. 22 shows an example of a format of an asynchronous packet.
Figure 23:
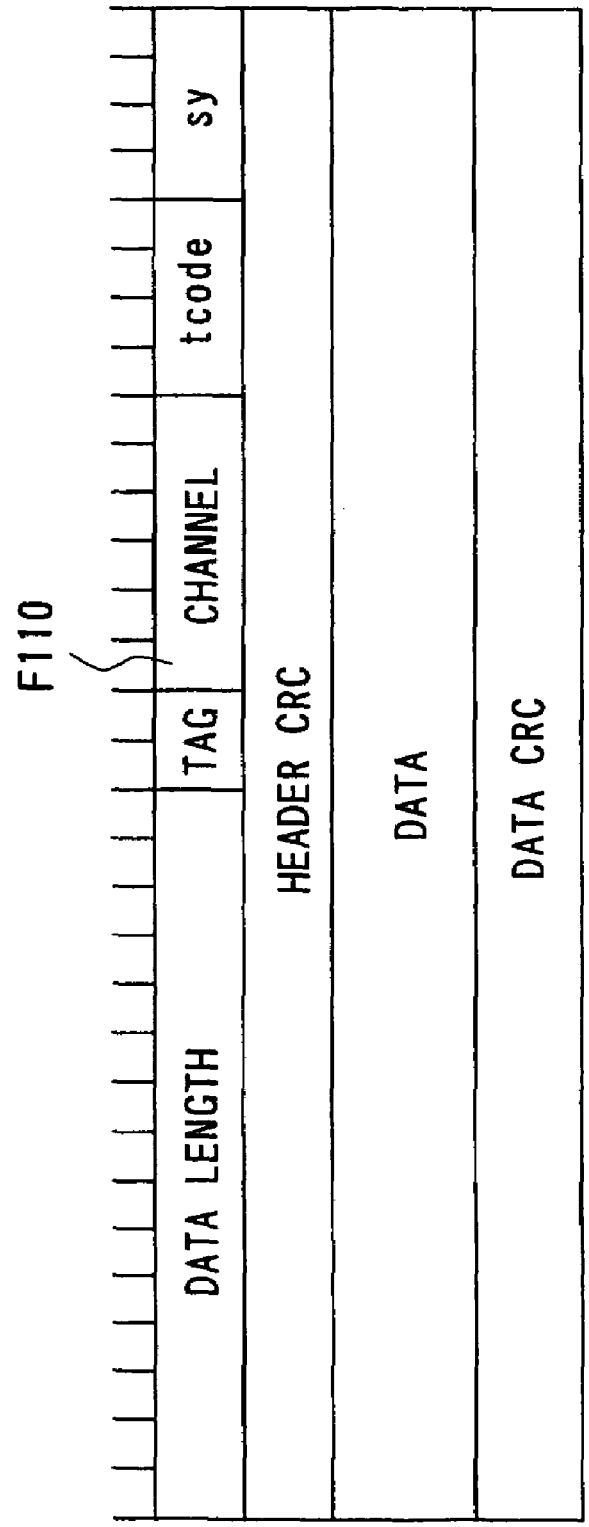
FIG. 23 shows an example of a format of a stream packet.

Suppose that in the data network shown in FIG. 1, the IEEE 1394 device 5d transmits to a portal (e.g., 7a) of a transmitting bus (e.g., 1a) a request command requesting examination on a path-constructing bus. Herein, the request command has an operand field that designates a bus ID of a receiving bus. FIGS. 19 and 20 show a portal process for obtainment of path information in the second embodiment of this invention.

The portal process is started upon receipt of the aforementioned request command from the IEEE 1394 device 5d. In FIG. 19, a flow firstly proceeds to step SD1 in which a portal 7a reads out content of the received request command from a command area thereof. In step SD2, the portal 7a recognizes a request of sending path information regarding a communication path extending to the receiving bus. After recognition, the portal transmits a response command INTERIM to the IEEE 1394 device 5d in step SD3. Then, examination is made as to whether the bus ID of the receiving bus matches with a bus ID of an own bus 1a connected with the portal 7a by itself or not in step SD4. At this time, the bus IDs do not match with each other, hence, a decision result of step SD4 is "NO". So, the flow proceeds to step SD5 in which the portal 7a obtains routing maps from all portals connected with the bus 1a connected therewith. In this case, only the portal 7a is connected with the bus 1a, so that the portal 7a obtains a routing map stored therein in step SD5.

With reference to the routing map, the portal 7a specifies a portal (or portals) to which the bus ID of the receiving bus contained in the request command is set in step SD6. Next, a decision is made as to whether the portal 7a succeeds to specify the portal or not in step SD7. If the portal 7a fails to specify the portal, in other words, if a decision result of step SD7 is "NO", the portal 7a transmits a response command REJECTED to the IEEE 1394 device 5d in step SD8, then, the portal process is ended.

If a decision result of step SD7 is "YES", the portal 7a specifies itself as the portal in which the receiving bus is set in the routing map. So, the flow proceeds to step SD9 in which the portal 7a transmits to the specified portal (namely, portal 7a itself) a request command requesting transmission to its adjacent portal a request command for examination of the communication path extending to the receiving bus. Then, the flow proceeds to step SD10 shown in FIG. 20 in which the portal 7a reads from the command area thereof content of the request command which is transmitted thereto by itself. In step SD11, the portal 7a recognizes a request of transmission of a request command for examination of the path information to the adjacent portal. In step SD12, the portal 7a transmits a response command INTERIM to the portal (i.e., portal 7a itself) that issues the request command. Then, the flow proceeds to step SD13a in which the portal 7a receives the response command INTERIM being transmitted thereto by itself. In step SD13b, the portal 7a waits for a next response command to be transmitted thereto.

In step SD14 shown in FIG. 20, the portal 7a transmits to the adjacent portal 7b a request command requesting examination on the communication path extending to the receiving bus. Herein, the bus ID of the receiving bus is set in an operand field of the transmitting request command. Upon receipt of the request command from the portal 7a, the portal 7b proceeds to steps SD1 to SD3 shown in FIG. 19, so that the portal 7b transmits a response command INTERIM to the portal 7a. So, the portal 7a receives the response command INTERM from the portal 7b in step SD15. In step SD16, the portal 7a waits for a next response command to be transmitted thereto.

Meanwhile, the portal 7b proceeds to step SD4 after transmission of the response command INTERIM to the portal 7a. At this time, a bus ID of a bus 1b of the portal 7b does not match with the bus ID of the receiving bus, hence, the portal 7b proceeds to a series of steps SD5 to SD9. In step SD9, the portal 7b transmits to the portal 9a a request command requesting transmission of a request command for examination on the communication path extending to the receiving bus to its adjacent portal. Upon receipt of the aforementioned request command from the portal 7b, the portal 9a proceeds to a series of steps SD10 to SD14 shown in FIG. 20. In step SD14, the portal 9a transmits to its adjacent portal 9b a request command requesting examination on the communication path extending to the receiving bus.

Upon receipt of the aforementioned request command from the portal 9a, the portal 9b proceeds to steps SD1 to SD3 so as to transmit a response command INTERIM to the portal 9a. Thus, the portal 9a receives the request command INTERIM from the portal 9b in step SD15. In step SD16, the portal 9a waits for a next response command to be transmitted thereto. After completion of steps SD1 to SD3, the portal 9b proceeds to step SD4 wherein a bus ID of a bus 1d of the portal 9b matches with the bus ID of the receiving bus. Hence, the portal 9b transmits a response command ACCEPTED to the portal 9a in step SD26. Herein, an operand field of the response command describes a node ID of the portal 9b itself.

Thus, the portal 9a receives the response command from the portal 9b in step SD17. In step SD18, a decision is made as to whether the received response command corresponds to 'ACCEPTED' or not. If 'ACCEPTED', namely, if a decision result of step SD18 is "YES", the flow proceeds to step SD19 in which the portal 9a transmits a response command ACCEPTED to the portal 7b that previously transmits the response command INTERIM (see step SD3) thereto, then, the portal process is ended. Incidentally, the portal 9a repeatedly describes content of the operand field of the foregoing response command ACCEPTED transmitted thereto from the portal 9b in an operand field of the response command ACCEPTED to be transmitted to the portal 7b in step SD19. If the received response command does not correspond to 'ACCEPTED', namely, if a decision result of step SD18 is "NO", the flow proceeds to step SD20 in which the portal 9a transmits a response command REJECTED to the portal 7b, then, the portal process is ended.

Thus, the portal 7b receives the response command from the portal 9a in step SD21 (see FIG. 19). In step SD22, a decision is made as to whether the received response command corresponds to 'ACCEPTED' or not. If 'ACCEPTED', namely, if a decision result of step SD22 is "YES", the flow proceeds to step SD23 in which the portal 7b provides a response command ACCEPTED whose operand field additionally describes a node ID of the portal 7b itself in addition to content of the operand field of the response command ACCEPTED transmitted thereto from the portal 9a. In step SD24, the portal 7b transmits such a response command ACCEPTED to the portal 7a that previously transmits the response command INTERIM (see step SD12), then, the portal process is ended. If the received response command does not correspond to 'ACCEPTED', namely, if a decision result of step SD22 is "NO", the flow proceeds to step SD25 in which the portal 7b transmits a response command REJECTED to the portal 7a, then, the portal process is ended.

Thus, the portal 7a receives the response command from the portal 7b in step SD17 shown in FIG. 20. Then, the flow proceeds to step SD18 in which a decision is made as to whether the received response command corresponds to 'ACCEPTED' or not. If 'ACCEPTED', the flow proceeds to step SD19 in which the portal 7a transmits a response command ACCEPTED to the portal 7a by itself. If the received response command does not correspond to 'ACCEPTED', the flow proceeds to step SD20 in which the portal 7a transmits a response command REJECTED. Thus, the portal 7a receives the response command from the portal 7a by itself in step SD21 shown in FIG. 19. In step SD22, a decision is made as to whether the received response command corresponds to 'ACCEPTED' or not. If 'ACCEPTED', the portal 7a proceeds to steps SD23 and SD24 in which the portal 7a transmits a response command to the IEEE 1394 device 5d, then, the portal process is ended. If the received response command does not correspond to 'ACCEPTED', the portal 7a proceeds to step SD25, then, the portal process is ended.

As a result, the IEEE 1394 device 5d receives response packets to read contents of their operand fields. That is the IEEE 1394 device 5d obtains node IDs of all portals that are used for path-constructing buses to construct parts of the communication path.

Incidentally, if a decision result of the foregoing step SD4 is "YES", the flow proceeds to step SD26.

[Securement of Bandwidth and Channel in Path-Constructing Bus]

In order to secure a bandwidth and a channel for a path-constructing bus, the IEEE 1394 device 5d refers to a communication path management table to check whether a node ID of a portal presently secured for a communication path is described in connection with EUI-64 information and an oPCR number of a transmitting node or not. If the node ID of the portal is described in connection with the EUI-64 information and oPCR number of the transmitting node, a value of a connection counter of the portal is being incremented by '1'. If not, a node ID of a newly secured portal is set in the communication path management table such that a value of high-order ten bits is described in a bus ID field and a value of low-order six bits is described in a portal physical ID field. In this case, a connection counter field is set to '1'.

FIG. 21 shows an example of a communication path management table whose content is being updated. After completion of updating, the IEEE 1394 device 5d compares a previous content of the communication path management table with an updated content of the communication path management table. Through comparison, the IEEE 1394 device 5d extracts from the communication path management table a newly added portion to specify a bus ID of the new portal stored therein. In the present description, no communication path is established in advance, hence, bus IDs being specified are '0', '1' and '3' respectively. Thus, the IEEE 1394 device 5d proceeds to securement of a bandwidth and a channel with respect to an IRM of each of the buses whose IDs are being specified. At completion of securement of bandwidths and channels with respect to all buses, the IEEE 1394 device 5d describes in a channel field FE5 of the communication path management table numbers of the channels being secured for the buses respectively.

If the IEEE 1394 device 5d fails to secure the bandwidth and channel, the connection counter of the communication path management table is decremented by '1'. Due to decrement, if a value of the connection counter is decreased to '0' while a certain value is still set in the corresponding channel field FE5, the IEEE 1394 device 5d proceeds to release of the bandwidth and channel with respect to the IRM of the corresponding bus. Then, the IEEE 1394 device 5d proceeds to setting of an SCR of each prescribed portal that is used as a part of the communication path. Herein, the communication path management table describes a prescribed value in a routing field FE7 with respect to each prescribed portal which is specified by a bus ID field FE3 and a portal physical ID field FE4. Thus, a request command requesting setting of an SCR is transmitted to each prescribed portal.

The request command has an operand field that describes prescribed channel numbers, namely, '1' representing a channel secured on the bus 1b of the portal 7b and '3' representing a channel secured on the bus 1a of the portal 7a, for example. Upon receipt of the request command, the portal proceeds to setting of an SCR. Herein, the portal does not only set an SCR thereof but also sets an SCR for an adjacent portal. After completion of the SCR setting, the portal transmits a response command ACCEPTED whose operand field describes a number of the SCR being set. Thus, the IEEE 1394 device 5d extracts from the operand field of the response command ACCEPTED the SCR number, which is being transferred to the communication path management table thereof.

After completion of the SCR setting, the IEEE 1394 device 5d sets an oPCR of the IEEE 1394 device 3b corresponding to the transmitting node and also sets an iPCR of the IEEE 1394 device 6b corresponding to the receiving node with reference to the channel numbers being secured on the buses 1a and 1d. After completion of the setting, the IEEE 1394 device 3b starts transmission of isochronous stream packets, so the IEEE 1394 device 6b is capable of receiving the stream packets being transmitted thereto.

[Addition of Receiving Node]

Next, a description will be given with respect to addition of a new receiving node for receiving stream packets being transmitted thereto from a transmitting node. The description is made with reference to the data network of FIG. 1 in which communication using stream packets is performed between an IEEE 1394 device 3b corresponding to the transmitting node and an IEEE 1394 device 6b corresponding to a receiving node, wherein an IEEE 1394 device 5c is added as a new receiving node.

In the above, an IEEE 1394 device 5d acts as a device controller that proceeds to establishment of communication paths. At first, the IEEE 1394 device 5d transmits to a portal 7a of a transmitting bus 1a a request command requesting examination on a path-constructing bus that constructs a part of the communication path. Herein, an operand field of the request command describes a bus ID (namely, '2') of a receiving bus 1c. Upon receipt of the request command of the IEEE 1394 device 5d requesting examination on the path-constructing bus, each of portals 7a, 7b proceeds to a series of steps SD1 to SD4 and SD26 shown in FIG. 19. In addition, each of portals 7a, 8a proceeds to a series of steps SD10 to SD20 shown in FIG. 20. Thus, the portals transmits to the IEEE 1394 device 5d response commands ACCEPTED indicating node IDs of prescribed portals that are used as parts of the communication path extending to the receiving bus. Thus, the IEEE 1394 device 5d secures the prescribed portals in connection with the communication path.

Then, the IEEE 1394 device 5d refers to a communication path management table thereof to check whether each of the node IDs of the prescribed portals being secured is described in connection with EUI-64 information and an oPCR number of the transmitting node or not. If a certain node ID of the prescribed portal is described in connection with the EUI-64 information and oPCR number of the transmitting node, a value of a corresponding connection counter field is incremented by '1'. If no node IDs are described in connection with the EUI-64 information and oPCR number of the transmitting node, the IEEE 1394 device 5d updates the communication path management table thereof in response to a node ID of a newly secured portal such that a value of high-order ten bits is described in a bus ID field and a value of low-order six bits is described in a portal physical ID field. In addition, a corresponding connection counter field is set to '1'. After completion of updating, the IEEE 1394 device 5d compares a previous content of the communication path management table with an updated content of the communication path management table. Through comparison, the IEEE 1394 device 5d extracts from the communication path management table an updated portion to specify a bus ID of the new portal stored therein. In this case, the IEEE 1394 device newly specifies a portal 8b.

The IEEE 1394 device 5d proceeds to securement of bandwidths and channels with respect to IRMs of the buses being specified respectively. After completion of the securement of the bandwidths and channels on all the buses, channel numbers of the channels being secured for the bues are transferred to the channel field of the communication path management table. If the IEEE 1394 device 5d fails to execute the securement of bandwidths and channels for the buses, it decrements values of the connection counter field of the communication path management table by '1' in connection with the buses. Due to decrement, a value of the connection counter field is decremented to '0' with respect to a certain bus, which is still connected with a certain channel number whose value still remains in the channel field. If such a certain bus exists among the buses, the IEEE 1394 device 5d proceeds to release of the bandwidth and channel on the IRM of such a certain bus.

Next, the IEEE 1394 device 5d proceeds to SCR setting with respect to each of portals being used as parts of the communication path. In the communication path management table, each of the buses is specified by values described in the bus ID field and portal physical ID field. Among those portals, the IEEE 1394 device 5d transmits a request command requesting the SCR setting to each of portals for which routing information is described in the routing field of the communication path management table. Thus, the IEEE 1394 device 5d receives response commands from all the portals on which the SCR setting is made. If the IEEE 1394 device 5d receives response commands ACCEPTED from all the portals, it proceeds to setting of an iPCR of the IEEE 1394 device 5c corresponding to the new receiving node to be added. If the IEEE 1394 device 5d receives from the portals response commands other than 'ACCEPTED', it deletes information regarding the portal 8b newly specified from the communication path management table. After completion of the setting of the iPCR of the IEEE 1394 device 5c, the IEEE 1394 device 5c is able to receive stream packets being transmitted thereto from the IEEE 1394 device 3b corresponding to the transmitting node.

[Disconnection of Communication Path]

Next, a description will be given with respect to processes for disconnection of communication paths which are established in advance. The description is made with reference to the data network of FIG. 1 in which communication paths are established in advance between an IEEE 1394 device 3b and IEEE 1394 devices 5c, 6b respectively, wherein a communication path being established between the IEEE 1394 devices 3b and 5c is to be disconnected.

First, an IEEE 1394 device 5d (namely, device controller) that proceeds to disconnection of the communication path refers to a communication path management table stored therein to specify portals that construct parts of the communication path established between the IEEE 1394 devices 3b and 5c. Namely, the IEEE 1394 device 5d specifies portals 7a, 8a, 8b and 9b. Then, the IEEE 1394 device 5d updates content of the communication path management table by decrementing each of values which are described in the connection counter field in connection with the specified portals respectively by '1'. With reference to an updated content of the communication path management table, the IEEE 1394 device 5d specifies a bus ID of a bus for which a value of the connection counter field is decremented to '0'. In this case, the IEEE 1394 device 5d specifies the portal 8b.

That is, the IEEE 1394 device 5d specifies a bus 1c corresponding to a bus ID which is described in the bus ID field in connection with the value '0' of the connection counter field. So, the IEEE 1394 device 5d proceeds to release of a bandwidth and a channel with respect to an IEEE 1394 device 5a which is an IRM of the bus 1c being specified. Then, the IEEE 1394 device 5d transmits a request command of clearing SCR setting to the portal (namely, 8b) which is listed in the communication path management table in connection with the value '0' of the connection counter field.

An operand field of the aforementioned request command describes a number of an SCR to be cleared. The portal 8b reads content of the request command from a command area thereof so as to recognize a request of clearing the SCR setting thereof. Then, the portal 8b itself and its adjacent portal 8a clear the SCR setting with respect to the SCR number. After completion of the aforementioned processes, the portal 8b transmits a response command ACCEPTED. Upon receipt of the response command ACCEPTED from the portal 8b, the IEEE 1394 device 5d recognizes that disconnection of the communication path is completed. Then, the IEEE 1394 device 5d deletes information regarding the value '0' of the connection counter field from the communication path management table. Thus, the IEEE 1394 device 5d clears setting of an iPCR of the IEEE 1394 device 5c.

[Bus Reset on Path-Constructing Bus]

An IEEE 1394 device (e.g., 5d) that controls communication paths proceeds to transmission of prescribed request commands at completion of establishment of the communication paths. Namely, with reference to a communication path management table shown in FIG. 18, the IEEE 1394 device transmits to all portals, which are specified by values described in a bus ID field FE3 and a portal physical ID field FE4, request commands that request the portals to make communications upon detection of bus resets. Thus, the portals receiving the aforementioned request commands make communications by transmitting response packets therefrom when detecting bus resets respectively. Due to the communications, the IEEE 1394 device for controlling the communication paths recognizes occurrence of the bus resets and proceeds to re-securement of bandwidths and channels.

Next, a concrete description is given with respect to re-securement of bandwidths and channels under control of the IEEE 1394 device for controlling communication paths. The description is made with reference to the data network shown in FIG. 1 in which communication paths are established in advance between an IEEE 1394 device 3b and IEEE 1394 devices 5c, 6a respectively, wherein bus reset occurs on a bus 1b, for example. After occurrence of the bus reset, a transmitting node and receiving nodes remain being connected with the data network. At occurrence of the bus reset on the bus 1b, a portal 7b makes a communication to an IEEE 1394 device 5d for controlling the communication paths. Upon receipt of the communication, the IEEE 1394 device 5d refers to a communication path management table thereof to extract a value of a bandwidth field and a value of a channel field which are described in connection with a bus ID of the bus 1b and a physical ID of the portal 7b. Based on the extracted values, the IEEE 1394 device 5d proceeds to re-securement of a bandwidth and a channel with respect to an IEEE 1394 device 4b which is an IRM of the bus 1b. In response to results of the re-securement, the IEEE 1394 device 5d proceeds to different processes, which will be described below with regard to three cases.

(1) First case where the IEEE 1394 device 5d succeeds to re-secure the bandwidth and channel In this case, the IEEE 1394 device 5d refers to a value of the bus ID field which is described in connection with the physical ID of the portal physical ID field representing the portal (i.e., 7b) which makes a communication notifying occurrence of the bus reset. Thus, the IEEE 1394 device 5d checks whether such a value of the bus ID field matches with either a bus ID of a transmitting bus or a bus ID of a receiving bus or not. If the value matches with the bus ID of the transmitting bus, the IEEE 1394 device 5d makes again setting of an oPCR of a transmitting node, then, the process is ended. If the value matches with the bus ID of the receiving bus, the IEEE 1394 device 5d makes again setting of an iPCR of a receiving node, then, the process is ended. If the value does not match with both of the bus IDs, the IEEE 1394 device 5d immediately ends the process thereof (2) Second case where the IEEE 1394 device 5d succeeds to re-secure the bandwidth and channel, whereas a re-secured channel number differs from a previous channel number previously secured prior to occurrence of the bus reset The IEEE 1394 device 5d updates the communication path management table by changing a value of the channel field, which is described in connection with the portal 7b, with a new value designating the re-secured channel number. Then, the IEEE 1394 device 5d requests the portal 7b to update its SCR setting in response to the re-secured channel number. Upon receipt of a response command declaring that the portal 7b completes updating the SCR setting, the IEEE 1394 device 5d refers to a value of the bus ID field, which is described in connection with the physical ID of the portal physical ID field representing the portal (i.e., 7b) making a communication indicating occurrence of the bus reset, in the communication path management table. Then, the IEEE 1394 device 5d checks whether such a value of the bus ID field matches with either the bus ID of the transmitting bus or bus ID of the receiving bus or not. If the value matches with the bus ID of the transmitting bus, the IEEE 1394 device 5d performs again setting of the oPCR of the transmitting node, then, the process is ended. If the value matches with the bus ID of the receiving bus, the IEEE 1394 device 5d makes again setting of the iPCR of the receiving node, then, the process is ended. If the value does not match with both of the bus IDs, the IEEE 1394 device 5d immediately ends the process thereof.

(3) Third case where the IEEE 1394 device 5d fails to re-secure the bandwidth or channel With reference to the communication path management table, the IEEE 1394 device 5d extracts a value ('2') of a connection counter field and a value (namely, a node ID of the portal 7a) of a routing field, which are stored in connection with the bus ID of the bus on which bus reset occurs. Then, the IEEE 1394 device 5d specifies a value ('0') of a bus ID field that matches with high-order ten bits of the extracted value of the routing field. So, the IEEE 1394 device 5d decreases a value of a connection counter field, which is stored in connection with the specified value of the bus ID field, by the foregoing value of the connection counter field being previously extracted. Thus, the IEEE 1394 device 5d updates each of fields concerned with the connection counter field whose value is decreased. Thereafter, the IEEE 1394 device 5d newly extracts a value of a routing field which is stored in connection with the aforementioned fields being updated. So, the IEEE 1394 device 5d specifies a value of a bus ID field that matches with high-order ten bits of the newly extracted value of the routing field. Thus, the IEEE 1394 device 5d repeats the aforementioned processes.

If the IEEE 1394 device 5d fails to extract a value of a routing field to which no value is set in advance, the IEEE 1394 device 5d designates another routing field corresponding to a node ID of a specific portal (namely, a node ID of the portal 7b) which is specified in response to a portal physical ID described in connection with a bus ID of a bus that detects bus reset. Then, the IEEE 1394 device 5d sets a value of a connection counter field, which is stored in connection with a value of the designated routing field, to '0'. Thus, the IEEE 1394 device 5d updates each of fields concerned with the connection counter field whose value is set to '0'. Then, the IEEE 1394 device 5d designates a routing field corresponding to a node ID of a portal that is specified by a value of a bus ID field and a value of a portal physical ID field which are stored in connection with the aforementioned fields being updated. Thereafter, the IEEE 1394 device 5d ends the process thereof.

If the IEEE 1394 device 5d fails to designate the routing field, the IEEE 1394 device 5d refers to the communication path management table thereof to extract a value of a bus ID field which is stored in connection with a specific connection counter field whose value is '0'. Then, the IEEE 1394 device 5d proceeds to release of a bandwidth and a channel on an IRM of a bus to which a bus ID corresponding to the extracted value of the bus ID field is being allocated. The IEEE 1394 device 5d repeats the aforementioned process on all buses whose bus IDs are stored in connection with the connection counter field whose value is '0'. At completion of the process with regard to all buses, the IEEE 1394 device 5d sets a value of the connection counter field, which is stored in connection with the bus ID of the bus on which bus reset occurs, to '0'. Lastly, the IEEE 1394 device 5d discards all information data which are stored in connection with the connection counter field whose value is '0', then, it ends the process thereof.

According to the second embodiment described above, the IEEE 1394 device for controlling communication paths is used to perform securement of bandwidths and channels on path-constructing buses. This simplifies portal processes being executed by portals. In addition, the IEEE 1394 device for controlling communication paths concentrates all pieces of information used for management of the communication paths therein. If the data network is configured using plural IEEE 1394 devices each of which is capable of controlling communication paths, it is possible to perform transactions of management information between those devices with ease.

The aforementioned embodiments describe examples of communication path control devices. Of course, this invention is not necessarily limited to those embodiments, so it is possible to arbitrarily change designs of the devices within the scope of this invention. The aforementioned embodiments are described exclusively with respect to applications of the IEEE 1394 standard. However, this invention is applicable to any types of communication path control devices that are capable of performing serial bidirectional communications using packets and that are connectable with any types of buses for connecting together multiple audio/visual devices or else.

As described heretofore, this invention has various technical features and effects, which are described below.

(1) Portals are designed to perform securement of bandwidths and channels as well as SCR setting in a data network configured by interconnections of buses by means of bridges. Hence, each IEEE 1394 device (or each node) for controlling communication paths is not required to consider topology of the data network. In addition, each portal proceeds to restoration of a path-constructing bus on which bus reset occurs. Thus, each node for controlling communication paths is not required to monitor occurrence of the bus reset on the path-constructing bus.

(2) If each IEEE 1394 device for controlling communication paths is designed to perform securement of bandwidths and channels, it is possible to simplify portal processes being executed by the portals. In addition, the IEEE 1394 device for controlling communication paths concentrates all pieces of information used for management of the communication paths therein. Hence, if the data network contains plural IEEE 1394 devices each of which controls communication paths, it is possible to perform transactions of management information between those devices with ease.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A bridge for interconnecting together a plurality of buses each of which interconnects at least one node in a data network, comprising:

storage means for storing a number of receiving nodes with respect to each of connections being established between nodes interconnected together on a same bus or each of connections being established between nodes interconnected together by means of different buses;
means for detecting occurrence of the bus reset on the specific bus; and
means for re-securing again resources that are previously secured before occurrence of the bus reset on the specific bus by a specific portal connected with the specific bus,
wherein a transmitting node and a receiving node remain connected with the data network regardless of occurrence of a bus reset on a specific bus constituting a part of a communication path that is established in advance for communication of stream packets.

2. A bridge according to claim 1 wherein the plurality of buses are made based on an IEEE 1394 standard, said bridge comprising a plurality of portals which are respectively connected with different buses, so that communication is performed between the different buses based on the IEEE 1394 standard.

3. A device controller for controlling communication in a data network configured by a plurality of buses each of which interconnects at least one node, comprising:

storage means for storing a number of receiving nodes with respect to each of connections being established between nodes interconnected together on a same bus or each of connections being established between nodes interconnected together by means of different buses;
means for detecting occurrence of the bus reset on the specific bus; and
means for re-securing again resources that are previously secured before occurrence of the bus reset on the specific bus by a specific portal connected with the specific bus,
wherein a transmitting node and a receiving node remain connected with the data network regardless of occurrence of a bus reset on a specific bus constituting a part of a communication path that is established in advance for communication of stream packets.

4. A device controller according to claim 3 wherein the plurality of buses are made based on an IEEE 1394 standard.

5. A communication path control method for controlling communication paths established in a data network that is configured by a plurality of buses each of which interconnects at least one node and which are connected together by means of at least one bridge installing a storage means, said communication path management method comprising the steps of:

storing to the storage means of the bridge a number of receiving nodes with respect to each of connections being established between nodes interconnected together on a same bus or each of connections being established between nodes interconnected together by means of different buses;
controlling each of the communication paths to be established or disconnected by increasing or decreasing the number of receiving nodes in the storage means;
detecting occurrence of the bus reset on the specific bus; and
re-securing again resources that are previously secured before occurrence of the bus reset on the specific bus by a specific portal connected with the specific bus,
wherein a transmitting node and a receiving node remain connected with the data network regardless of occurrence of a bus reset on a specific bus constituting a part of a communication path that is established in advance for communication of stream packets.

6. A communication path control method according to claim 5 wherein the bridge installs a first portal for receiving stream packets from a first bus connected thereto and a second portal for repeating the stream packets to be transmitted to a second bus connected thereto, the first and second portals respectively having counters for storing a number of receiving nodes with respect to each of connections being established between nodes on the first and second buses respectively, and wherein if both of the counters of the first and second portals are changed to a prescribed integral number which is not less than '1' with respect to same stream packets concerned with both of the first and second portals, the stream packets are received by the first portal and are then transmitted to the second bus by way of the second portal.

7. A communication path control method according to claim 6 further comprising the step of: releasing setting for transmission of the stream packets from the first portal to the second portal if at least one of the counters of the first and second portals is changed to '0' with respect to the same stream packets concerned with both of the first and second portals.

8. A communication path control method according to claim 7 further comprising the steps of:
searching the first and second portals of the bridge being respectively connected with the first and second buses that construct parts of a communication path to be established, and
incrementing the counters of the first and second portals by '1' to establish the communication path using the first and second buses being interconnected together by means of the bridge.

9. A communication path control method according to claim 7 further comprising the step of:
decrementing the counters of the first and second portals by '1' to release the communication path that is established in advance by using the first and second buses being interconnected together by means of the bridge.

10. A communication path control method according to claim 8 wherein the counters of the first and second portals are changed by '1' after completion of a search of the first and second portals of the bridge that exists in the communication path being established between a transmitting node and a receiving node.

11. A communication path control method according to claim 8 wherein a process of changing the counters of the first and second portals by '1' is repeated from one end of the communication path to another end of the communication path.

12. A communication path control method according to claim 8 wherein each of the first and second buses that construct parts of the communication path interconnects thereon at least one node which installs a control means for searching portals depending on the communication path and changing their counters in value under a request.

13. A communication path control method according to claim 8 wherein the data network interconnects therein at least one node for searching portals existing on the communication path and storing identifiers of the portals being searched, so that the communication path is to be established or released on the basis of the identifiers extracted from the node.

14. A communication path control method according to claim 8 wherein each portal provides transfer information for determination whether to transfer asynchronous packets based on a IEEE 1394 standard being received from its own bus connected thereto to another bus or not, said communication path control method further comprising the steps of:
extracting the transfer information from all portals connected with a transmitting bus on the communication path;
designating a portal providing transfer information representing transfer of the asynchronous packets to a receiving node of a receiving bus on the communication path; and
requesting an adjacent portal of the designated portal in a same bridge to search portals that exist on the communication path.

15. A communication path control method according to claim 14 further comprising the steps of:
periodically transmitting to each of portals that construct parts of the communication path prescribed asynchronous packets;
making determination that a specific bus connected with a specific portal which do not respond to the prescribed asynchronous packets being periodically transmitted is disconnected from the data network; and
disconnecting the communication path using the specific portal connected with the specific bus.

16. A communication path control method according to claim 9 wherein the counters of the first and second portals are changed by '1' after completion of a search of the first and second portals of the bridge that exists in the communication path being established between a transmitting node and a receiving node.

17. A communication path control method according to claim 9 wherein a process of changing the counters of the first and second portals by '1' is repeated from one end of the communication path to another end of the communication path.

18. A communication path control method according to claim 9 wherein each of the first and second buses that construct parts of the communication path interconnects thereon at least one node which installs a control means for searching portals depending on the communication path and changing their counters in value under a request.

19. A communication path control method according to claim 9 wherein the data network interconnects therein at least one node for searching portals existing on the communication path and storing identifiers of the portals being searched, so that the communication path is to be established or released on the basis of the identifiers extracted from the node.

20. A communication path control method according to claim 9 wherein each portal provides transfer information for determination whether to transfer asynchronous packets based on a IEEE 1394 standard being received from its own bus connected thereto to another bus or not, said communication path control method further comprising the steps of:
extracting the transfer information from all portals connected with a transmitting bus on the communication path;
designating a portal providing transfer information representing transfer of the asynchronous packets to a receiving node of a receiving bus on the communication path; and
requesting an adjacent portal of the designated portal in a same bridge to search portals that exist on the communication path.

21. A communication path control method according to claim 20 further comprising the steps of:

periodically transmitting to each of portals that construct parts of the communication path prescribed asynchronous packets;

making determination that a specific bus connected with a specific portal which do not respond to the prescribed asynchronous packets being periodically transmitted is disconnected from the data network; and disconnecting the communication path using the specific portal connected with the specific bus.

22. A communication path control method according to claim 6 further comprising the steps of: searching the first and second portals of the bridge being respectively connected with the first and second buses that construct parts of a communication path to be established; and incrementing the counters of the first and second portals by '1' to establish the communication path using the first and second buses being interconnected together by means of the bridge.

23. A communication path control method according to claim 22 wherein the counters of the first and second portals are changed by '1' after completion of a search of the first and second portals of the bridge that exists in the communication path being established between a transmitting node and a receiving node.

24. A communication path control method according to claim 22 wherein a process of changing the counters of the first and second portals by '1' is repeated from one end of the communication path to another end of the communication path.

25. A communication path control method according to claim 22 wherein each of the first and second buses that construct parts of the communication path interconnects thereon at least one node which installs a control means for searching portals depending on the communication path and changing their counters in value under a request.

26. A communication path control method according to claim 22 wherein the data network interconnects therein at least one node for searching portals existing on the communication path and storing identifiers of the portals being searched, so that the communication path is to be established or released on the basis of the identifiers extracted from the node.

27. A communication path control method according to claim 22 wherein each portal provides transfer information for determination whether to transfer asynchronous packets based on an IEEE 1394 standard being received from its own bus connected thereto to another bus or not, said communication path control method further comprising the steps of:

extracting the transfer information from all portals connected with a transmitting bus on the communication path;

designating a portal providing transfer information representing transfer of the asynchronous packets to a receiving node of a receiving bus on the communication path; and requesting an adjacent portal of the designated portal in a same bridge to search portals that exist on the communication path.

28. A communication path control method according to claim 27 further comprising the steps of:

periodically transmitting to each of portals that construct parts of the communication path prescribed asynchronous packets;

making determination that a specific bus connected with a specific portal which do not respond to the prescribed asynchronous packets being periodically transmitted is disconnected from the data network; and disconnecting the communication path using the specific portal connected with the specific bus.

29. A communication path control method according to claim 6 further comprising the step of: decrementing the counters of the first and second portals by '1' to release the communication path that is established in advance by using the first and second buses being interconnected together by means of the bridge.

30. A communication path control method according to claim 29 wherein the counters of the first and second portals are changed by '1' after completion of a search of the first and second portals of the bridge that exists in the communication path being established between a transmitting node and a receiving node.

31. A communication path control method according to claim 29 wherein a process of changing the counters of the first and second portals by '1' is repeated from one end of the communication path to another end of the communication path.

32. A communication path control method according to claim 29 wherein each of the first and second buses that construct parts of the communication path interconnects thereon at least one node which installs a control means for searching portals depending on the communication path and changing their counters in value under a request.

33. A communication path control method according to claim 29 wherein the data network interconnects therein at least one node for searching portals existing on the communication path and storing identifiers of the portals being searched, so that the communication path is to be established or released on the basis of the identifiers extracted from the node.

34. A communication path control method according to claim 29 wherein each portal provides transfer information for determination whether to transfer asynchronous packets based on a IEEE 1394 standard being received from its own bus connected thereto to another bus or not, said communication path control method further comprising the steps of:

extracting the transfer information from all portals connected with a transmitting bus on the communication path;

designating a portal providing transfer information representing transfer of the asynchronous packets to a receiving node of a receiving bus on the communication path; and requesting an adjacent portal of the designated portal in a same bridge to search portals that exist on the communication path.

35. A communication path control method according to claim 34 further comprising the steps of:

periodically transmitting to each of portals that construct parts of the communication path prescribed asynchronous packets;

making determination that a specific bus connected with a specific portal which do not respond to the prescribed asynchronous packets being periodically transmitted is disconnected from the data network; and disconnecting the communication path using the specific portal connected with the specific bus.

36. A communication path control method according to claim 6 wherein bus reset occurs on a specific bus constructing a part of a communication path that is established in advance for communication of stream packets from a transmitting node to a receiving node, said communication path control method further comprising the steps of:

making detection that the transmitting node and the receiving node do not remain being connected in the data network after completion of initialization on the specific bus; and disconnecting the communication path that performs communication using the stream packets before the initialization of the specific bus by a specific portal connected with the specific bus.

37. A communication path control system for use in a data network comprising:

a plurality of buses each of which installs at least one node as an isochronous resource manager (IRM) based on an IEEE 1394 standard;

at least one bridge that consists of at least two portals for interconnecting together two buses which are placed adjacent to each other within the plurality of buses, wherein each portal has a connection counter for counting a number of receiving nodes each of which receives stream packets being transmitted thereto from a transmitting node by way of each portal by itself;

a device controller that is connected with one of the plurality of buses to specify all portals that lie in a communication path extending from the transmitting node to a prescribed receiving node, so that the device controller requests each of the specified portals to increment a value of the connection counter by '1' for establishment of the communication path or the device controller requests each of the specified portals to decrement a value of the connection counter by '1' for release of the communication path;

means for detecting occurrence of the bus reset on the specific bus; and means for re-securing again resources that are previously secured before occurrence of the bus reset on the specific bus by a specific portal connected with the specific bus, wherein a transmitting node and a receiving node remain connected with the data network regardless of occurrence of a bus reset on a specific bus constituting a part of a communication path that is established in advance for communication of stream packets.

38. A communication path control system according to claim 37 wherein each of the portals stores a communication path management table containing the connection counter whose value is incremented or decremented to establish or disconnect the communication path.

39. A communication path control system according to claim 37 wherein the device controller stores a communication path management table that describes resources in connection with a connection counter with respect to each of buses that construct parts of the communication path being established, so that the device controller proceeds to establishment of a new communication path by increasing the connection counter or the device controller proceeds to disconnection of the communication path by decreasing the connection counter.

40. A communication path control system according to claim 39 wherein the resources describe at least a bandwidth and a channel number being used for communication over the communication path.

41. A communication path control system according to claim 39 wherein at occurrence of bus reset on a specific bus within the buses corresponding to the communication path, a specific portal connected with the specific bus proceeds to initialization of the specific bus, then, the device controller proceeds to re-securement of the resources which are previously secured before occurrence of the bus reset if the transmitting node and the receiving node remain being connected in the data network after occurrence of the bus reset.

42. A communication path control system according to claim 39 wherein at occurrence of bus reset on a specific bus within the buses corresponding to the communication path, a specific portal connected with the specific bus proceeds to initialization of the specific bus, then, the device controller proceeds to disconnection of the communication path if at least one of the transmitting node and the receiving node is disconnected from the data network after occurrence of the bus reset.

43. A communication path control method for controlling communication paths established in a data network that is configured by a plurality of buses each of which interconnects at least one node and which are connected together by means of at least one bridge under control of at least one device controller installing a storage means, said communication path management method comprising the steps of:

storing to the storage means of the device controller a number of receiving nodes with respect to each of connections being established between nodes interconnected together on a same bus or each of connections being established between nodes interconnected together by means of different buses;

controlling each of the communication paths to be established or disconnected by increasing or decreasing the number of receiving nodes in the storage means;

detecting occurrence of the bus reset on the specific bus; and re-securing again resources that are previously secured before occurrence of the bus reset on the specific bus by a specific portal connected with the specific bus, wherein a transmitting node and a receiving node remain connected with the data network regardless of occurrence of a bus reset on a specific bus constituting a part of a communication path that is established in advance for communication of stream packets.

44. A communication path control method according to claim 43 wherein the bridge installs a first portal for receiving stream packets from a first bus connected thereto and a second portal for repeating the stream packets to be transmitted to a second bus connected thereto, the first and second portals respectively having counters for storing a number of receiving nodes with respect to each of connections being established between nodes on the first and second buses respectively, and wherein if both of the counters of the first and second portals are changed to a prescribed integral number which is not less than '1' with respect to same stream packets concerned with both of the first and second portals, the stream packets are received by the first portal and are then transmitted to the second bus by way of the second portal.

45. A communication path control method according to claim 44 further comprising the step of: releasing setting for transmission of the stream packets from the first portal to the second portal if at least one of the counters of the first and second portals is changed to '0' with respect to the same stream packets concerned with both of the first and second portals.

46. A communication path control method according to claim 44 wherein bus reset occurs on a specific bus constructing a part of a communication path that is established in advance for communication of stream packets from a transmitting node to a receiving node, said communication path control method further comprising the steps of:

making detection that the transmitting node and the receiving node do not remain being connected in the data network after completion of initialization on the specific bus; and disconnecting the communication path that performs communication using the stream packets before the initialization of the specific bus by a specific portal connected with the specific bus.

47. A communication path control method according to claim 45 wherein a transmitting node and a receiving node remain being connected with the data network regardless of occurrence of bus reset on a specific bus constructing a part of a communication path that is established in advance for communication of stream packets, said communication path control method further comprising the steps of:

detecting occurrence of the bus reset on the specific bus; and re-securing again resources that are previously secured before occurrence of the bus reset on the specific bus by a specific portal connected with the specific bus.

48. A communication path control method according to claim 47 further comprising the steps of:

making detection as to whether re-securement of the resources fails; and if the re-securement fails, disconnecting the communication path that performs communication using the stream packets by way of the specific portal.

49. A communication path control method according to claim 47 wherein upon detection of the occurrence of the bus reset on the specific bus, the specific portal proceeds to re-securement of the resources or disconnection of the communication path after completion of initialization of the specific bus.

50. A communication path control method according to claim 47 further comprising the steps of:

requesting at least one node connected on the specific bus to make a communication upon detection of the bus reset; and upon receipt of the communication, proceeding to re-securement of the resources or disconnection of the communication path by the specific portal.

51. A communication path control method according to claim 45 further comprising the steps of:

making detection as to whether re-securement of the resources fails; and if the re-securement fails, disconnecting the communication path that performs communication using the stream packets by way of the specific portal.

52. A communication path control method according to claim 45 wherein upon detection of the occurrence of the bus reset on the specific bus, the specific portal proceeds to re-securement of the resources or disconnection of the communication path after completion of initialization of the specific bus.

53. A communication path control method according to claim 45 further comprising the steps of:

requesting at least one node connected on the specific bus to make a communication upon detection of the bus reset; and upon receipt of the communication, proceeding to re-securement of the resources or disconnection of the communication path by the specific portal.

54. A communication path control method according to claim 45 further comprising the steps of:

searching the first and second portals of the bridge being respectively connected with the first and second buses that construct parts of a communication path to be established; and incrementing the counters of the first and second portals by '1' to establish the communication path using the first and second buses being interconnected together by means of the bridge.

55. A communication path control method according to claim 54 wherein the counters of the first and second portals are changed by '1' after completion of a search of the first and second portals of the bridge that exists in the communication path being established between a transmitting node and a receiving node.

56. A communication path control method according to claim 54 wherein a process of changing the counters of the first and second portals by '1' is repeated from one end of the communication path to another end of the communication path.

57. A communication path control method according to claim 54 wherein each of the first and second buses that construct parts of the communication path interconnects thereon at least one node which installs a control means for searching portals depending on the communication path and changing their counters in value under a request.

58. A communication path control method according to claim 54 wherein the data network interconnects therein at least one node for searching portals existing on the communication path and storing identifiers of the portals being searched, so that the communication path is to be established or released on the basis of the identifiers extracted from the node.

59. A communication path control method according to claim 45 further comprising the step of:

decrementing the counters of the first and second portals by '1' to release the communication path that is established in advance by using the first and second buses being interconnected together by means of the bridge.

60. A communication path control method according to claim 59 wherein the counters of the first and second portals are changed by '1' after completion of a search of the first and second portals of the bridge that exists in the communication path being established between a transmitting node and a receiving node.

61. A communication path control method according to claim 59 wherein a process of changing the counters of the first and second portals by '1' is repeated from one end of the communication path to another end of the communication path.

62. A communication path control method according to claim 59 wherein each of the first and second buses that construct parts of the communication path interconnects thereon at least one node which installs a control means for searching portals depending on the communication path and changing their counters in value under a request.

63. A communication path control method according to claim 59 wherein the data network interconnects therein at least one node for searching portals existing on the communication path and storing identifiers of the portals being searched, so that the communication path is to be established or released on the basis of the identifiers extracted from the node.

64. A communication path control method according to claim 54 wherein each portal provides transfer information for determination whether to transfer asynchronous packets based on an IEEE 1394 standard being received from its own bus connected thereto to another bus or not, said communication path control method further comprising the steps of:

extracting the transfer information from all portals connected with a transmitting bus on the communication path;

designating a portal providing transfer information representing transfer of the asynchronous packets to a receiving node of a receiving bus on the communication path; and requesting an adjacent portal of the designated portal in a same bridge to search portals that exist on the communication path.

65. A communication path control method according to claim 64 further comprising the steps of:

periodically transmitting to each of portals that construct parts of the communication path prescribed asynchronous packets;

making determination that a specific bus connected with a specific portal which do not respond to the prescribed asynchronous packets being periodically transmitted is disconnected from the data network; and disconnecting the communication path using the specific portal connected with the specific bus.

66. A communication path control method according to claim 59 wherein each portal provides transfer information for determination whether to transfer asynchronous packets based on an IEEE 1394 standard being received from its own bus connected thereto to another bus or not, said communication path control method further comprising the steps of:

extracting the transfer information from all portals connected with a transmitting bus on the communication path;

designating a portal providing transfer information representing transfer of the asynchronous packets to a receiving node of a receiving bus on the communication path; and requesting an adjacent portal of the designated portal in a same bridge to search portals that exist on the communication path.

67. A communication path control method according to claim 44 further comprising the steps of: searching the first and second portals of the bridge being respectively connected with the first and second buses that construct parts of a communication path to be established; and incrementing the counters of the first and second portals by '1' to establish the communication path using the first and second buses being interconnected together by means of the bridge.

68. A communication path control method according to claim 67 wherein the counters of the first and second portals are changed by '1' after completion of a search of the first and second portals of the bridge that exists in the communication path being established between a transmitting node and a receiving node.

69. A communication path control method according to claim 67 wherein a process of changing the counters of the first and second portals by '1' is repeated from one end of the communication path to another end of the communication path.

70. A communication path control method according to claim 67 wherein each of the first and second buses that construct parts of the communication path interconnects thereon at least one node which installs a control means for searching portals depending on the communication path and changing their counters in value under a request.

71. A communication path control method according to claim 67 wherein the data network interconnects therein at least one node for searching portals existing on the communication path and storing identifiers of the portals being searched, so that the communication path is to be established or released on the basis of the identifiers extracted from the node.

72. A communication path control method according to claim 67 wherein each portal provides transfer information for determination whether to transfer asynchronous packets based on an IEEE 1394 standard being received from its own bus connected thereto to another bus or not, said communication path control method further comprising the steps of:

extracting the transfer information from all portals connected with a transmitting bus on the communication path;

designating a portal providing transfer information representing transfer of the asynchronous packets to a receiving node of a receiving bus on the communication path; and requesting an adjacent portal of the designated portal in a same bridge to search portals that exist on the communication path.

73. A communication path control method according to claim 72 further comprising the steps of:

periodically transmitting to each of portals that construct parts of the communication path prescribed asynchronous packets;

making determination that a specific bus connected with a specific portal which do not respond to the prescribed asynchronous packets being periodically transmitted is disconnected from the data network; and disconnecting the communication path using the specific portal connected with the specific bus.

74. A communication path control method according to claim 44 further comprising the step of: decrementing the counters of the first and second portals by '1' to release the communication path that is established in advance by using the first and second buses being interconnected together by means of the bridge.

75. A communication path control method according to claim 74 wherein the counters of the first and second portals are changed by '1' after completion of a search of the first and second portals of the bridge that exists in the communication path being established between a transmitting node and a receiving node.

76. A communication path control method according to claim 74 wherein a process of changing the counters of the first and second portals by '1' is repeated from one end of the communication path to another end of the communication path.

77. A communication path control method according to claim 74 wherein each of the first and second buses that construct parts of the communication path interconnects thereon at least one node which installs a control means for searching portals depending on the communication path and changing their counters in value under a request.

78. A communication path control method according to claim 74 wherein the data network interconnects therein at least one node for searching portals existing on the communication path and storing identifiers of the portals being searched, so that the communication path is to be established or released on the basis of the identifiers extracted from the node.

79. A communication path control method according to claim 74 wherein each portal provides transfer information for determination whether to transfer asynchronous packets based on an IEEE 1394 standard being received from its own bus connected thereto to another bus or not, said communication path control method further comprising the steps of:

extracting the transfer information from all portals connected with a transmitting bus on the communication path;

designating a portal providing transfer information representing transfer of the asynchronous packets to a receiving node of a receiving bus on the communication path; and requesting an adjacent portal of the designated portal in a same bridge to search portals that exist on the communication path.

80. A communication path control method according to claim 79 further comprising the steps of:

periodically transmitting to each of portals that construct parts of the communication path prescribed asynchronous packets;

making determination that a specific bus connected with a specific portal which do not respond to the prescribed asynchronous packets being periodically transmitted is disconnected from the data network; and disconnecting the communication path using the specific portal connected with the specific bus.

81. A communication path control method according to claim 79 further comprising the steps of:

periodically transmitting to each of portals that construct parts of the communication path prescribed asynchronous packets;

making determination that a specific bus connected with a specific portal which do not respond to the prescribed asynchronous packets being periodically transmitted is disconnected from the data network; and disconnecting the communication path using the specific portal connected with the specific bus.

* * * * *